(12) United States Patent
Nakae et al.

(10) Patent No.: US 8,804,590 B2
(45) Date of Patent: Aug. 12, 2014

(54) APPARATUS, METHOD AND IMPLEMENTATION FOR ADAPTABLE WIRELESS BEACON COMMUNICATION SYSTEM

(75) Inventors: Hironori Nakae, Osaka (JP); Yosuke Ukita, Osaka (JP); Hiroshi Hayashino, Hyogo (JP)

(73) Assignee: Panasonic Corporation, Osaka (JP)

( * ) Notice: Subject to any disclaimer, the term of this patent is extended or adjusted under 35 U.S.C. 154(b) by 121 days.

(21) Appl. No.: 13/577,724

(22) PCT Filed: Dec. 13, 2011

(86) PCT No.: PCT/JP2011/006959
§ 371 (c)(1),
(2), (4) Date: Aug. 8, 2012

(87) PCT Pub. No.: WO2012/086151
PCT Pub. Date: Jun. 28, 2012

(65) Prior Publication Data
US 2012/0307702 A1   Dec. 6, 2012

(30) Foreign Application Priority Data

Dec. 20, 2010   (JP) .................................. 2010-283805

(51) Int. Cl.
*H04W 52/02*   (2009.01)
*H04W 48/12*   (2009.01)
*H04W 28/22*   (2009.01)

(52) U.S. Cl.
CPC .............. *H04W 48/12* (2013.01); *H04W 28/22* (2013.01)
USPC ....................................................... 370/311

(58) Field of Classification Search
CPC ... H04B 7/212; H04W 72/0446; H04W 84/12
USPC .......... 370/321, 330, 338, 348, 311; 455/509; 709/225
See application file for complete search history.

(56) References Cited

U.S. PATENT DOCUMENTS

| 4,833,696 A | 5/1989 | Ichiyoshi |
| 8,081,575 B2 | 12/2011 | Habetha |

(Continued)

FOREIGN PATENT DOCUMENTS

| JP | 61-234154 | 10/1986 |
| JP | 2001-203767 | 7/2001 |

(Continued)

OTHER PUBLICATIONS

International Search Report issued Mar. 13, 2012 in International (PCT) Application No. PCT/JP2011/006959.

*Primary Examiner* — Charles C Jiang
*Assistant Examiner* — Rose Clark
(74) *Attorney, Agent, or Firm* — Wenderoth, Lind & Ponack, L.L.P.

(57) ABSTRACT

Provided is a communication apparatus which allows multi-rate control causing less waste of communication band as compared to conventional, the communication apparatus according to the present invention includes: the wireless communication unit for performing wireless communication with the terminal apparatus; a transfer rate setting unit for setting a transfer rate; a beacon generation unit for generating a beacon which is a first control signal; and a control unit for causing the wireless communication unit to wirelessly transmit, for every predetermined period, the beacon, and, to cause the wireless communication unit to wirelessly transmit the beacon, the control unit causes the transfer rate setting unit to set a transfer rate different from the transfer rate previously used for the wireless transmission of the beacon, and causes the wireless communication unit to transmit the beacon to the terminal apparatus.

17 Claims, 46 Drawing Sheets

(56) References Cited

U.S. PATENT DOCUMENTS

| | | |
|---|---|---|
| 8,116,217 B2 | 2/2012 | Uchida et al. |
| 8,208,973 B2 * | 6/2012 | Mehta ............................ 455/574 |
| 2005/0249244 A1 | 11/2005 | McNamara et al. |
| 2008/0137577 A1 | 6/2008 | Habetha |
| 2008/0285514 A1 | 11/2008 | Uchida et al. |
| 2010/0111066 A1 * | 5/2010 | Mehta ............................ 370/345 |
| 2010/0118737 A1 * | 5/2010 | Kim et al. ...................... 370/254 |
| 2010/0128706 A1 * | 5/2010 | Lee et al. ...................... 370/338 |
| 2010/0157955 A1 * | 6/2010 | Liu et al. ....................... 370/336 |
| 2010/0166010 A1 | 7/2010 | Ukita et al. |
| 2010/0265923 A1 * | 10/2010 | Choi et al. .................... 370/336 |
| 2010/0278087 A1 | 11/2010 | Kawakami et al. |
| 2011/0261764 A1 | 10/2011 | Shirakata et al. |
| 2012/0275427 A1 * | 11/2012 | Kalhan ......................... 370/330 |

FOREIGN PATENT DOCUMENTS

| | | |
|---|---|---|
| JP | 2005-260939 | 9/2005 |
| JP | 2008-048365 | 2/2008 |
| JP | 2008-517550 | 5/2008 |
| JP | 2008-312194 | 12/2008 |
| JP | 2009-219083 | 9/2009 |
| WO | 2006/043242 | 4/2006 |
| WO | 2009/001552 | 12/2008 |
| WO | 2010/007743 | 1/2010 |

* cited by examiner

FIG. 8A

| Super-frame period | BN | High rate value | Start time of high rate | High rate active period | Low rate value | Start time of low rate | Low rate active period |
|---|---|---|---|---|---|---|---|
| 501 | 502 | 503 | 504 | 505 | 506 | 507 | 508 |

FIG. 8B

| Super-frame period "1000 ms" | BN | High rate value "100kbps" | Start time of high rate "0 ms" | High rate active period "200 ms" | Low rate value "20kbps" | Start time of low rate "300 ms" | Low rate active period "400 ms" |
|---|---|---|---|---|---|---|---|
| | 1 | | | | | | |

FIG. 24

| SF period | BN | High rate value | Start time of high rate | High rate active period | Low rate value | Start time of low rate | Low rate active period | Announced low rate switch time |
| --- | --- | --- | --- | --- | --- | --- | --- | --- |

FIG. 28A

| Received power of beacon | Time |
|---|---|
| Large ↕ Small | Short ↕ Long |

FIG. 28B

| Terminal apparatus | Backoff value |
|---|---|
| STA 1 | 31 |
| STA 2 | 3 |

APPARATUS, METHOD AND IMPLEMENTATION FOR ADAPTABLE WIRELESS BEACON COMMUNICATION SYSTEM

TECHNICAL FIELD

The present invention relates to communication apparatuses, communication methods, terminal apparatuses, and communication systems that are used in wireless networks, and more particularly, to multi-rate communication technology in sensor networks or wireless networks accommodating a large number of wireless terminals such as active RF (Radio Frequency) tags.

BACKGROUND ART

In recent years, there has been an increasing interest in networks of small-size, low-power consumption wireless terminals, such as WPAN (Wireless Personal Area Network) or sensor networks. Also, as a system similar to the networks, an active RF tag that transmits wireless signals by itself can be mentioned.

FIG. 46 is a conceptual diagram showing an example of a wireless network of such small-size, low-power consumption communication apparatuses. In FIG. 46, a wireless network 50 includes a communication apparatus AP 10 serving as a parent device and terminal apparatuses STA 1 to STA 5 serving as child devices. It should be noted that, hereinafter, the communication apparatus is also referred to as an AP and each of the terminal apparatuses is also referred to as an STA.

The AP 10 is a communication apparatus which periodically broadcasts control information of the wireless network 50 in a beacon.

Here, the beacon is a control signal which is periodically transmitted from an AP to all STAs included in the wireless network 50. The beacon includes control information, such as transfer rate, which is used for matching communication format used for communication between the AT and the STAs. The STA 1 to the STA 5 are terminal apparatuses which perform data transmission/reception to/from the AP 10, based on the control information.

Wireless terminals used in such the wireless networks are characterized by its low power performance as being small-sized and allowing several years of driving with the use of battery. In such the wireless networks, communication protocols and frame formats that reduce the power consumption of the wireless terminals are used. For example, such the wireless networks each include an active period in which the wireless terminals perform communication and an inactive period in which the wireless terminals do not perform communication and may go to a sleep state in the wireless network. The longer the inactive period is set, the longer the sleep state period can be. This allows reduction of power consumption (for example, see PTL 1).

An example will be shown below in which the power consumption of the communication apparatus is reduced using the inactive period.

FIG. 47 shows a super-frame period 310 which includes an active period 330 and an inactive period 332. The super-frame period is a time period between the AP 10 transmits a beacon 900 and the next beacon 900.

As shown in FIG. 47, the super-frame period 310 has the active period 330 and the inactive period 332. The active period 330 is a time period in which the AP 10 and the STA 1 to the STA 5 are communicable therebetween (the communication functionality is active). The inactive period is a time period in which the AP 10 and the STA 1 to the STA 5 do not perform communication. In the inactive period, the AP 10 and the STA 1 to the STA 5 turn themselves into the sleep state, thereby reducing the power consumption.

When powered on, the AP 10 determines a transfer rate among a plurality of transfer rates supported by the AP 10. Subsequently, the AP 10 and the STA perform packet transmission and reception therebetween at the transfer rate determined by the AP 10.

The active period 330 is shared between the AP 10 and the STA 1 to the STA 5. The AP 10 broadcasts the beacon 900 at the start of the active period 330. The remaining portion of the active period 330 is used for data communication between the AP 10 and the STA 1 to the STA 5.

The beacon 900 includes control information relating to the frame, such as the number of time slots of the active period, allocation of the time slots, the length of the active period 330, the length of the inactive period 332, a time until transmission of the next beacon.

FIG. 48 is a diagram showing an example of a communication sequence between the AP 10 and the STAs.

The AP broadcasts the beacon 900 at the start of the active period (S910). The STA 1 to the STA 5 receive the beacon 900 to acquire the control information. The control information includes information such as the length of the active period 330 and the length of the inactive period 332.

In the active period 330, communication is performed between the AP 10 and the STA 1 to the STA 5. For example, the STA 2 transmits data to the AP 10 (S911), and the AP 10 transmits to the STA 2 an ACK response to the data (S912).

During the inactive period 332, no communication is performed between the AP 10 and the STA 1 to the STA 5. The AP 10 and the STA 1 to the STA 5 can go to the sleep state during a time previously informed of by the control information included in the beacon 900. This allows reduction in power consumption. Then, the AP 10 and the STA 1 to the STA 5 revert to an operational state immediately prior to the end of the inactive period 332 and prepare for the communication of the next active period 330.

After the end of the inactive period 332, the AP 10 starts processing of the next active period 330 and broadcasts the beacon 900 (S913). In the subsequent active period 330, communication is performed between the AP 10 and the STA 1 to the STA 5.

Here, in FIG. 48, the example is shown where communication from the STA 1 is failed. It is assumed that the STA 1 transmits data to the AP 10 and reception error of the data occurs at the AP 10. In this case, the AP 10 does not transmit the ACK response to the data.

The STA 1 waits for the ACK response from the AP 10 for a predetermined time period. Then, if no ACK response returns from the AP 10, the STA 1 determines that the transmission has failed. Thus, the STA 1 attempts retransmission of the packet. Here, it is assumed that the retransmitted packet is successfully received by the AP 10. In this case, the AP 10 transmits to the STA 1 an ACK response to the retransmitted packet and ends the communication.

Subsequently, the AP 10 and the STA 1 to the STA 5 communicate with each other, repeating the same operation.

The IEEE 802.15.4 which is the international standard for the wireless PAN is known as a telecommunications standard for achieving the wireless network 50 of the small-size, low-power consumption communication apparatuses as described above.

CITATION LIST

Patent Literature

[PTL 1] Japanese Unexamined Patent Application Publication No. 2008-48365

SUMMARY OF INVENTION

Technical Problem

However, for the transfer rate between the AP and the STAs, the IEEE 802.15.4 requires the use of a fixed transfer rate determined by the AP at the startup. Moreover, generally in wireless communication, the transfer rates at the sender and the receiver are the same.

A high transfer rate (for example, 100 kbps) shortens the wireless communication distance. In this case, the AP is unable to communicate with a distant STA. On the other hand, when the low rate (for example, 20 kbps) is used as the transfer rate, the wireless communication distance extends. In this case, the AP is able to communicate also with the distant STA. However, in the case where the STAs are present only near the AP, communication band wider than necessary is used, resulting in an undesirable increase in power consumption. The STAB are, for example, electric household appliances.

Thus, to achieve expanded wireless communication coverage area and enhanced efficiency of the bandwidth utilization, what is called multi-rate control by adaptive modulation is required. The multi-rate control appropriately switches the transfer rate, in accordance with the radio propagation conditions varying due to the installation position of the STA (for example, an electric household appliance or the like).

Conventionally, the multi-rate control is possible in IEEE 802.11 which is the standard for wireless LAN (Local Area Network).

FIG. 49 shows a packet format for the multi-rate control in IEEE 802.11 which is the conventional technology. As shown in FIG. 49, the packet format has a physical header 910 and a body 912. Moreover, the physical header 910 includes a rate identifier indicating a transfer rate for the body 912.

Using the format, the multi-rate control is achieved in IEEE 802.11 by the following procedure:

(1) A transmitting communication apparatus sets to the physical header 910 a rate identifier indicating a transfer rate set in accordance with conditions of communication with another apparatus, and transmits a packet to a receiving communication apparatus at a fixed (low) rate;

(2) Upon reception of the packet, the receiving communication apparatus demodulates and parses the physical header 910 first at the fixed rate; and (3) Based on the transfer rate indicated by the rate identifier set to the parsed physical header 910, the receiving communication apparatus demodulates the body 912.

In the multi-rate control in IEEE 802.11, however, the transfer rate for the physical header 910 is a low fixed rate. That is, only the transfer rate for the body 912 is a variable rate. Thus, in a wireless communication where the packet size is small and the physical header is large in ratio to one packet size, waste of bandwidth is great. WPAN requires a small packet size, and thus results in inefficient communication.

An object of the present invention is to provide a communication apparatus which overcomes the conventional problems described above and allows multi-rate control causing less waste of communication band as compared to conventional.

Solution to Problem

A communication apparatus according to one aspect of the present invention includes: a wireless communication unit configured to perform wireless communication with one or more terminal apparatuses; a transfer rate setting unit configured to set a transfer rate of the wireless communication performed by the wireless communication unit; a beacon generation unit configured to generate a beacon which is a first control signal to be transmitted by the wireless communication unit; and a control unit configured to cause the wireless communication unit to wirelessly transmit, for every predetermined period, the beacon generated by the beacon generation unit, wherein when causing the wireless communication unit to wirelessly transmit the beacon, the control unit is configured to cause the transfer rate setting unit to set the transfer rate different from a transfer rate previously used for wirelessly transmitting the beacon and cause the wireless communication unit to transmit the beacon to the one or more terminal apparatuses.

According to the above configuration, the communication apparatus also changes the transfer rate for use to transmit the beacon itself when performing the wireless communication using the plurality of transfer rates, which is unlike conventional. In general, the purpose of using a plurality of transfer rates is to reduce waste of the communication band in data communication with nearby terminals and to reduce communication error in data communication with distant terminals. The communication apparatus according to the present embodiment provides advantages of using a plurality of transfer rates for the transmission of not only data body but also the beacon (the control signal). Thus, the communication apparatus which allows multi-rate control causing less waste of communication band as compared to conventional can be provided.

Moreover, the beacon includes a first period, a second period, a first transfer rate which is the transfer rate in association with the first period, and a second transfer rate which is the transfer rate in association with the second period and different from the first transfer rate, and the control unit may be configured to cause the transfer rate setting unit to set the transfer rate to the first transfer rate when causing the wireless communication unit to wirelessly transmit the beacon in the first period, and cause the transfer rate setting unit to set the transfer rate to the second transfer rate when causing the wireless communication unit to wirelessly transmit the beacon in the second period.

According to the above configuration, the communication apparatus can share, with the terminal apparatus, a plurality of transfer rates used by the own apparatus, and the periods thereof. As a result, for example, the terminal apparatus may perform the wireless communication first at the high rate and use, as the transfer rate, only the low rate or both the high rate and the low rate, according to need, when (1) the communication error exceeds a threshold value or when (2) it is difficult to complete the transmission at the high rate. As a result, the communication apparatus which allows multi-rate control causing reduced waste of communication band can be provided.

Moreover, the beacon further includes a first time which is a time within the first period, and if an error rate which is a value corresponding to the number of times for which the wireless communication unit has failed to wirelessly receive a data signal is greater than or equal to a predetermined first threshold value at the first time, the control unit may be configured to (A) cause the transfer rate setting unit to set the transfer rate to the second transfer rate and (B) cause the wireless communication unit to wirelessly transmit, to all the one or more terminal apparatuses, a second control signal for setting a transfer rate of the one or more terminal apparatuses to the second transfer rate.

According to the above configuration, the communication apparatus transmits the low rate switch notification if the number of failed receptions at the high rate is great. The communication apparatus can retransmit the data, the transmission thereof is failed at the high rate, at the low rate by dynamically prolonging the low rate active period in the super-frame period. As a result, low communication delay can be achieved. Moreover, prolonging the low rate active period reduces in advance the probability of collision between the retransmitted data and a data signal transmitted by the terminal apparatus which performs transmission at the low rate, thus achieving the efficiency of the bandwidth utilization.

It should be noted that the beacon further includes a second time which is a time within the first period and later than the first time, and when the error rate is less than the predetermined first threshold value at the first time and if the error rate is greater than or equal to a predetermined second threshold value at the second time, the control unit may be configured to cause the transfer rate setting unit to set the transfer rate to the second transfer rate and cause the wireless communication unit to wirelessly transmit, to all the one or more terminal apparatuses, the second control signal for setting the transfer rate of the one or more terminal apparatuses to the second transfer rate. Moreover, the control unit may be configured to transmit a data signal the earlier in time to one of the one or more terminal apparatuses the data signal transmitted from which has the larger received power when received by the wireless communication unit.

According to the above configuration, the communication apparatus transmits the data signal preferentially and sooner to a terminal apparatus that has a larger received power and higher probability of successful communication than the terminal apparatus that has a smaller received power and lower probability of successful communication. The communication apparatus can transmit the data signal to the terminal apparatuses in order starting from a terminal apparatus having a lowest communication error rate. As a result, the communication apparatus can communicate, at the high rate, with terminal apparatuses in order starting from a terminal apparatus having a lowest error rate, and communicate, at the low rate, only with terminal apparatus that has the error rate, at the high rate, above threshold value. As a result, the communication apparatus which allows multi-rate control causing reduced waste of communication band can be provided.

Moreover, the beacon further includes a first time which is a time within the first period, if an error rate which is a value corresponding to the number of times for which the wireless communication unit has failed to wirelessly receive a data signal is greater than or equal to a predetermined first threshold value at the first time, the control unit may be configured to cause the wireless communication unit to wirelessly transmit, to all the one or more terminal apparatuses, a second control signal which includes a second time and is a control signal for keeping a transfer rate of the one or more terminal apparatuses at the first transfer rate until the second time which is a time within the second period, and the first transfer rate may have a smaller value of the transfer rate than the second transfer rate.

Moreover, the control unit may be configured to cause the beacon generation unit to generate the beacon such that, among a total number of terminal apparatuses, the smaller the number of terminal apparatuses that receive the beacon wirelessly transmitted at the first transfer rate is relative to the number of terminal apparatuses that receive the beacon wirelessly transmitted at the second transfer rate, the shorter the first period is relative to the second period.

According to the above configuration, the beacon generation unit can dynamically adjust the period in which the communication apparatus and the terminal apparatus communicate each other at the transfer rate in accordance with the ratio of the number of terminals for each transfer rate.

Furthermore, the control unit may be configured to cause the beacon generation unit to generate the beacon such that (A) among a total number of terminal apparatuses, the smaller the number of terminal apparatuses that receive the beacon wirelessly transmitted at the first transfer rate is relative to the number of terminal apparatuses that receive the beacon wirelessly transmitted at the second transfer rate and (B) the higher the first transfer rate is relative to the second transfer rate, the shorter the first period is relative to the second period.

According to the above configuration, the control unit considers that data having the same data size but a smaller transfer rate value requires a longer communication time, The beacon generation unit can dynamically adjust communication period appropriately for each the transfer rate.

Moreover, the beacon includes a first period in association with a first transfer rate and a second period in association with a second transfer rate lower than the first transfer rate, and when the wireless communication unit fails to wirelessly transmit a data signal at the first transfer rate in the first period, the control unit may be configured to cause the wireless communication unit to retransmit the data signal at the second transfer rate in the second period.

Moreover, the beacon includes a first period, a second period, a third period, a first transfer rate which is the transfer rate in association with the first period, a second transfer rate which is the transfer rate in association with the second period and different from the first transfer rate, and a third transfer rate which is the transfer rate in association with the third period and different from the first transfer rate and the second transfer rate, and the control unit may be configured to cause the transfer rate setting unit to set the transfer rate to the first transfer rate to cause the wireless communication unit to wirelessly transmit the beacon in the first period, cause the transfer rate setting unit to set the transfer rate to the second transfer rate to cause the wireless communication unit to wirelessly transmit the beacon in the second period, and cause the transfer rate setting unit to set the transfer rate to the third transfer rate to cause the wireless communication unit to wirelessly transmit the beacon in the third period.

Moreover, a terminal apparatus according to one aspect of the present invention includes a wireless communication unit which can perform wireless communication at a transfer rate selected from among a plurality of transfer rates; a transfer rate setting unit configured to set a transfer rate which is used by the wireless communication unit for the wireless communication; and a control unit configured to cause the transfer rate setting unit to set the transfer rate, based on a beacon which is a first control signal received by the wireless communication unit, wherein the beacon includes a first period, a second period, a first transfer rate which is the transfer rate in association with the first period, and a second transfer rate which is the transfer rate in association with the second period, and the control unit is configured to cause the transfer rate setting unit to set the transfer rate to the first transfer rate in the first period, and cause the transfer rate setting unit to set the transfer rate to the second transfer rate in the second period, According to the above configuration, unlike conventional, the terminal apparatus is allowed to know that the beacon is transmitted in which period at which transfer rate from the communication apparatus which changes the transfer rate at which the beacon itself is transmitted. Thus, the terminal apparatus can turn on the wireless communication functionality at a time when the beacon is transmitted at a transfer rate to be used by the terminal apparatus for communication, and can turn off the wireless communication functionality after necessary communication. As a result, a terminal apparatus which allows multi-rate control causing less waste of communication band and less power consumption of terminal apparatus as compared to conventional can be provided.

Moreover, the beacon further includes a first time which is a time within the first period, and the control unit may be configured to cause the transfer rate setting unit to set, at the first time, the transfer rate to the second transfer rate, and determines whether the wireless communication unit has received a second control signal at the second transfer rate, to cause the transfer rate setting unit to set the transfer rate to the first transfer rate when the second control signal has not been received, and not to cause the transfer rate setting unit to change the transfer rate when the second control signal has been received.

According to the above configuration, the terminal apparatus receives the low rate switch notification that is transmitted from the communication apparatus when the number of failed receptions at the high rate is great. The terminal apparatus can re-receive the data, the reception thereof is failed at the high rate, at the low rate by changing the transfer rate to the low rate. As a result, low communication delay can be achieved.

Moreover, when the wireless communication unit fails to wirelessly transmit a data signal at the first transfer rate greater than or equal to a predetermined number of times in the first period, the control unit may be configured to cause the wireless communication unit to retransmit, in the second period, the data signal at the second transfer rate.

According to the above configuration, communication delay can be improved as compared to the case where the terminal apparatus attempts retransmission of the packet in the next high rate active period.

Moreover, prior to causing the wireless communication unit to perform wireless transmission, the control unit may be configured to perform carrier sensing which is a process of determining whether other terminal apparatus is performing wireless transmission, and if it is determined that no other terminal apparatus is performing the wireless transmission, the control unit is configured to determine a backoff time, which is a wait time until when the control unit causes the wireless communication unit to perform the wireless transmission after the carrier sensing is performed, such that the smaller received power of the beacon is, the longer the backoff time is, and after the backoff time is passed, the control unit is configured to cause the wireless communication unit to perform the wireless transmission.

According to the above configuration, the terminal apparatuses having smaller communication error rate is allowed for sooner transmission. As a result, communication apparatus which allows multi-rate control causing reduced waste of communication band as compared to conventional can be provided.

It should be noted that the present invention can not only be implemented as such a communication apparatus but also as a communication method having characteristic units, as steps, included in the communication apparatus, or as a program for causing a computer to execute such characteristic steps. In addition, such a program can, of course, be distributed by being stored in a storage medium such as CD-ROM (Compact Disc Read Only Memory) and via a transmission medium such as the Internet.

Furthermore, the present invention can be implemented as a semiconductor integrated circuit (LSI) which achieves a part or the whole functionality of such the communication apparatus and the like or as a communication system which includes such the communication apparatus and the like.

Advantageous Effects of Invention

A communication apparatus which allows multi-rate control causing less waste of communication band as compared to conventional can be provided.

BRIEF DESCRIPTION OF DRAWINGS

FIG. 8A is a diagram showing a format of beacon payload which is transmitted by the AP according to the embodiment 1 to the STA.

FIG. 8B is a diagram showing an example of the beacon transmitted by the AP according to the embodiment 1 to the STA.

FIG. 24 is a schematic view showing information (super-frame information) included in a beacon which is transmitted by an AP according to an embodiment 2.

FIG. 28A is a diagram showing a manner according to the embodiments 1 to 4 in which a backoff time is set.

FIG. 28B is a diagram showing an example of the backoff time according to the embodiments 1 to 4.

DESCRIPTION OF EMBODIMENTS

Hereinafter, embodiments of the present invention will be described with reference to the accompanying drawings.

Embodiment 1

Figure 1:
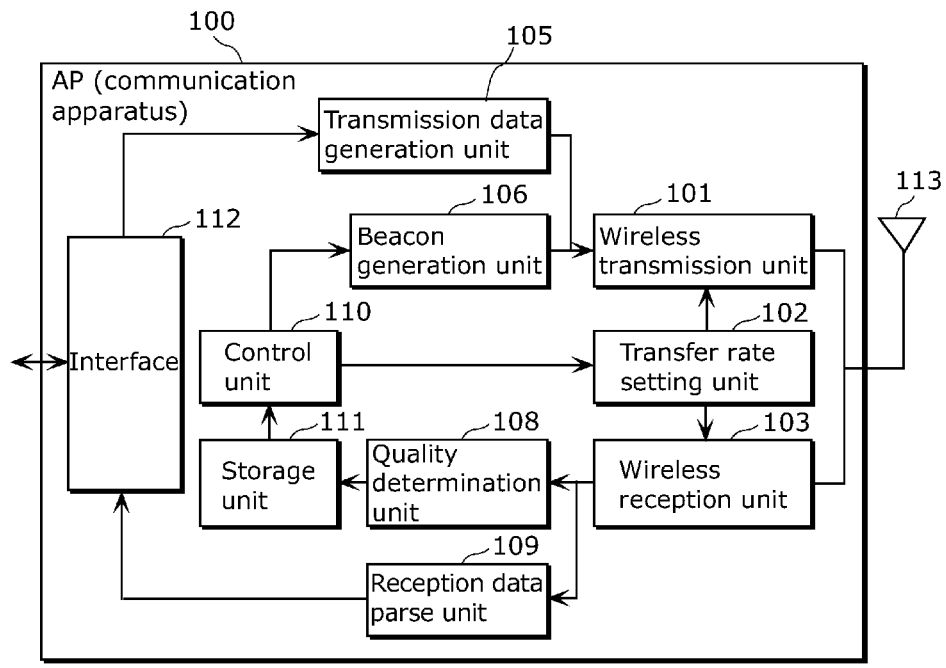
FIG. 1 is a functional block diagram of an AP according to an embodiment 1.

FIG. 1 shows a functional block diagram of an AP 100 which is a communication apparatus according to the present embodiment. As shown in FIG. 1, the AP 100 includes a wireless transmission unit 101, a transfer rate setting unit 102, a wireless reception unit 103, a transmission data generation unit 105, a beacon generation unit 106, an control unit 110, a quality determination unit 108, a reception data parse unit 109, a storage unit 111, an interface 112, and an antenna 113.

The wireless transmission unit 101 modulates a beacon or a transmission packet which are acquired from the transmission data generation unit 105 or the beacon generation unit 106, to generate a wireless signal. The wireless transmission unit 101 transmits the generated wireless signal via the antenna 113.

The transfer rate setting unit 102 sets a transfer rate at which wireless transmission and reception are performed. For example, the transfer rate setting unit 102 sets the transfer rate for transmission and reception to either a high rate which is 100 kbps or a low rate which is 20 kbps. It should be noted that any numbers of transfer rates such as a medium rate and a highest rate may be set in addition to the low rate and the high rate.

It should be noted that the difference in transfer rate such as "high" or "low" means difference in modulation scheme of transmission data, difference in coding rate of error correcting coding (that is, difference in amount of error correction code), difference in frequency bandwidth used, and the like. For example, in the "high rate", the amount of error correction code is small, and thus the time required for transmission is short. A reduced amount of the error correction code reduces the possibility for correcting error occurred in transmission paths. Thus, the "high rate" is suitable for short-distance communication in which error hardly occurs in transmission paths, On the other hand, in the "low rate", the amount of error correction code is large, and thus the time required for transmission is long. An increased amount of the error correction code increases the possibility for correcting the error occurred in transmission paths. Thus, the "low rate" is suitable for long-distance communication in which error is likely to occur in transmission paths.

The wireless reception unit 103 demodulates the wireless signal received at the antenna 113 and outputs a reception packet. It should be noted that, hereinafter, the wireless transmission unit 101 and the wireless reception unit 103 are collectively referred to as a wireless communication unit, That is, the AP 100 uses the wireless communication unit to perform wireless communication with terminal apparatuses.

The transmission data generation unit 105 includes transmission data acquired from the interface 112 in a body portion, and generates a transmission packet in accordance with the telecommunications standard of the wireless communication.

The beacon generation unit 106 reads out control information or quality information for each of frequency channels stored in the storage unit 111. Then, the beacon generation unit 106 generates a beacon which is a control signal periodically transmitted from the wireless communication unit. Specifically, the beacon generation unit 106 sets the frame control of the transmission packet with a code which indicates a frame type indicating beacon. Moreover, the beacon generation unit 106 inserts payload of the beacon to the transmission packet.

The control unit 110 causes the beacon generation unit 106 to generate the beacon. The control unit 110 causes the wireless transmission unit 101 to wirelessly transmit, for every predetermined period, the beacon generated by the beacon generation unit 106. Specifically, for the control unit 110 to cause the wireless transmission unit 101 to transmit the beacon, the control unit 110 causes the transfer rate setting unit 102 to set a transfer rate that is different from a transfer rate previously used for the wireless transmission of the beacon. The control unit 110 further controls the configuration of a super frame. The details will be described below.

Moreover, the control unit 110 measures received power of all frequency channels at the startup of the AP 100. The control unit 110 creates frequency channel availability information by determining whether each of the frequency channels is available. Still further, the control unit 110 determines, for each of sub-SF periods, availability of the frequency channels, based on information such as conditions of communication with an STA or duration of unreceivable state due to the carrier sensing, and continuously updates the frequency channel availability information.

The quality determination unit 108 determines quality of the reception packet. Examples of a method of determining the quality includes a method in which SN (Signal-Noise) ratio is calculated based on the received power. In addition, a method in which an error detection code such as CRC (Cyclic Redundancy Check) included in the reception packet is used to calculate a ratio of the number of packet losses in all reception packets, or other method may be used.

The reception data parse unit 109 parses the reception packet demodulated by the wireless reception unit 103, and retrieves as the reception data and outputs the body portion.

The storage unit 111 stores therein the control information or the quality information of a reception frame. The storage unit 111 stores therein super-frame periods, the sub-SF (super-frame) periods, the number of sub-SF periods, the frequency channel availability information, and the like. Specifically, DRAM (Dynamic Random Access Memory), SRAM (Static Random Access Memory), or the like can be used as the storage unit 111.

The interface 112 is a communication interface for inputting and outputting the transmission data and the reception data For example, USB (Universal Serial Bus), Ethernet (registered trademark), IEC 62480, or the like can be used as the interface 112.

Figure 2:
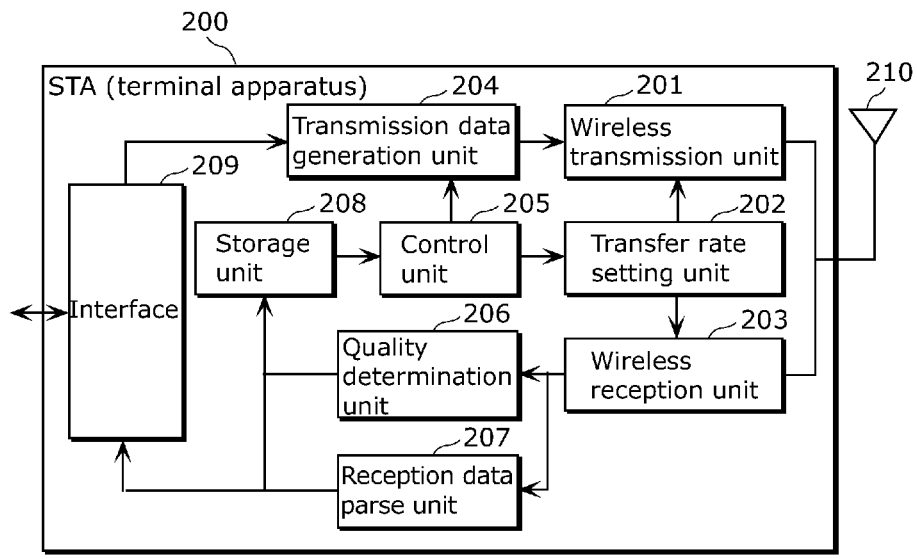
FIG. 2 is a functional block diagram of an STA which is a terminal apparatus included in a communication apparatus according to the embodiment 1.

FIG. 2 is a functional block diagram of the STA which is a terminal apparatus included in the communication apparatus according to the present embodiment.

In FIG. 2, an STA 200 includes an antenna 210, a wireless transmission unit 201, a transfer rate setting unit 202, a wireless reception unit 203, a transmission data generation unit 204, a control unit 205, a quality determination unit 206, a reception data parse unit 207, a storage unit 208, and an interface 209.

The wireless transmission unit 201 modulates a transmission packet, which is acquired from the transmission data generation unit 204, or the like to generate the wireless signal. The wireless transmission unit 201 transmits the generated wireless signal via the antenna 210.

Similarly to the transfer rate setting unit 102, the transfer rate setting unit 202 sets a transfer rate at which the wireless transmission and reception are performed. Communication can successfully be performed between the AP 100 and the STA 200 when the transfer rate set by the transfer rate setting unit 102 of the AP 100 and the transfer rate set by the transfer rate setting unit 202 of the STA 200 coincide with each other.

The wireless reception unit 203 demodulates the wireless signal received at the antenna 210 and outputs the reception packet. It should be noted that, hereinafter, the wireless transmission unit 201 and the wireless reception unit 203 are collectively referred to as a wireless communication unit. That is, the wireless communication unit performs wireless communication at a transfer rate selected from among a plurality of transfer rates.

The transmission data generation unit 204 includes, in a body portion, transmission data inputted via the interface 209 and, generates the transmission packet in accordance with the telecommunications standard of the wireless communication.

Based on the control information, the quality information of the frequency channel, or the like which are stored in the storage unit, the control unit 205 controls the transmission timing or selects the frequency channel, Moreover, the control unit 205 changes the transfer rate at timing specified by the AP 100 using the beacon. The details will be described below.

The quality determination unit 206 determines the quality of the reception packet.

The reception data parse unit 207 parses the reception packet obtained by demodulation by the wireless reception unit 203, and retrieves as the reception data and outputs the body portion.

Similarly to the storage unit 111 of the AP 100, the storage unit 208 stores therein the control information or the quality information of a reception frame.

Similarly to the interface 112 of the AP 100, the interface 209 is a communication interface for inputting and outputting the transmission data and the reception data.

Figure 3:
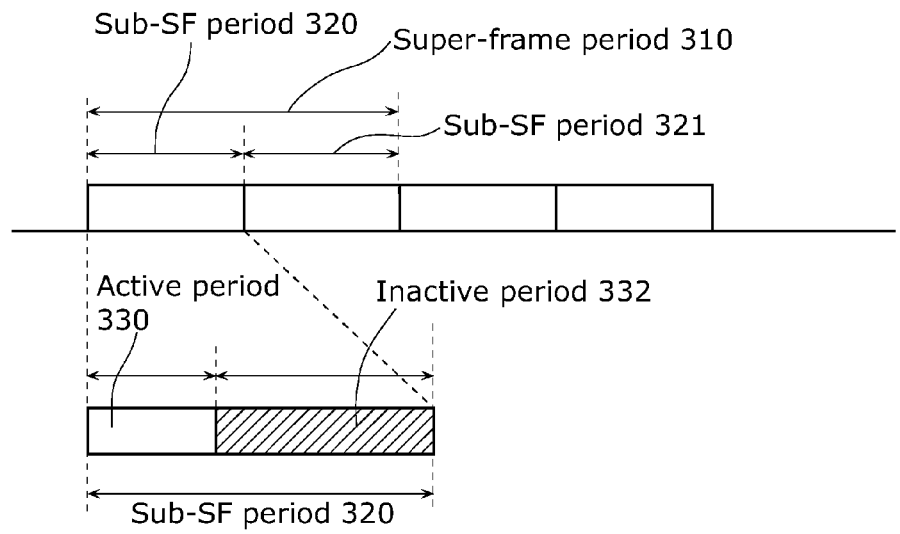
FIG. 3 is a schematic view representing a time at which the AP according to embodiments 1 to 4 periodically transmits a beacon.

FIG. 3 is a schematic view representing a time at which the AP 100 according to the present embodiment periodically transmits the beacon. A largest period in which the beacon is transmitted is the super-frame period (hereinafter, also referred to as SF) 310.

In the present embodiment, one super-frame period 310 is divided into a plurality of sub-SF periods. In FIG. 3, one super-frame period 310 is divided into two sub-SF periods (a sub-SF period 320 and a sub-SF period 321).

The AP 100 and the STA 200 according to the present embodiment perform wireless communication therebetween, changing the transfer rate in units of the sub-SF periods. The sub-SF period 320 further includes an active period 330 in which the wireless communication is performed and an inactive period 332 during which no wireless communication is performed. The beacon, which is transmitted by the AP 100, specifies the lengths of the sub-SF periods, the length of the active period included in each of the sub-SF periods, the transfer rate, and the like. The STA 200 communicates with the AP 100, in accordance with the specified lengths of the sub-SF periods, the specified lengths of the active periods, the specified transfer rate, and the like. The details will be described below.

During the inactive period 332, the AP 100 and the STA 200 can go to what is called a sleep state. Thus, the AP 100 and the STA 200 according to the present embodiment can reduce power consumption of processing units necessary for the wireless communication.

It should be noted that the AP 100 and the STA 200 can perform the wireless communication therebetween while switching a plurality of transfer rates in any order.

Figure 4:
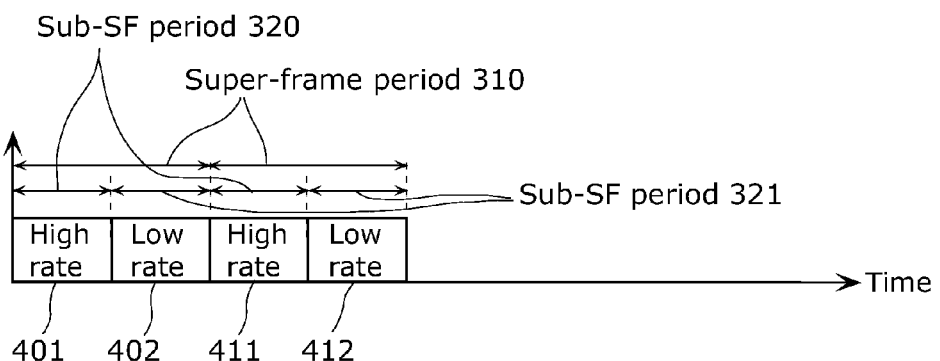
FIG. 4 is a schematic view representing a transfer rate of each of sub-SF periods when the communication apparatus according to the embodiments 1 to 4 switches the transfer rate in units of the sub-SF periods.

FIG. 4 is a schematic view representing the transfer rate of each sub-SF period when the communication apparatus according to the present embodiment switches the transfer rate in units of sub-SF periods.

As shown in FIG. 4, during the super-frame period 310, the sub-SF period 320 in which the communication is performed at the high rate and the sub-SF period 321 in which the communication is performed at the low rate alternately occur.

Specifically, for example, the transfer rate setting unit 102 included in the AP 100 allocates the high rate (here, 100 kbps) and the low rate (here, 20 kbps) to the sub-SF period 320 and the sub-SF period 321, respectively, in the super-frame period 310.

After the end of the super-frame period 310 and when the subsequent super-frame period 310 arrives, the transfer rate setting unit 102 again allocates the high rate and the low rate to the sub-SF period 320 and the sub-SF period 321, respectively.

Figure 5:
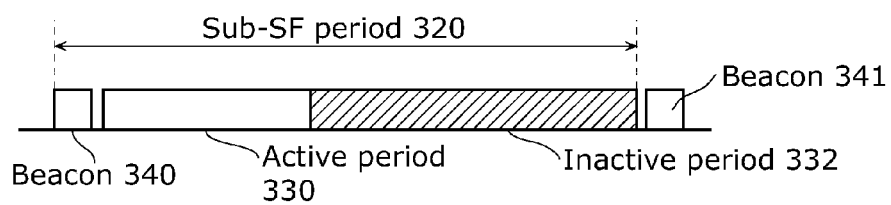
FIG. 5 is a schematic view representing details of a configuration of the sub-SF period according to the embodiments 1 to 4.

FIG. 5 is a schematic view representing a detailed configuration of the sub-SF period 320. It should be noted that, for the purpose of simplification, a high rate sub-SF period 320 is described. However, the configuration is common to any of the sub-SF periods, irrespective of the transfer rate.

The sub-SF period 320 is a period between when the AP 100 transmits a beacon 340 and a beacon 341.

As described above, the sub-SF period 320 is divided into the active period 330 and the inactive period 332. The communication apparatus which includes the AP 100 and the STA 200 performs wireless communication in the active period 330.

Hereinafter, description will be given assuming that each communication apparatus performs the wireless communication by the CSMA (Carrier Sense Multiple Access) algorithm. It should be noted that the wireless access format is not limited to the CSMA algorithm, and other wireless access format such as the ALOHA algorithm or the TDMA (Time Division Multiple Access) algorithm may be used.

Here, referring back to FIG. 4, when the STA 200 performs communication at the high rate of 100 kbps, the STA 200 starts up only in the high rate sub-SF period 320. That is, the STA 200 performs communication by the CSMA algorithm in the access period in a sub-SF period 411 after a sub-SF period 401, and does not perform the wireless communication during a sub-SF period 402 and a sub-SF period 412. That is, the STA 200 can put the wireless communication to sleep in the low rate sub-SF period, irrespective of whether the low rate sub-SF period is the active period 330 or the inactive period 332. This allows the STA 200 to reduce power consumption of the processing units necessary for the wireless communication.

Turning to the high rate of 100 kbps, for example, the sub-SF periods 401 and 411 can be regarded as the active periods and the sub-SF periods 402 and 412 can be regarded as the inactive periods. In this case, the active period of the low rate of 20 kbps can be regarded as being the high rate inactive period. For example, when causing the wireless communication unit to wirelessly transmit the beacon, the control unit 110 may cause the transfer rate setting unit 102 to set, for wireless transmission of the beacon, a transfer rate different from a previously used transfer rate, and cause the wireless communication unit to transmit the beacon to the STA which is the terminal apparatus.

Figure 6:
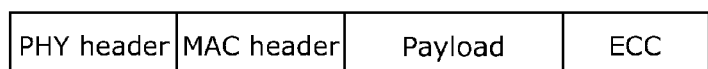
FIG. 6 is a diagram showing a format of a transmission packet which is wirelessly transmitted by the communication apparatus according to the embodiments 1 to 4.
Figure 7:
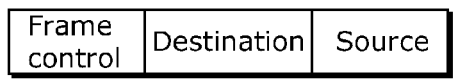
FIG. 7 is a diagram showing a configuration of a MAC header included in a transmission packet which is wirelessly transmitted by the communication apparatus according to the embodiments 1 to 4.

FIG. 6 is a diagram showing a format of the transmission packet which is wirelessly transmitted by the AP 100 which is the communication apparatus according to the present embodiment. The transmission packet includes: PHY header which includes code, such as a bit synchronization code and a frame synchronization code, necessary for demodulating the wireless signal; MAC header which includes the frame type, address information, and the like; payload which is information (the transmission data) to be transmitted to the communicating party; and ECC which is an error detection code whereby whether the transmission packet is successfully transmitted is detected. Moreover, the MAC header includes, as shown in FIG. 7, a destination communication apparatus address, a source communication apparatus address, and the frame control which indicates a type of the transmission packet. Examples of the frame type indicated by the frame control include transmission packet whereby data transmission and reception is performed between the wireless terminals, ACK frame which is a response to the successful reception of the transmission packet or the like, and beacon which is the control information which is transmitted by the AP 100 to the STA 200 in the wireless network.

FIG. 8A is a diagram showing a format of beacon payload which is transmitted by the AP 100 according to the present embodiment to the STA 200.

Moreover, FIG. 8B is a diagram showing an example of the beacon transmitted by the AP 100 according to the present embodiment to the STA 200.

Figure 8C:
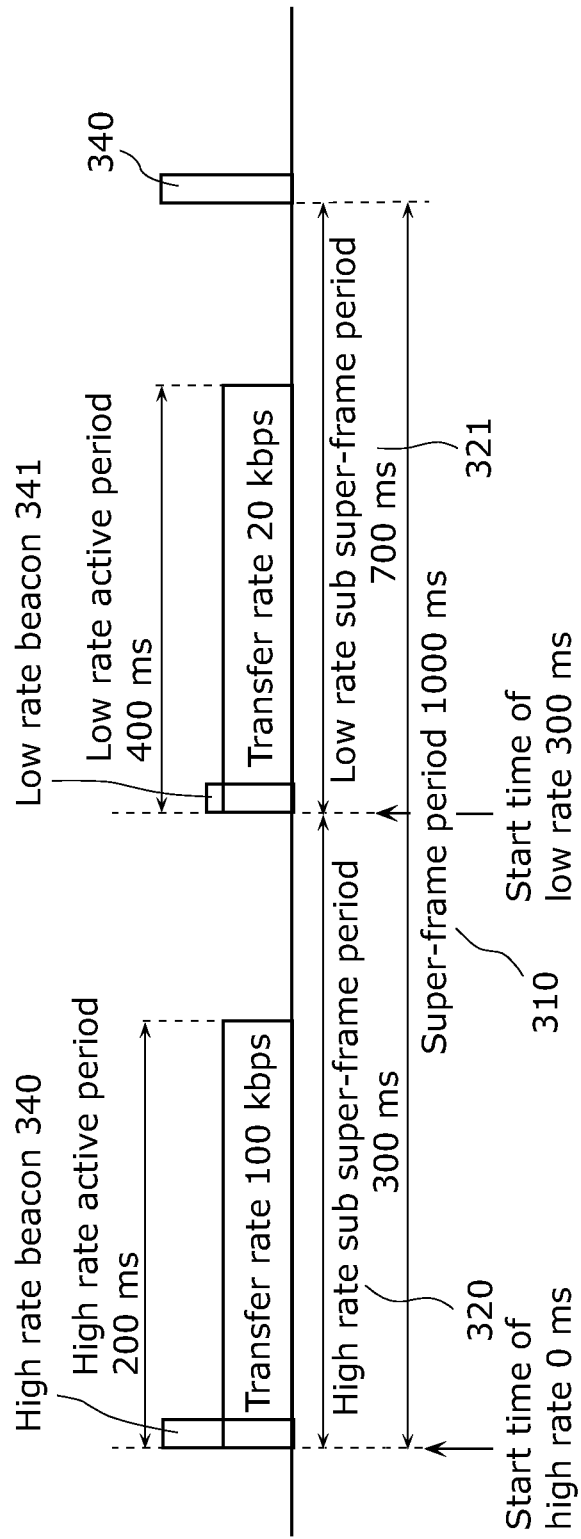
FIG. 8C is a diagram showing an example of a schedule whereby the AP according to the embodiment 1 transmits the beacon shown in FIG. 8B to the STA.

Moreover, FIG. 8C is a diagram showing an example of schedule whereby the AP 100 according to the present embodiment transmits the beacon shown in FIG. 8B to the STA 200.

As shown in FIG. 8A, the beacon payload includes a super-frame period 501, a BN 502, a high rate value 503, a start time 504 of the high rate, a high rate active period 505, a low rate value 506, a start time 507 of the low rate, and a low rate active period 508. Here, the BN 502 is an identifier indicating whether the beacon is a low rate beacon or a high rate beacon. Here, it is assumed that the BN 502 is set to "1" if the beacon is the high rate beacon, and the BN 502 is set to "2" if the beacon is the low rate beacon.

The STA 200 having received such the beacon is allowed to select a period for performing the next communication with the AP 100 from among a plurality of wireless communication periods determined by the wireless communication format such as CDMA.

More specifically, FIG. 8B shows payload of the beacon 340 which is generated by the beacon generation unit 106 when the AP 100 performs the multi-rate control on the communication between the AP 100 and the STA 200 according to the schedule shown in FIG. 8C.

As shown in FIG. 8B, the super-frame period 501 is set to 1000 ms and the BN 502 is set to "1" indicating that the beacon 340 is the high rate beacon. For each of the transfer rates of the sub-SF periods included in the super-frame period 310, the super-frame period 501 is followed by a rate value, a start time, and an active period. That is, the high rate value 503 is set to the rate value 100 kbps of the sub-SF period 320. The start time 504 of the high rate is set to the start time 0 ms (based on a transmission time of the beacon 340) of the sub-SF period 320. The high rate active period 505 is set to an active period 200 ms included in the sub-SF period 320. The low rate value 506 is set to the rate value 20 kbps of the sub-SF period 321. The start time 507 of the low rate is set to the start time 300 ms of the sub-SF period 321. The low rate active period 508 is set to the active period 400 ms included in the sub-SF period 321.

That is, the beacon includes a first period, a second period, a first transfer rate which is the transfer rate in association with the first period, and a second transfer rate which is the transfer rate in association with the second period. The first period is, for example, a period starting after the start time 504 of the high rate to when the high rate active period 505 is passed. The second period is, for example, a period starting after the start time 507 of the low rate to when the low rate active period 508 is passed. The first transfer rate is, for example, the high rate value 503. The second transfer rate is, for example, the low rate value 506.

Here, when causing the wireless transmission unit 101 to wirelessly transmit the beacon in the first period, the control unit 110 included in the AP 100 causes the transfer rate setting unit 102 to set the transfer rate to the first transfer rate. To cause the wireless transmission unit 101 to wirelessly transmit the beacon in the second period, the control unit 110 included in the AP 100 causes the transfer rate setting unit 102 to set the transfer rate to the second transfer rate.

On the other hand, the control unit 205 included in the STA 200 causes the transfer rate setting unit 202 to set the transfer rate to the first transfer rate in the first period. The control unit 205 included in the STA 200 causes the transfer rate setting unit 202 to set the transfer rate to the second transfer rate in the second period. It should be noted that the STA 200 may not necessarily change the transfer rate during the first period and the second period. For example, the STA 200 may perform the wireless communication at the first transfer rate in the first period only and put the communication functionality to sleep during the second period, thereby reducing the power consumption.

Figure 9:
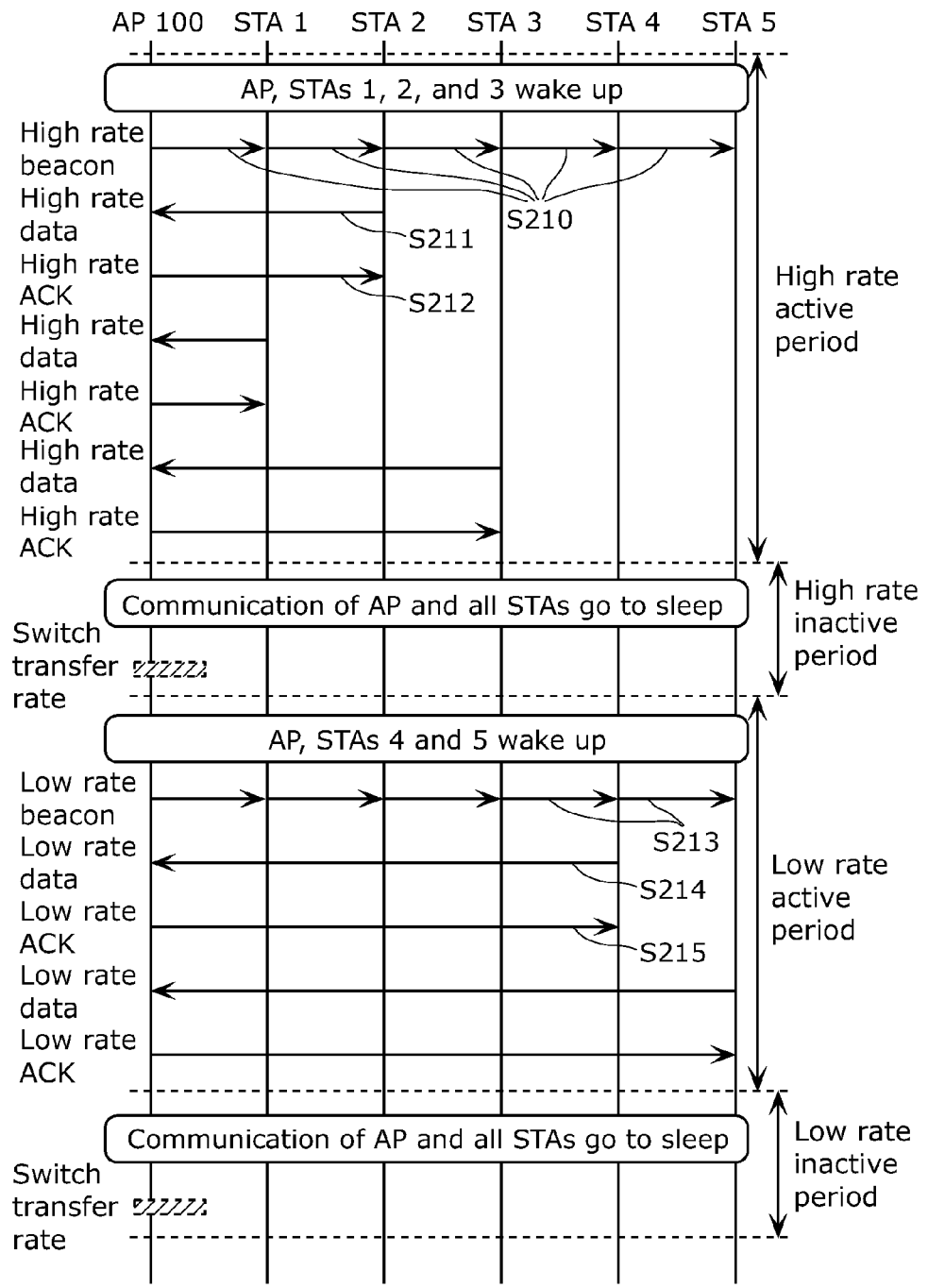
FIG. 9 is a diagram illustrating a communication sequence between the AP according to the embodiment 1 and the STAs.

FIG. 9 is a diagram illustrating a communication sequence between the AP 100 according to the present embodiment and the STA 200. Hereinafter, for the purpose of illustration, the description will be given using five STAs: an STA 1; an STA 2; an STA 3; an STA 4; and an STA 5.

Here, it is assumed that the STAB 1 to 3 operate at the high rate and the STAs 4 and 5 operate at the low rate. Specifically, it is assumed that the STAs 1 to 3 use the high rate of 100 kbps in the high rate active period to communicate with the AP 100. It is assumed that the STAs 4 and 5 use the transfer rate of 20 kbps in the low rate active period to communicate with the AP 100.

Moreover, it is assumed that the STAs operating at the high rate are controlled by the control unit 205 included in the STA 200 so that the communication functionality of the STAs is ON in the high rate active period only. Likewise, it is assumed that the STAs operating at the low rate are controlled by the control unit 205 included in the STA 200 so that the communication functionality of the STAs is ON in the low rate active period only.

Still further, it is assumed that the AP 100 and the STAs 1 to 5 share the super-frame information by the beacon transmitted from the AP 100. The super-frame information is, namely, the super-frame period, the high rate sub-SF period and the transfer rate thereof, the low rate sub-SF period and the transfer rate thereof, and the length of the active period.

First, in the high rate active period, the AP 100 transmits the high rate beacon to the STA 1 to the STA 5 which are all the terminal apparatuses in the wireless network (S210). The high rate active period is an active period in which the wireless communication is performed at the high rate. The high rate beacon is a beacon which is transmitted at the high rate.

Here, the beacon generation unit 106 reads out, from the storage unit 111, the information to be included in the beacon payload, such as the super-frame period and the sub-SF periods described above. Moreover, the beacon generation unit 106 sets the BN 502 to 1 and generates a beacon. The beacon generated by the beacon generation unit 106 is modulated by the wireless transmission unit 101 and transmitted to the STAs via the antenna 113 (S210), During the first high rate active period, the communication functionality of the STAs 1 to 3 is in active state, and thus the STAs 1 to 3 receive the high rate beacon transmitted by the AP 100. Upon reception of the beacon, the STAs 1 to 3 parse the payload in the beacon and store in the storage unit 208 new super-frame information which includes the order of using the transfer rates and the like.

Next, the STA 2 storing therein the transmission data performs carrier sensing and transmits the high rate packet to the AP 100. The AP 100 having successfully received the high rate packet transmits a high rate ACK frame as a successful reception response to the STA 1 (S211), and receives an ACK frame as a response to the high rate ACK frame (S212).

Likewise, here, the STA 1 and the STA 3 also store therein the transmission data, and thus transmit packets and receive ACK frames as a response to the packets.

The high rate active period is followed by the high rate inactive period.

During the high rate inactive period, (the communication functionality of) the AP 100 and all the STAs which are the STA 1 to the STA 5 go to the sleep state. Prior to the end of the high rate inactive period, the control unit 110 included in the AP 100 causes the transfer rate setting unit 102 to change the transfer rate to the low rate.

The AP 100 transmits the low rate beacon to all the STAs at the start of the low rate active period (S213). Here, the BN 502, which is in the beacon and indicates the order of using the transfer rates, is 2. The low rate active period is an active period in which the wireless communication is performed at the low rate. The low rate beacon is a beacon which is transmitted at the low rate.

The STA 4 and the STA 5 that are active during the low rate active period successfully receive the low rate beacon (S213). Next, the STA 4 and the STA 5 parse the payload in the beacon, and store in the storage unit 208 the super-frame information which includes the order of using the transfer rates in the next SF period.

Next, the STA 4 storing therein the transmission data performs the carrier sensing and transmits the low rate packet (S214). The AP 100 having successfully received the packet transmits to the STA 4 an ACK frame as a successful reception response (S215). Likewise, the STA 5 transmits data and receives an ACK.

The low rate active period is followed by the low rate inactive period.

During the low rate inactive period, the AP and all the STAs which are the STA 1 to the STA 5 go to the sleep state. Thereafter, the same sequence is repeated.

It should be noted that for transmitting the transmission packet to the STAs 1 to 3 in the high rate active period, the transfer rate setting unit 102 sets the transfer rate to the high rate. For transmitting the transmission packet to the STAs 4 and 5 in the low rate active period, the transfer rate setting unit 102 sets the transfer rate to the low rate.

It should be noted that the STAs may operate at both the high transfer rate and the low transfer rate.

Figure 10:
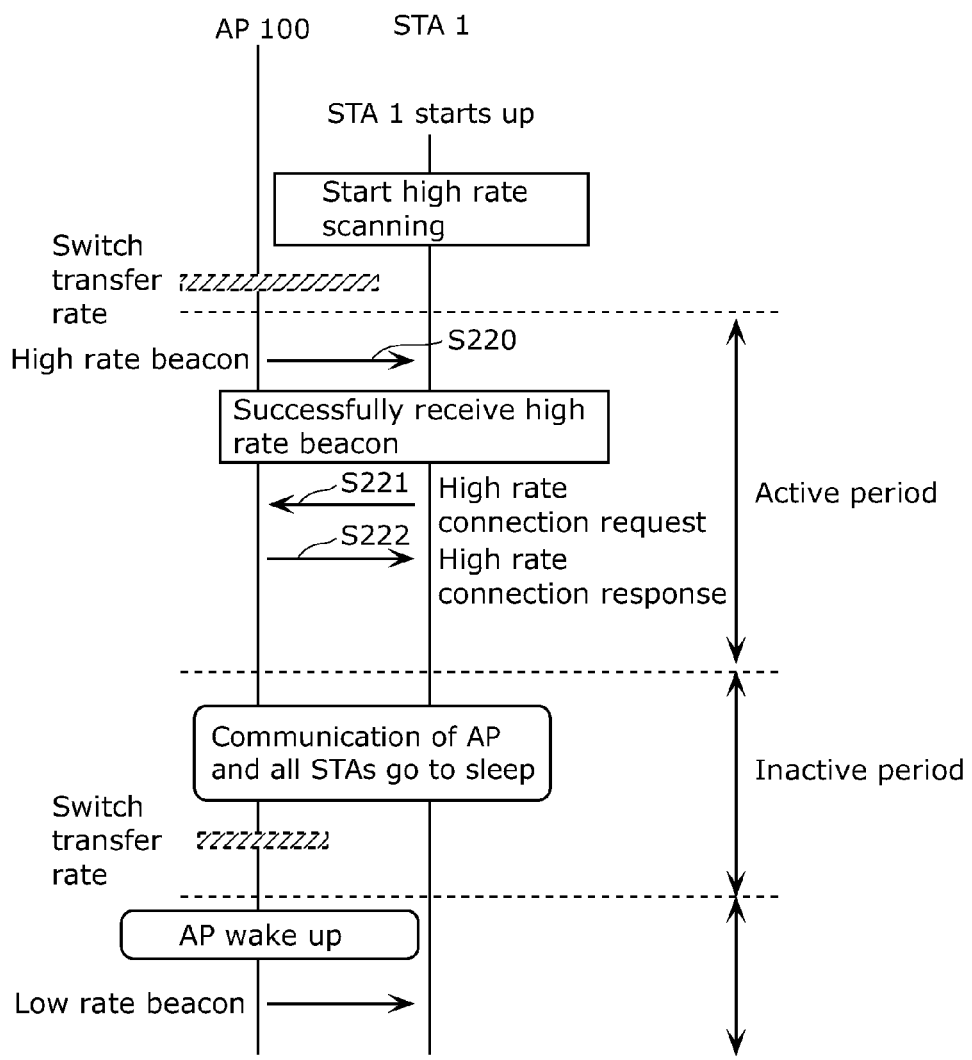
FIG. 10 is a sequence diagram illustrating an example of a high rate connection in the communication apparatus according to the embodiment 1.

FIG. 10 is a sequence diagram illustrating an example of a high rate connection in the communication apparatus according to the present embodiment. Here, the STA 1 will be described by way of example of the STAs.

At the initial startup, the STA 1 first scans the beacon at the high rate. That is, the STA 1 starts a process of waiting for wireless reception.

The AP 100 transmits the high rate beacon at the start of the high rate active period (S220).

Upon reception of the high rate beacon, the STA 1 demodulates the high rate beacon. Here, it is assumed that the reception is successful. Next, the STA 1 transmits a high rate connection request to the AP 100 from which the beacon has been transmitted (S221). Moreover, the AP 100 returns to the STA 1 a connection response permitting the connection (S222).

Thereafter, the STA 1 starts up in the high rate active period specified by the beacon received from the AP 100, to perform data transmission/reception to/from the AP 100, and goes to sleep during the other periods, thereby allowing minimization of the power consumption.

Figure 11:
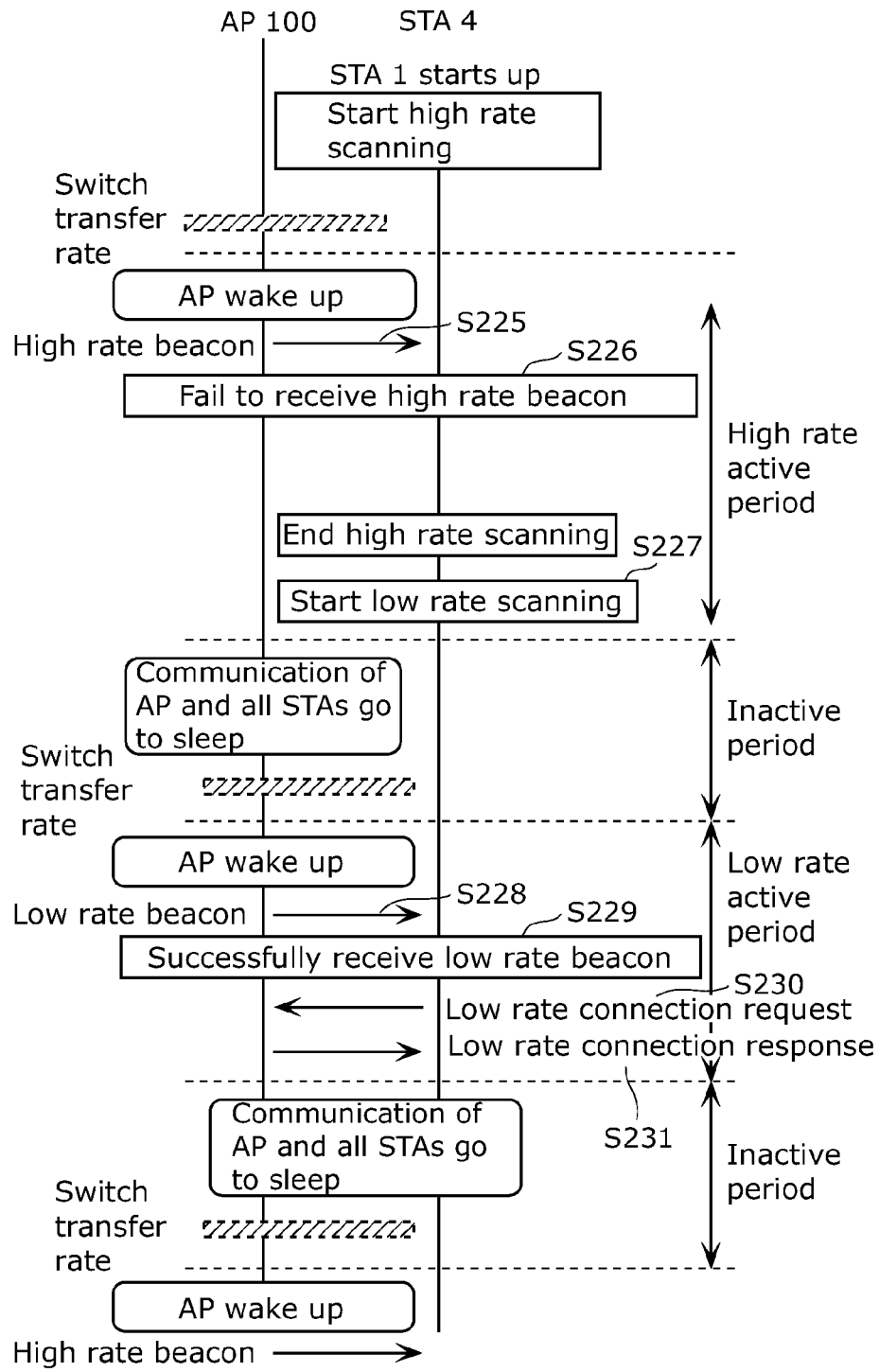
FIG. 11 is a sequence diagram illustrating an example of a low rate connection in the communication apparatus according to the embodiment 1.

FIG. 11 is a sequence diagram illustrating an example of a low rate connection in the communication apparatus according to the embodiment of the present invention. Here, the STA 4 will be described by way of example of the STAB.

Upon the startup, the STA 4 first scans the beacon at the high rate.

The AP 100 transmits the high rate beacon at the start of the high rate active period (S225).

Upon reception of the high rate beacon, the STA 4 demodulates the high rate beacon. Here, it is assumed that, for example, the distance between the AP 100 and the STA 4 is so far that the STA 4 fails reception of the high rate beacon (S226).

The STA 4 again scans the beacon for a preset number of times or until a period (for example, the high rate active period) is passed. As a result, if failed the reception of the high rate beacon, the control unit 205 switches the transfer rate to the law rate and starts scanning the beacon (S227).

Then, the AP 100 transmits the low rate beacon at the start of the low rate active period (S228).

Upon reception of the low rate beacon, the STA 4 demodulates the low rate beacon. Here, it is assumed that the reception is successful (S229). Then, the STA 4 transmits a low rate connection request to the AP 100 from which the beacon has been transmitted (S230). Subsequently, the AP 100 returns to the STA 4 a connection response permitting the connection (S231).

Thereafter, the STA 4 starts up in the low rate active period specified by the beacon received from the AP 100, to perform data transmission/reception to/from the AP at the low rate, and goes to sleep during the other periods, thereby allowing the minimization of the power consumption.

Figure 12:
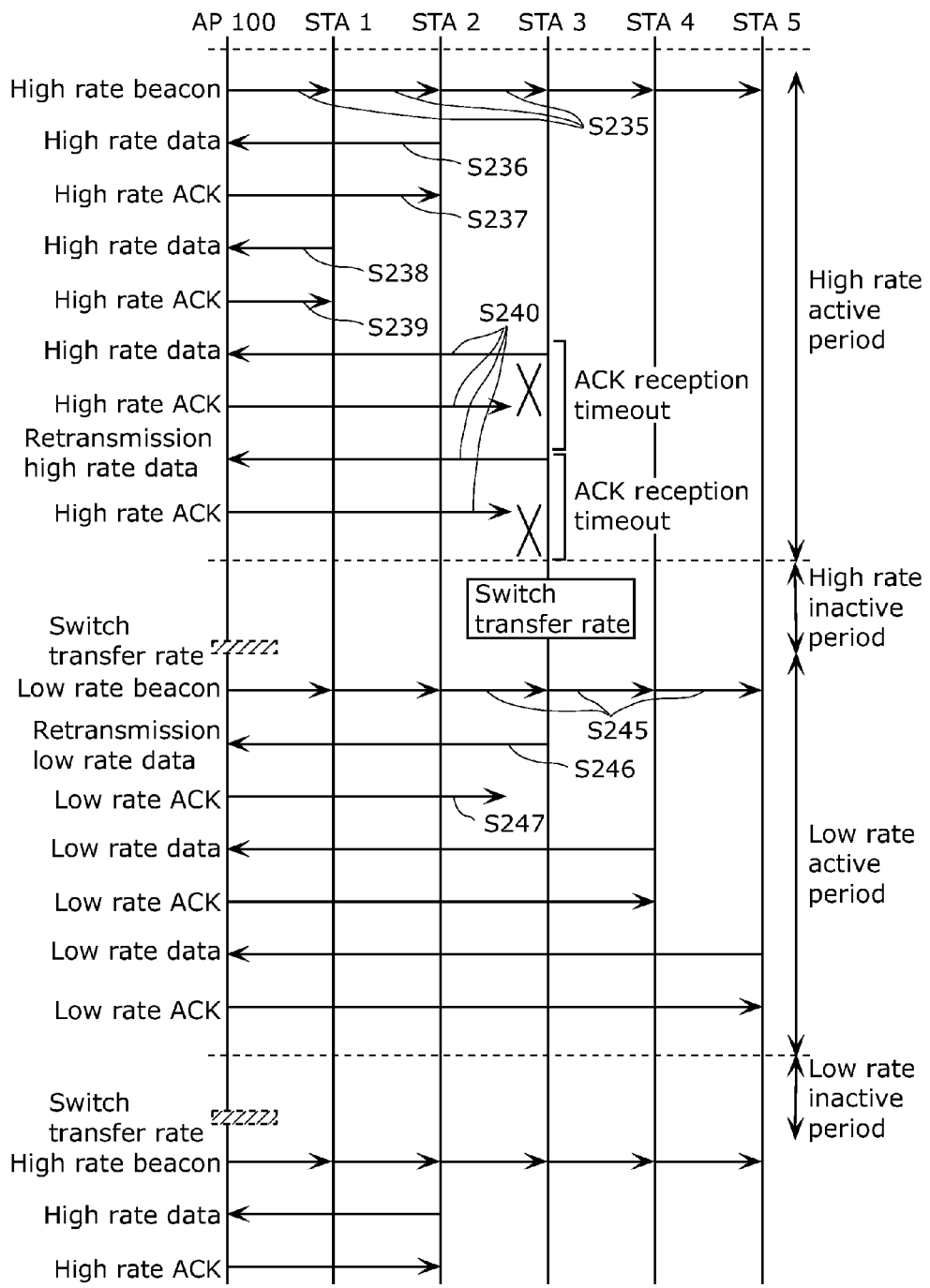
FIG. 12 is a second diagram illustrating a communication sequence between the AP and the STAs.

FIG. 12 is a second diagram illustrating a communication sequence between the AP 100 and the STAs 1 to 5.

It should be noted that, similarly to the case illustrated in FIG. 9, it is assumed, in FIG. 12, that the STAs 1 to 3 are in operation at the high rate and the STAs 4 and 5 are in operation at the low rate. Moreover, it is assumed that the STAs operating at the high rate are controlled by the control unit 205 included in the STA 200 so that the communication functionality of the STAs is ON only in the high rate active period. It is assumed that the STAs operating at the low rate are controlled by the control unit 205 included in the STA 200 so that the communication functionality of the STAs is ON only in the low rate active period.

Moreover, it is assumed that the AP 100 and the STAs 1 to 5 share the super-frame information by the beacon transmitted from the AP 100.

In FIG. 12, once the high rate active period starts, the AP 100 first transmits the high rate beacon concurrently to the STA 1 to the STA 5 which are all the terminal apparatuses in the wireless network. The frame control is attached with a code indicating a frame type. If the frame type indicates beacon, the payload is inserted with beacon payload.

In the high rate active period, the STAs 1 to 3 in active state receive the beacon transmitted from the AP 100 (S235).

Upon successful reception of the high rate beacon, the STAs 1 to 3 parse the payload in the beacon, and acquire and store new super-frame information which includes the order of using the transfer rates in the storage unit.

Next, the STA 2 storing therein data to be transmitted performs the carrier sensing and transmits the transmission packet to the AP 100 (S236). The AP 100 having successfully received the transmission packet transmits an ACK frame as a successful reception response to the STA 2 (S237).

Likewise, the STA 1 transmits the transmission packet to the AP 100 (S238) and receives an ACK frame (S239).

Here, unlike FIG. 9, it is assumed that the STA 3 fails data transmission to the AP 100 (S240). Whether the data transmission is failed is determined by the control unit 205, based on, for example, a fact that despite the wireless transmission unit 201 has retransmitted the transmission data for a predetermined number of times, no ACK has returned from the AP 100. Alternatively, whether the data transmission is failed may be determined by the control unit 205, based on a fact that despite that the wireless transmission unit 201 has retransmitted the transmission data, no ACK has returned from the AP 100 for a predetermined time.

When recognized, from the super-frame information stored in the storage unit 208, that the subsequent sub-SF period is of the low rate (20 kbps), the control unit 205 included in the STA 3 causes the transfer rate setting unit 202 to set the transfer rate to the low rate after the end of the high rate inactive period.

The AP 100 transmits the low rate beacon at the start of the low rate active period. Here, the sub-SF period number in the order of using the transfer rates in the beacon is 2. The STAs 3, 4, and 5 that are active during the active period successfully receive the low rate beacon (S245). The STAs 3, 4, and 5 parse the payload in the beacon and store in the storage unit 208 new super-frame information which includes the order of using the transfer rates or the like in the next one super-frame period.

Next, the STA 3 storing therein the transmission data performs the carrier sensing and transmits, from the wireless transmission unit 201, the transmission packet at the low rate (S246). The AP 100 having successfully received the transmission packet transmits a low rate ACK frame as a successful reception response to the STA 3 (S247). Likewise, the STA 4 and the STA 5 perform data transmission and reception.

It should be noted that, subsequently, the control unit 205 included in the STA 3 may return the transfer rate back to the high rate or, if the number of error is great at the high rate, may use solely the low rate.

That is, if a wireless communication unit 120 fails the wireless transmission of a data signal at the first transfer rate (for example, the high rate) greater than or equal to a predetermined number of times in the first period (for example, the high rate active period), the control unit 205 included in the STA according to the present embodiment causes the wireless communication unit 120 to retransmit the data signal at the second transfer rate (for example, the low rate) in the second period (for example, the low rate active period subsequent to the first period).

As described above, when failed the completion of the packet transmission at the high rate, the STA according to the present embodiment changes the transfer rate to the low rate and retransmits the packet in the next sub-SF period. This improves delay as compared to when making an attempt to retransmit the packet in the next high rate active period.

Moreover, not limiting to the case of the transmission failure of packet, if an amount of data of the packet to be transmitted is so large that it is difficult to complete the transmission in the high rate active period, the STA may change the transfer rate to the low rate and continue transmitting the packet, following the high rate.

Figure 13:
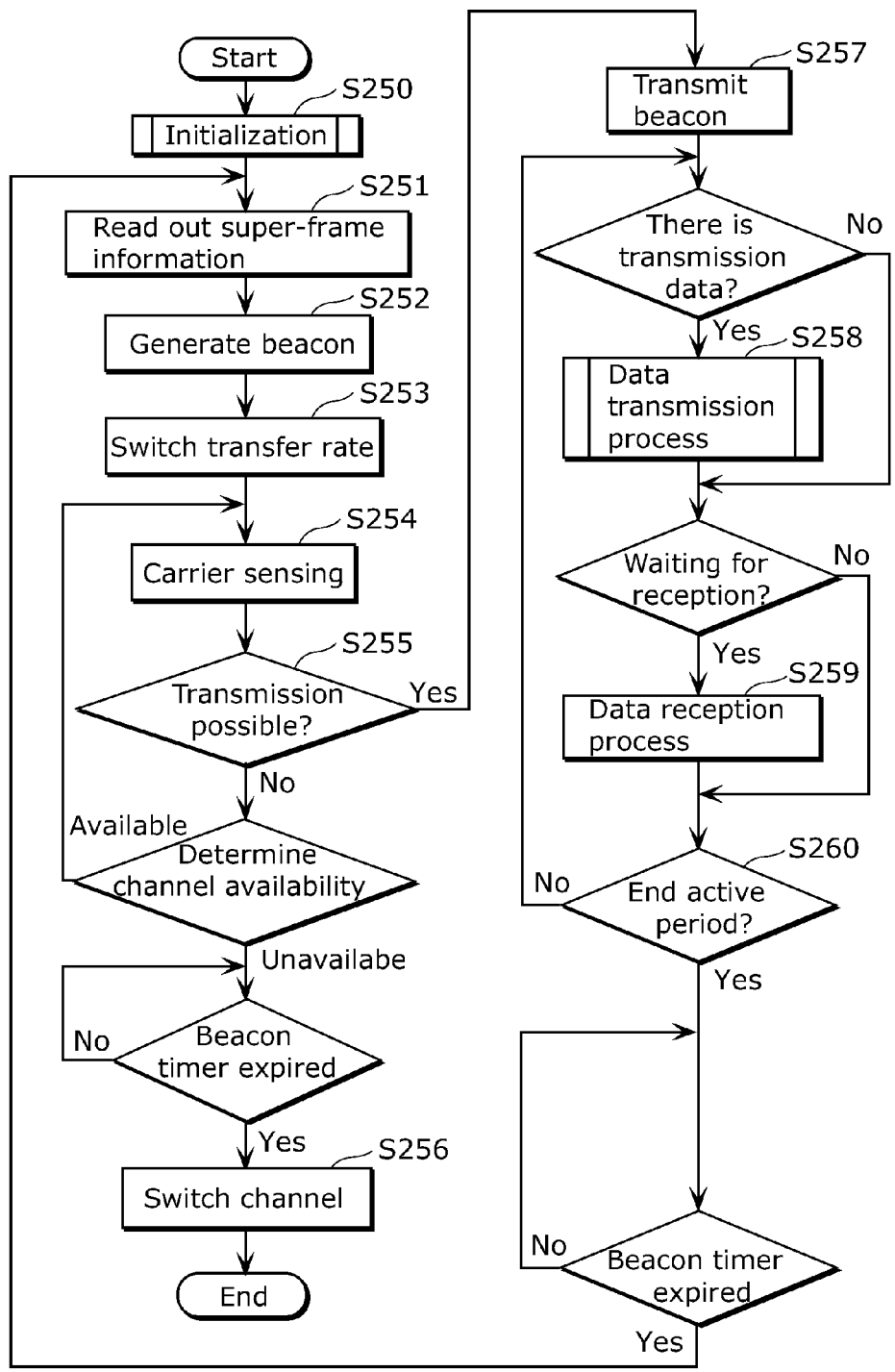
FIG. 13 is a flowchart illustrating processing flow of the AP according to the embodiment 1.

FIG. 13 is a flowchart illustrating processing flow of the AP 100 according to the present embodiment.

As illustrated in FIG. 13, the AP 100 first executes an initialization process (S250).

Next, the control unit 110 reads out the super-frame information stored in the storage unit 111, such as the super-frame period, the sub-SF periods, the order of using the transfer rates (S251).

Next, the control unit 110 causes the beacon generation unit 106 to generate, based on the read out super-frame information, a beacon (S252).

Next, the control unit 110 causes the transfer rate setting unit 102 to switch the transfer rate to a transfer rate specified by the beacon (S253).

Next, the control unit 110 instructs the wireless transmission unit 101 to transmit the beacon. To transmit the beacon at the start of the sub-SF period, the wireless transmission unit 101 performs the carrier sensing to determine whether a wireless medium is in the idle state (whether the beacon collides with a packet transmitted from other wireless communication device) (S254).

Here, the level of the carrier sensing is smaller than or equal to a predetermined level, the wireless transmission unit 101 determines that the transmission of the beacon is possible (Yes in S255), On the other hand, if the level of the carrier sensing is greater than or equal to the predetermined level, the wireless transmission unit 101 determines that the transmission of the beacon is impossible (No in S255).

When the wireless transmission unit 101 determines for a preset number of times in succession that the transmission of the beacon is impossible, the transfer rate setting unit 102 changes the frequency channel to other frequency channel (S256).

When the transmission of the beacon is possible (Yes in S255), the wireless transmission unit 101 transmits the beacon (S257). Subsequently, the AP 100 repeats the data transmission process (S258) and the data reception process (S259) to perform transmission and reception of the packet or the like between the AP 100 and the STA 200.

The AP 100 repeats the data transmission process and the data reception process until the end of the active period. Then, after the end of the active period (Yes in S260), the AP 100 goes to the sleep mode of the communication functionality. After the expiration of the beacon timer, the AP 100 repeats the same operations at the transfer rate of the next sub-SF period.

It should be noted that while the AP 100 changes the channel (S256) when it is determined, by the scanning at the beacon transmission, that a channel is not available and the beacon transmission is NG, the present invention is not limited thereto. For example, the AP 100 may change the channel when it is determined, by scanning the transmission data, that the transmission is NG, or may change the channel when it is determined, by scanning the beacon in the inactive period, that the transmission is NG.

Figure 14:
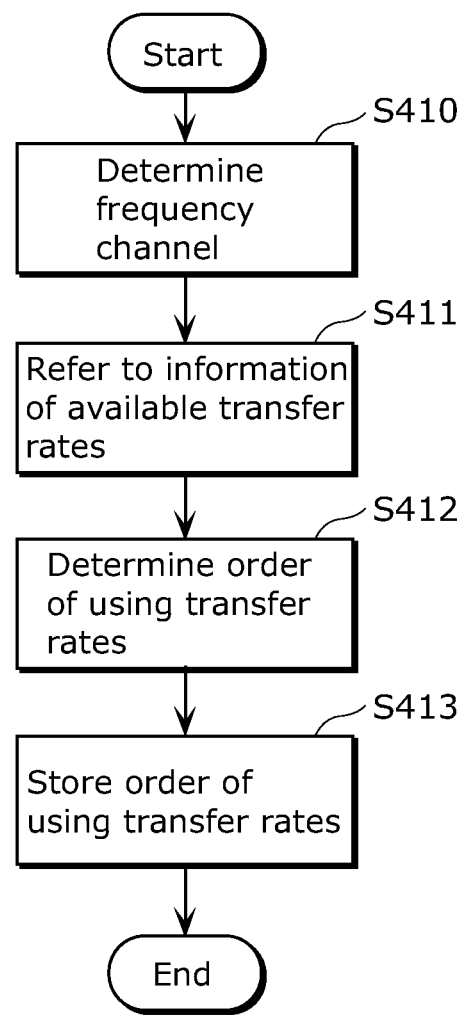
FIG. 14 is a flowchart illustrating initialization processing flow of the AP according to the embodiment 1.

FIG. 14 is a flowchart illustrating the initialization processing flow of the AP 100 according to the present embodiment. Specifically, FIG. 14 is a flowchart illustrating details of step S250 illustrated in FIG. 13.

The wireless transmission unit 101 first scans frequency channels available to the own apparatus which are stored in the storage unit 111 to determine a frequency channel to use (S410).

Next, the control unit 110 acquires summary information of the transfer rates available to the own apparatus which is stored in the storage unit 1 (S411).

Next, the control unit 110 determines the order of using the transfer rates, using a preset number of transfer rates. Here, it is assumed that the preset number is 2 and the order of using the transfer rates is determined so that the high rate of 100 kbps and the low rate of 20 kbps are alternately used (S412).

The control unit 110 stores the determined usage order in the storage unit 111 (S413) and ends the initialization process.

It should be noted that if there is a plurality of transfer rates, the transfer rates determined by the AP 100 in the initialization process may be a maximum transfer rate and a minimum transfer rate, may be selected based on the result of the carrier sensing on the own apparatus, or may be selected by any other method.

Figure 15:
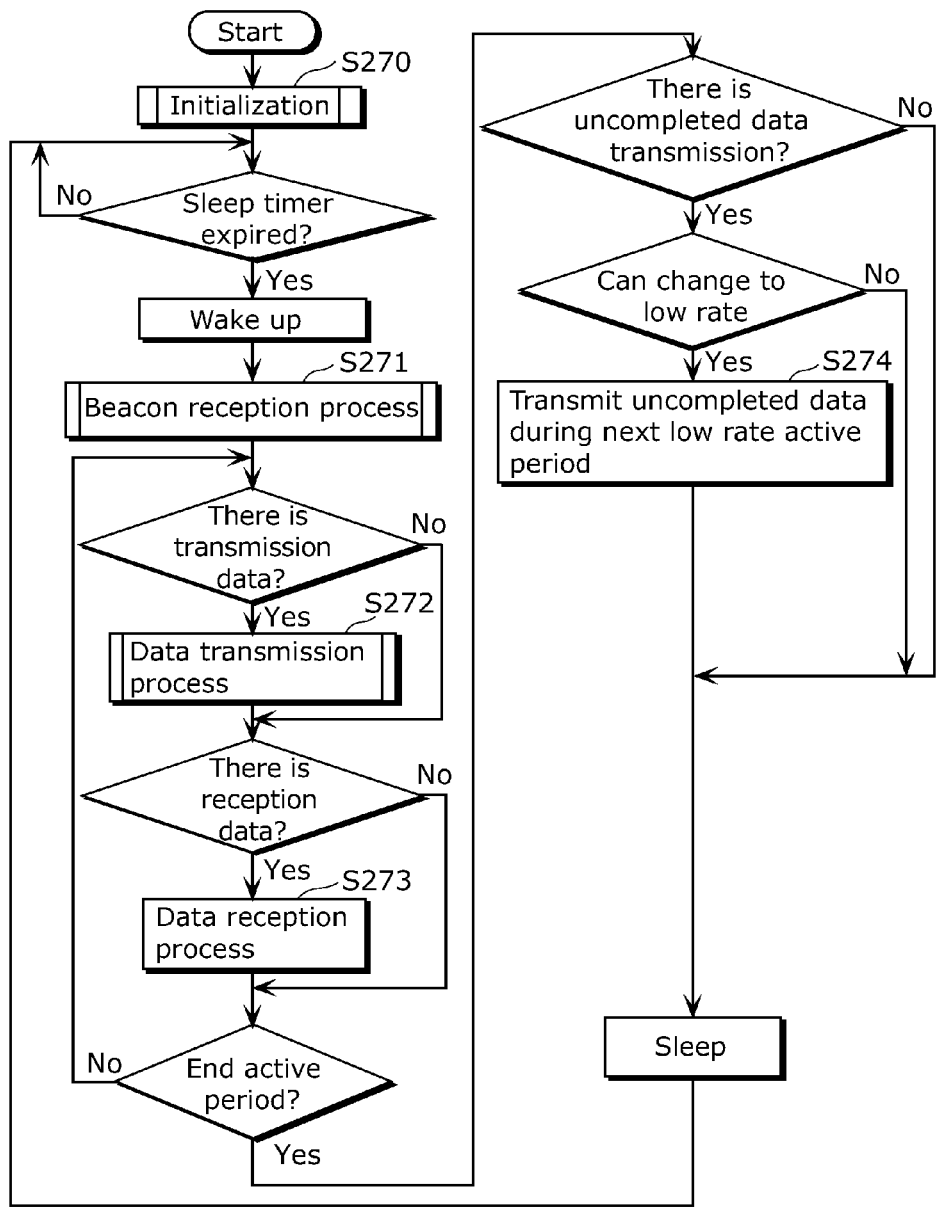
FIG. 15 is a flowchart illustrating processing flow of the STA according to the embodiment 1.

FIG. 15 is a flowchart illustrating processing flow of the STA 200 according to the present embodiment.

Here, it is assumed that the STA 200 is originally in the sleep state.

First, the control unit 205 included in the STA 200 performs an initialization process (S270).

Next, after the expiration of the sleep timer, the STA 200 comes out of the sleep state and starts up. Here, it is assumed that the transfer rate in this state is the high rate.

Next, the wireless reception unit 203 performs a beacon reception process (S271).

Next, the wireless reception unit 203 repeats, at the high rate, a packet transmission process (S272) and a packet reception process (S273) until the end of the active period.

It should be noted that, if the transmission of the data in the high rate active period is incomplete, the STA wakes up in the next low rate active period and transmits the data at the low rate (S274).

Figure 16:
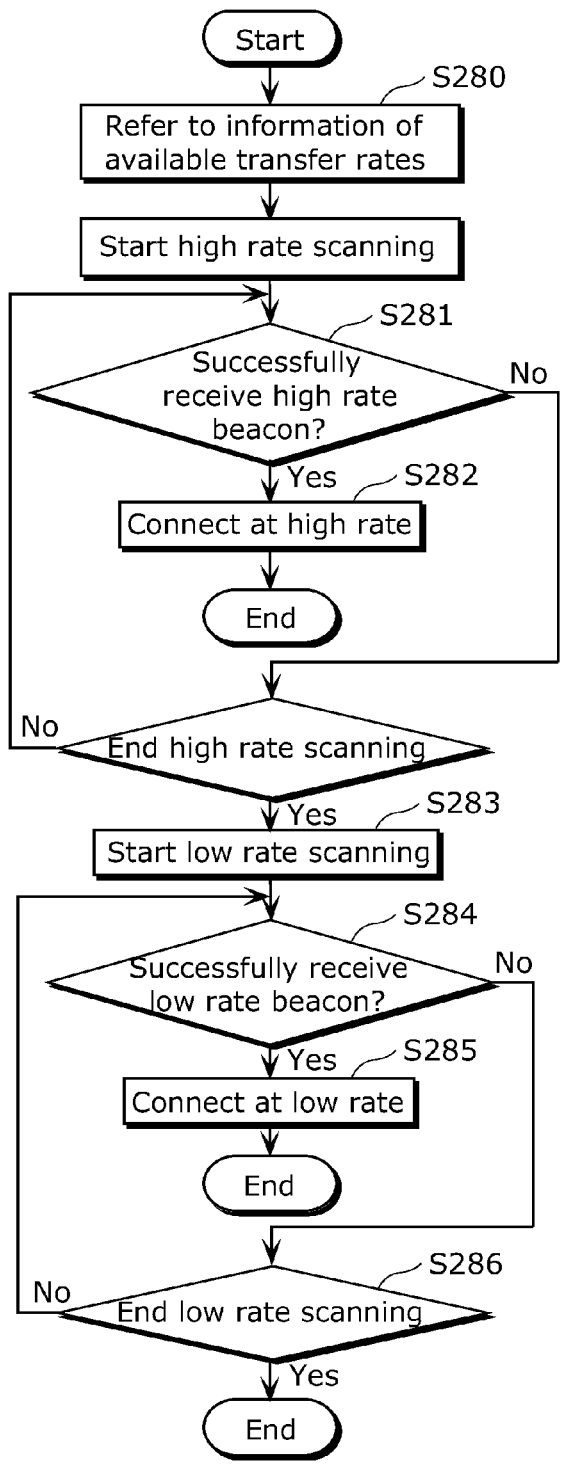
FIG. 16 is a flowchart illustrating initialization processing flow of the STA according to the embodiment 1.

FIG. 16 is a flowchart illustrating the initialization processing flow of the STA 200 according to the present embodiment. Specifically, FIG. 16 is a flowchart illustrating details of step S270 illustrated in FIG. 15.

The STA 200 first acquires a list of transfer rates available to the own apparatus which is stored in the storage unit 208

(S280). Here, it is assumed that the STA 200 is allowed to use the high rate of 100 kbps and the low rate of 20 kbps.

The STA 200 scans the beacon first at 100 kbps (S281) and if the scanning is successful (Yes in S281), performs processing to start wireless communication with the AP 100 at the high rate (S282).

However, if failed the scanning at the high rate (No in S281), the STA 200 performs the scanning at the low rate after the end of the scanning at the high rate (S283).

If the scanning at the low rate of 20 kbps is successful (Yes in S284), the STA 200 performs processing to start wireless communication with the AP 100 at the low rate (S285). On the other hand, if failed the scanning at the low rate (No in S284), which means the failure of the scanning at all the transfer rates supported by the STA 200, the STA 200 aborts the scanning (S286) and ends the communication process.

It should be noted that the STA 200 may scan all channels first at the high rate, and if failed the scanning, may scan all the channels at the low rate.

Figure 17:
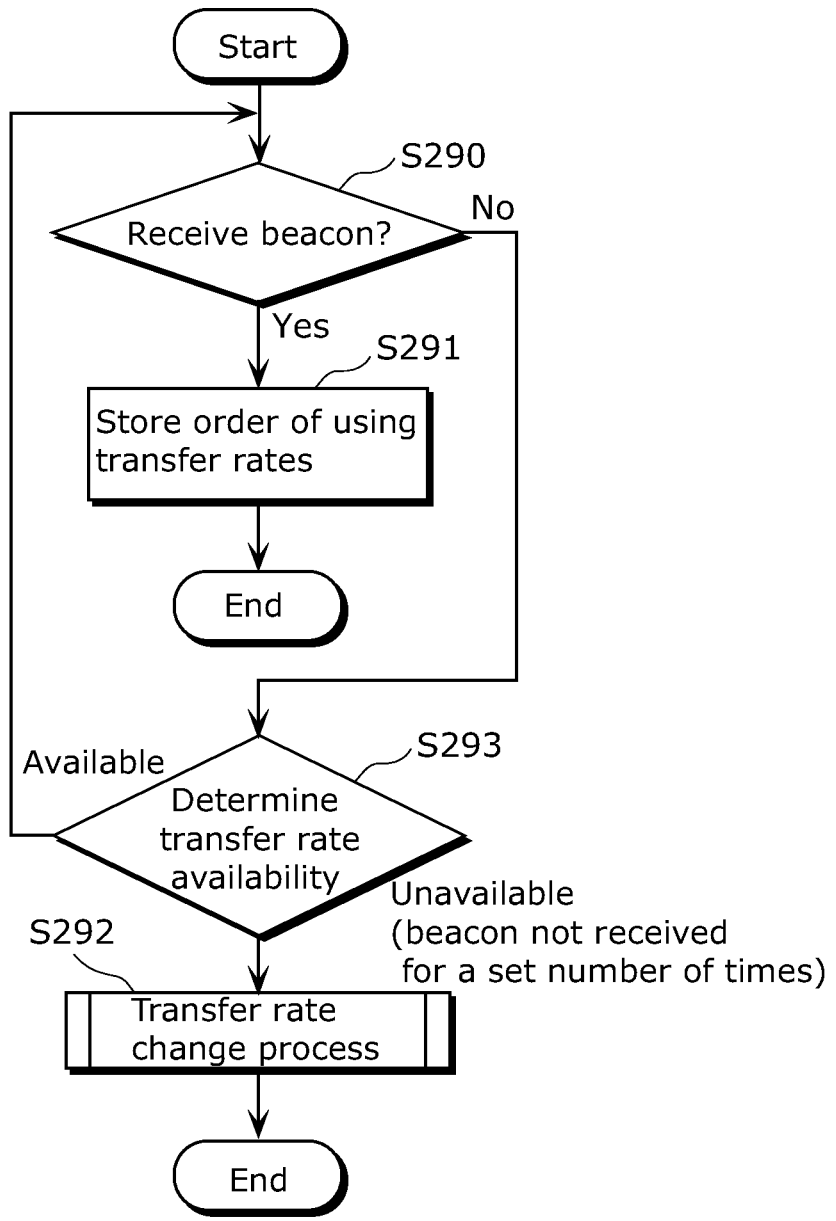
FIG. 17 is a flowchart illustrating processing flow upon reception of the beacon by the STA according to the embodiment 1.

FIG. 17 is a flowchart illustrating processing flow the STA 200 according to the present embodiment at the reception of the beacon. Specifically, FIG. 17 is a flowchart illustrating details of step S271 illustrated in FIG. 15.

First, if the wireless reception unit 203 successfully receives the beacon (Yes in S290), the reception data parse unit 207 parses the beacon payload. The reception data parse unit 207 retrieves and stores the order of using the transfer rates in the storage unit 208, thereby updating channel usage order information (S291).

On the other hand, if failed the reception of the beacon (No in S290), the wireless reception unit 203 determines whether the transfer rate is available, based on a preset threshold value (S293). More specifically, if a time period for which the beacon cannot be received is less than the threshold value or if the number of failed receptions of the beacon is less than the threshold value, the wireless reception unit 203 determines that the transfer rate is available ("Available" in S293). Then, the wireless reception unit 203 continues its operation at a current transfer rate (S290). On the other hand, if the threshold value is exceeded, the wireless reception unit 203 determines that the transfer rate is unavailable ("Unavailable" in S293). Then, the transfer rate setting unit 202 performs a transfer rate change process (S292). The transfer rate change process will be described below. The determination is at least one of the determination based on a threshold time value and the determination based on a threshold value with respect to the number of times.

Figure 18:
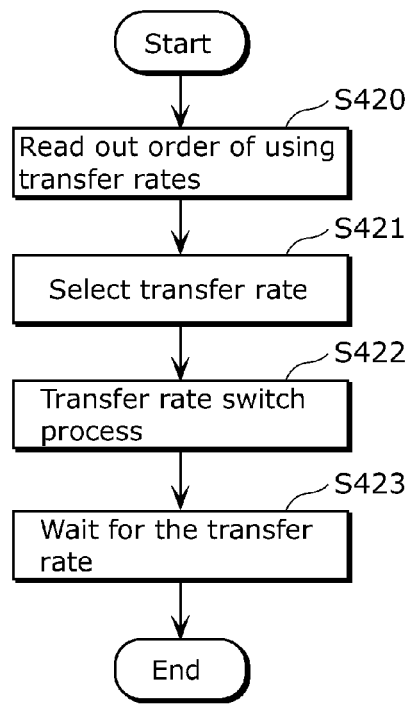
FIG. 18 is a flowchart illustrating a transfer rate change processing by a transfer rate setting unit according to the embodiment 1.

FIG. 18 is a flowchart illustrating the transfer rate change processing by the transfer rate setting unit 202 according to the embodiment 1.

First, the transfer rate setting unit 202 reads out the order of using the transfer rates which is stored in the storage unit 208 (S420).

Next, the transfer rate setting unit 202 selects a transfer rate of the next sub-SF period, which is specified as the order of using the transfer rates, (S421) and switches the frequency channel to the selected frequency channel (S422).

Then, the transfer rate setting unit 202 pauses the processing until the selected transfer rate's turn arrives (S423).

It should be noted that if the transfer rate of the next sub-SF period is a higher rate than the transfer rate currently in use, a different sub-SF period may be selected.

Figure 19:
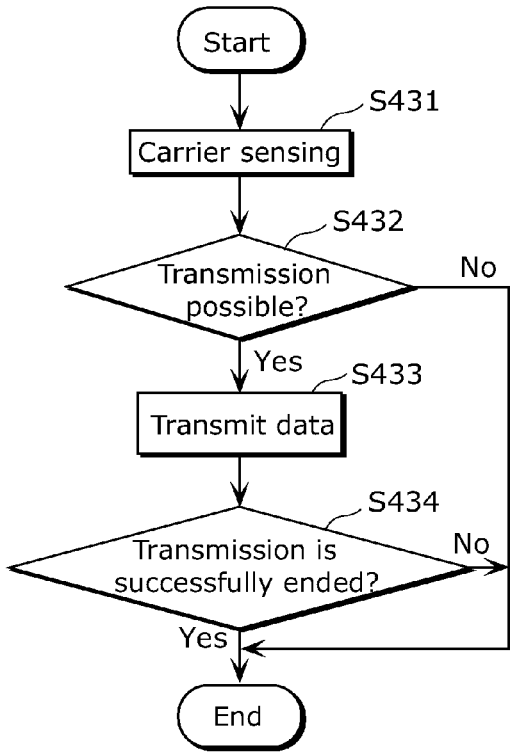
FIG. 19 is a flowchart illustrating processing flow of data transmission by the STA according to the embodiment 1.

FIG. 19 is a flowchart illustrating data transmission processing flow of the STA 200 according to the embodiment 1.

The wireless transmission unit 201 performs, prior to starting of packet transmission, the carrier sensing to determine whether the wireless medium is in the idle state (S431).

If determined, based on a result of the carrier sensing, that the wireless medium is in the idle state (Yes in S432), the wireless transmission unit 201 performs the packet data transmission process (S433). Then, the STA 200 waits for an ACK frame from the AP 100 (S434), and when the STA 200 successfully receives the ACK frame (Yes in S434), the data transmission process ends.

On the other hand, if the wireless medium is not in the idle state (No in S432) and the STA 200 cannot receive the ACK response from the AP 100 (No in S434), the STA 200 ends the processing and performs again the transmission process after the reception process.

It should be noted that the data transmission process performed by the wireless transmission unit 101 included in the AP 100 and the data transmission process performed by the wireless transmission unit 201 are the same.

It should be noted that in the case of transmission failure, the wireless transmission unit 201 and the wireless transmission unit 101 may attempt transmission by performing the carrier sensing for a preset number of times without ending the transmission process, and then end the transmission process.

It should be noted that while the configuration of the super-frame period 310 according to the present embodiment is such that the transfer rate of the sub-SF period 320, which is the first half of the super-frame period, is the high rate and the transfer rate of the sub-SF period 321, which is the last half of the super-frame period, is the low rate, the structure of the super frame is not limited thereto. The transfer rate of the sub-SF period 320, which is the first half of the super-frame period, may be the low rate and the transfer rate of the sub-SF period 321, which is the last half of the super-frame period, may be the high rate. In this case, if the data transmission fails at the high rate, the data is retransmitted in the next low rate active period.

It should be noted that the information processing apparatus according to the present embodiment achieves the advantageous effects of the invention without necessarily including all the components shown in FIG. 1 and FIG. 2 described above.

Figure 20:
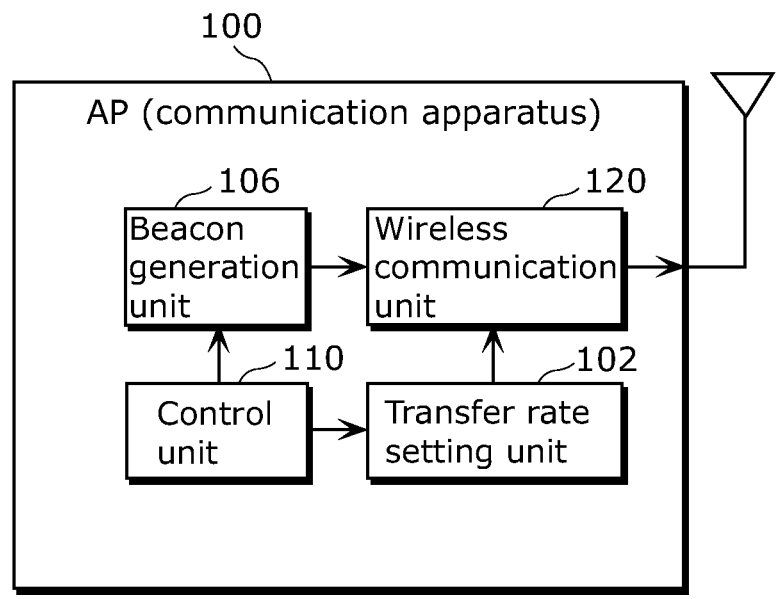
FIG. 20 is a block diagram showing another configuration of the AP according to the embodiment 1.

For example, the AP 100 may be achieved by the AP 100 shown in FIG. 20.

The AP 100 shown in FIG. 20 includes the wireless communication unit 120, the transfer rate setting unit 102, the beacon generation unit 106, and the control unit 110. It should be noted that the wireless communication unit 120 is a wireless communication unit which has the functionality of both the wireless transmission unit 101 and the wireless reception unit 103.

Figure 22:
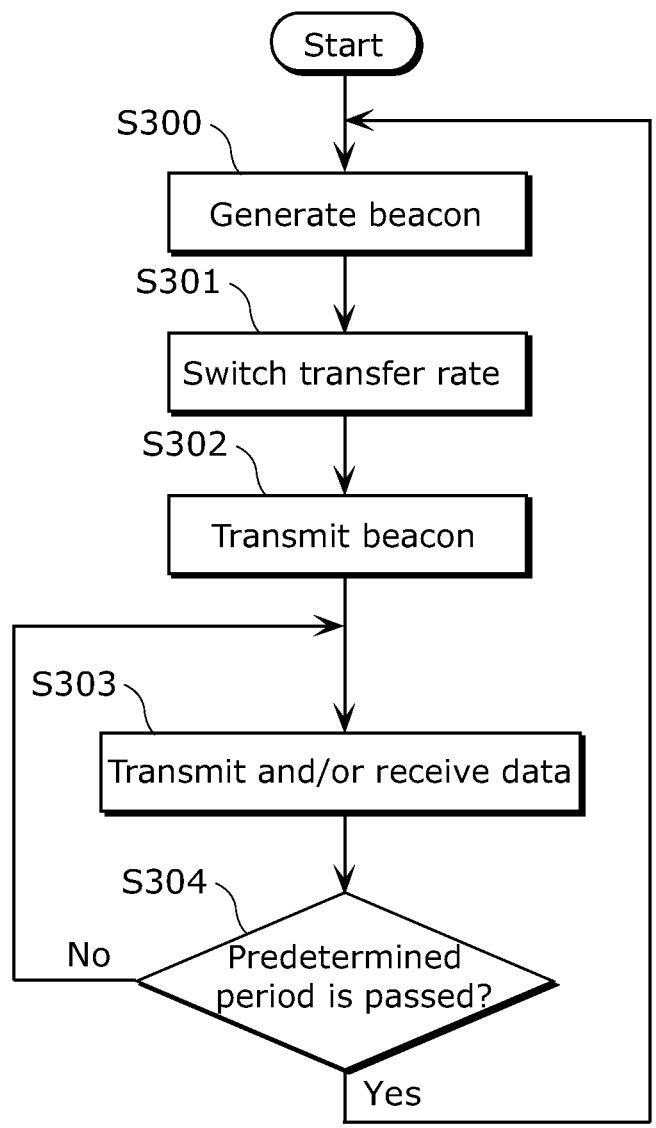
FIG. 22 is a flowchart illustrating communication processing flow in the AP according to the embodiment 1.

FIG. 22 is a flowchart illustrating communication processing flow in the AP 100 shown in FIG. 20.

First, the control unit 110 causes the beacon generation unit 106 to generate a beacon (S300), and, additionally, causes the transfer rate setting unit 102 to switch the transfer rate to the first transfer rate (S301)

Next, the beacon is wirelessly transmitted to all the STAs at the switched transfer rate (S302).

The control unit 110 causes a wireless communication unit 220 to perform data transmission and reception (S303) until a predetermined period indicated by the super-frame information is passed (No in S304). Then, after the period indicated by the super-frame information is passed (Yes in S304), the control unit 110 performs the same processing at the second transfer rate different from the first transfer rate (S300).

Even according to the above configuration, when performing the wireless communication using a plurality of transfer rates, the AP 100 also changes the transfer rate for use to transmit the beacon itself, which is unlike conventional, In general, the purpose of using a plurality of transfer rates is to reduce waste of the communication band in data communication with nearby terminals and to reduce communication error in data communication with distant terminals, The communication apparatus according to the present embodiment provides advantages of using a plurality of transfer rates for the transmission of not only the data body but also the beacon (the control signal). Thus, the advantageous effects of the invention is so achieved that the communication apparatus is provided which allows the multi-rate control having less waste of the communication band as compared to conventional.

Figure 21:
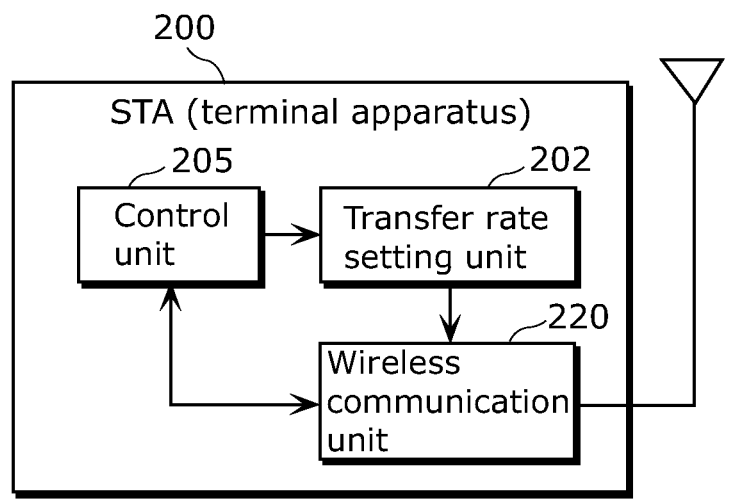
FIG. 21 is a block diagram showing another configuration of the STA according to the embodiment 1.

Moreover, the STA 200 may be achieved as the STA 200 shown in FIG. 21.

The STA 200 shown in FIG. 21 includes the transfer rate setting unit 202, the control unit 205, and the wireless communication unit 220. It should be noted that the wireless communication unit 220 is a wireless communication unit which has the functionality of both the wireless transmission unit 201 and the wireless reception unit 203.

Here, the beacon includes, as described above, the first period, the second period, the first transfer rate which is the transfer rate in association with the first period, and the second transfer rate which is the transfer rate in association with the second period.

Figure 23:
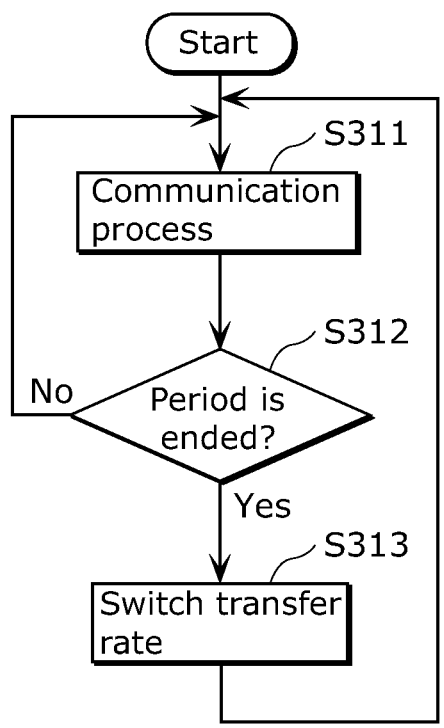
FIG. 23 is a flowchart illustrating communication processing flow in the STA according to the embodiment 1.

FIG. 23 is a flowchart illustrating communication processing flow in the STA 200 shown in FIG. 21.

First, the control unit 205 causes the transfer rate setting unit 202 to set the transfer rate to a predetermined transfer rate. Next, the control unit 205 causes the wireless communication unit 220 to perform communication process (that is, the beacon reception, and packet transmission/reception to/from the AP 100) (S311). Here, the communication process includes the beacon reception and packet transmission/reception to/from the AP 100.

Here, after the reception of the beacon, the control unit 205 causes the transfer rate setting unit 202 to set the transfer rate to the first transfer rate. Subsequently, the packet transmission/reception to/from the AP 100 is performed at the first transfer rate (S311) until the first period is passed (No in S312).

After the first period is passed (Yes in S312), the control unit 205 causes the transfer rate setting unit 202 to set the transfer rate to the second transfer rate, and, subsequently, the communication process is performed at the second transfer rate (S311) until the end of the second period (No in S312). Subsequently, the control unit 205 repeats the same processing.

According to the above configuration, the STA 200 can share the schedule of the multi-rate control by the AP 100 with the AP 100. As a result, the terminal apparatus can be provided which allows the multi-rate control having less waste of the communication band at the reception of not only the data body but also the beacon (the control signal), as compared to conventional.

Embodiment 2

An embodiment 2 is different from the embodiment 1 in that an AP 100 transmits an announced transfer rate switch time in a beacon in the embodiment 2. It should be noted that, hereinafter, both an announced low rate switch time and an announced high rate switch time are referred to as the announced transfer rate switch time, The details will be described below.

FIG. 24 is a schematic view showing information (superframe information) included in the beacon which is transmitted by the AP 100 according to the present embodiment.

As shown in FIG. 24, the beacon according to the present embodiment is the beacon according to the embodiment 1 that further includes the announced low rate switch time which is the announced transfer rate switch time (hereinafter, also referred to as a first time). Here, it is assumed that a time T1 is specified as the announced transfer rate switch time.

The announced transfer rate switch time is information whereby the STA 200 is announced that the transfer rate is to be switched, by the AP 100 transmitting a low rate switch notification to the STA 200, depending on an error rate at the time T1. Thus, the time T1 is specified within a high rate active period. Here, the error rate is a value (for example, a value obtained by dividing the number of failed receptions by a total number of receptions) corresponding to the number of times the AP 100 has failed to receive a data signal transmitted from the STA 200.

Hereinafter, more specific description will be given.

Figure 25:
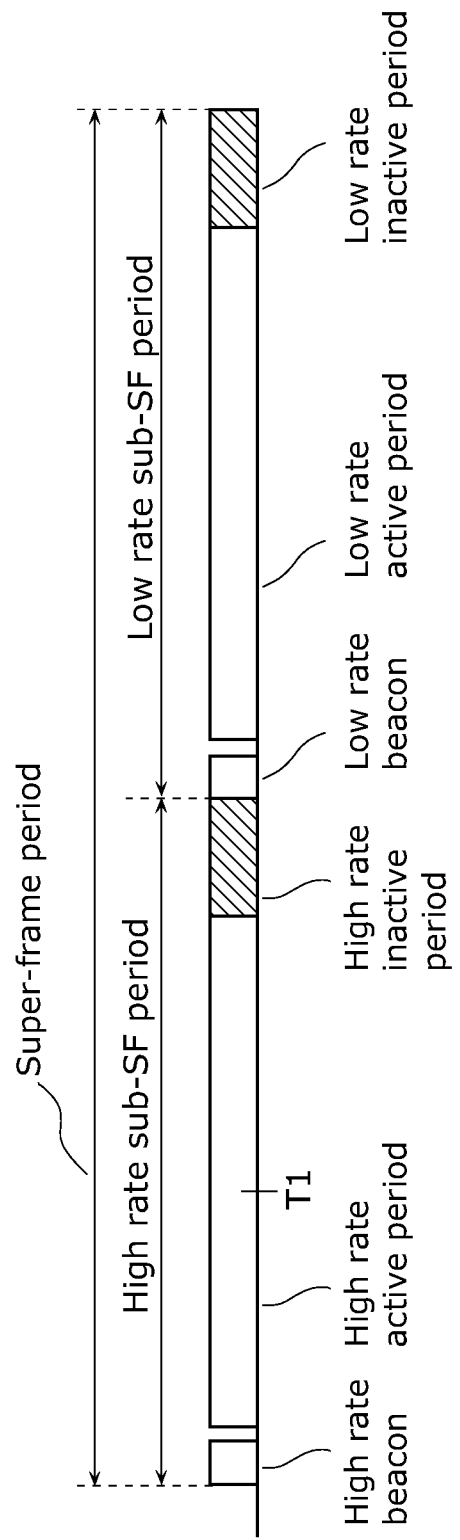
FIG. 25 is a first schematic view showing a switch time of a transfer rate of an STA according to the embodiment 2.

FIG. 25 is a first schematic view showing switch time of a transfer rate of the STA 200 according to the present embodiment.

At the time T1 specified by a high rate beacon, the control unit 205 included in the STA 200 causes the transfer rate setting unit 202 to switch the transfer rate to the low rate to receive the low rate switch notification which can be transmitted from the AP 100. The low rate switch notification is a control signal which is transmitted at the low rate from the AP 100 when the reception error rate is high. The control unit 205 which is included in the STA 200 and that has received the low rate switch notification causes the transfer rate setting unit 202 to switch the transfer rate to the low rate.

It is assumed that in the case shown in FIG. 25, the error rate at the time T1 is less than a preset threshold value. In this case, the AP 100 does not transmit the low rate switch notification.

When the STA 200 is unable to receive the low rate switch notification at the time T1, the transfer rate setting unit 202 switches the transfer rate again to the high rate, in accordance with an instruction from the control unit 205. Then, after the time T1, the STA 200 operates at the high rate during the high active period preset by the high rate beacon.

Figure 26:
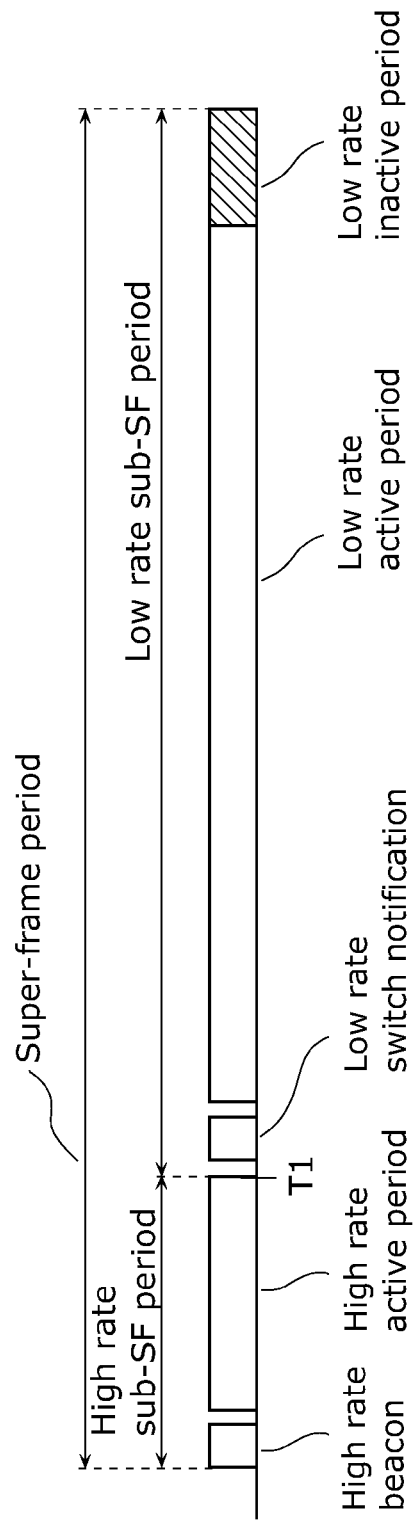
FIG. 26 is a second schematic view showing a switch time of the transfer rate of the STA according to the embodiment 2.

Next, FIG. 26 is a second schematic view showing a switch time of the transfer rate of the STA 200 according to the present embodiment when the error rate at the time T1 is greater than or equal to a threshold value.

If the communication error rate at the time T1 is greater than or equal to the preset threshold value, the control unit 110 included in the AP 100 causes the transfer rate setting unit 102 to set the transfer rate to the low rate. Furthermore, the control unit 110 instructs the wireless transmission unit 101 to transmit, at the time T1, the low rate switch notification to all the STAs 200 at the low rate. The STA 200 having received the low rate switch notification thereafter operates at the low rate until the low rate inactive period specified by the high rate beacon starts.

That is, in the present embodiment, the beacon further includes the first time (the announced transfer rate switch time) which is a time within a first period. In the present embodiment, the first period is a period from a start time 504 of the high rate to when a high rate active period 505 is passed.

If the error rate which is the value corresponding to the number of times the wireless communication unit has failed to wirelessly receive the data signal is greater than or equal to a predetermined first threshold value at a first time T1, the control unit 110 included in the AP 100 causes the transfer rate setting unit 102 to set the transfer rate to a second transfer rate (the low rate in the present embodiment). Furthermore, the control unit 110 causes the wireless communication unit to wirelessly transmit to all the terminal apparatuses the low rate switch notification which is the control signal for setting the transfer rate of the terminal apparatuses to the second transfer rate.

Moreover, the control unit 205 included in the STA 200 causes the transfer rate setting unit 202 to set, at the first time T1, the transfer rate to the second transfer rate (that is, the low rate) and determines whether the wireless communication unit has received at the second transfer rate the low rate switch notification which is the control signal.

If the low rate switch notification is not received by the wireless communication unit, the control unit 205 causes the transfer rate setting unit 202 to set the transfer rate to a first transfer rate (that is, the high rate), and, if the low rate switch notification is received by the wireless communication unit, the wireless communication unit does not cause the transfer rate setting unit 202 to change the transfer rate.

Next, more specific description will be given, with reference to FIG. 27.

Figure 27:
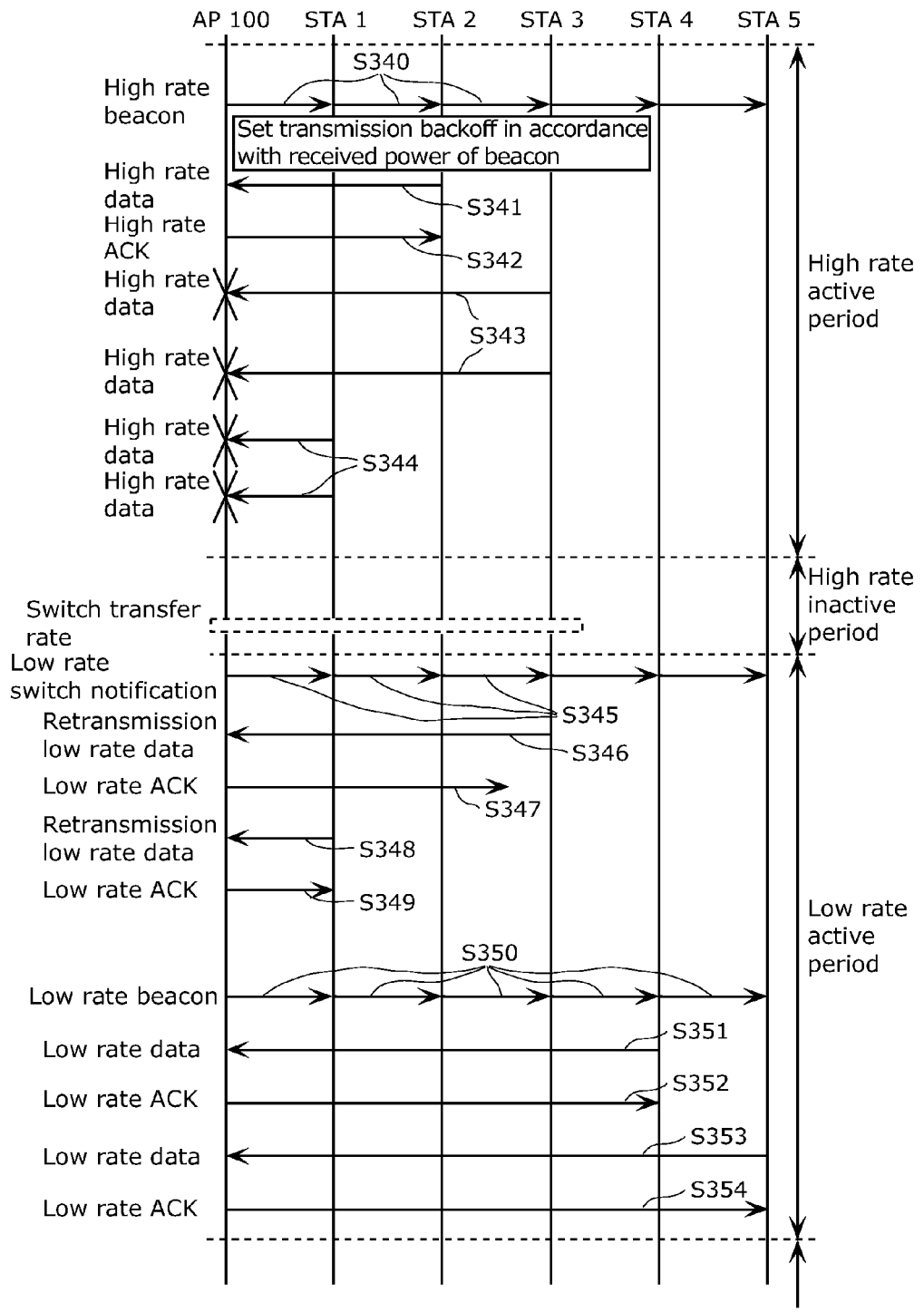
FIG. 27 is a diagram showing a communication sequence according to the embodiment 2 between the AP and the STAs.

FIG. 27 is a diagram showing a communication sequence according to the embodiment 2 between the AP 100 and the STAs 1 to 5.

Here, it is assumed that the STAs 1 to 3 operate at the high rate and the STAs 4 and 5 operate at the low rate. Specifically, it is assumed that the STAs 1 to 3 use the high rate of 100 kbps to communicate with the AP 100 in the high rate active period. Moreover, it is assumed that the STAs 4 and 5 use the transfer rate of 20 kbps to communicate with the AP 100 in a low rate active period.

In FIG. 27, once the high rate active period starts, the AP 100 first transmits the high rate beacon to all the STAs in the wireless network. The frame control is attached with a code indicating a frame type, and if the frame type indicates beacon, payload is inserted with beacon payload.

The AP 100 stores, in the storage unit 111, frequency channel availability information together with a super-frame period and sub-SF periods which are the super-frame information of the wireless network. The frequency channel availability information is created by the AP 100 determining whether the frequency channel is available by measuring the received power of all the frequency channels at a moment when the AP 100 opens up the wireless network.

Moreover, the AP 100 determines availability of the frequency channel, based on information such as conditions of communication with the STA at the transfer rate switched for each sub-SF period or based on duration of unreceivable state due to the carrier sensing, and continuously updates the frequency channel availability information.

The AP 100 selects two transfer rates from among transfer rates supported by the AP 100, and stores the selected transfer rates in the storage unit 111.

The AP 100 reads out, from the storage unit 111, the super-frame period, a start time of each sub-SF period, the transfer rate for each sub-SF period, an active period for each sub-SF period, and the announced transfer rate switch time to create a beacon in a beacon payload format shown in FIG. 24.

Here, the sub-SF period number in the order of using the transfer rates in the high rate beacon is 1. The created beacon is modulated by the wireless transmission unit 101 and transmitted via the antenna 113.

The high rate beacon transmitted by the AP 100 is received by the STA 1 to the STA 3 operating at the high rate (S340).

When successfully received the high rate beacon, the STAs 1 to 3 parse the payload in the high rate beacon and store the super-frame information in the storage unit 111.

Next, the STAs 1 to 3 perform the carrier sensing and transmit packets. Here, it is assumed that the data is transmitted by the STA 2, the STA 1, and the STA 3 in the stated order.

The AP 100 successfully receives the data from the STA 2 (S341) and transmits an ACK frame as a successful reception response to the STA 2 (S342).

Next, it is assumed that the AP 100 fails reception of data signals that are transmitted from the STA 1 and the STA 3 at the high rate (S343 and S344).

If the packet reception fails greater than or equal to a preset number of times by the time T1, the control unit 110 included in the AP 100 determines that the low rate switch notification is to be transmitted at the time T1. Here, it is assumed that the predetermined number of failed data receptions is 2. The control unit 110 fails the reception of packets from the STA 1 and the STA 3, and thus determines that the low rate switch notification is to be transmitted.

Thus, the control unit 110 causes the transfer rate setting unit 102 to switch the transfer rate to the low rate when the time T1 arrives. Then, the control unit 110 causes the wireless transmission unit 101 to transmit the low rate switch notification (S345).

On the other hand, the transfer rate setting unit 202 included in each of the STAs 1 to 3 switches the transfer rate to the low rate at the time T1 in advance, and waits and receives the low rate switch notification.

Upon reception of the low rate switch notification, the STAs 1 to 3 determine that the transfer rate of the AP 100 is to be switched to the low rate after the reception, and thus thereafter the STAs 1 to 3 operate at the low rate.

Furthermore, the STA 1 and the STA 3 retransmit, at the low rate, the data that could not be transmitted by the STA 1 and the STA 3 at the high rate (S346 and S348). Here, it is assumed that the AP 100 receives the retransmitted data, and then an ACK transmitted by the AP 100 is successfully received by the STA 1 and the STA 3 (S347 and S349).

Next, the AP 100 transmits a low rate beacon to all the STAs at the start time of a preset low rate sub-SF period.

Here, the sub-SF period number in the order of using the transfer rates in the beacon is 2, Upon successful reception of the low rate beacon, the STAs 1, 3, 4, and 5 that are active during the low rate active period each parse payload in the beacon and store the super-frame information, which includes the order of using the transfer rates, in the storage unit 111 (S350).

Next, the STAs 4 and 5 storing therein the transmission data perform the carrier sensing and transmit packets to the AP 100 (S351 and S353). The AP 100 having successfully received the packets transmits an ACK frame as a successful reception response to the STA 4 and the STA 5 (S352 and S354).

Subsequently, the AP 100 repeats the same sequence.

As described above, the AP 100 according to the present embodiment transmits the low rate switch notification if the number of failed receptions at the high rate is great. Due to this, the AP 100 retransmits the data that has failed to be transmitted at the high rate, by dynamically prolonging the low rate active period. This achieves low delay of communication.

Moreover, prolonging the low rate active period reduces in advance the probability collision with data transmitted by the STA that performs transmission at the low rate, such as the STA 4 and the STA 5, thus enhancing the efficiency of the bandwidth utilization.

It should be noted that while the control unit 110 according to the present embodiment determines that the low rate switch notification is to be transmitted if the error rate at data reception exceeds the threshold value, the criterion for the determination of transmission of the low rate switch notification is not limited thereto. For example, the control unit 110 may determine that the low rate switch notification is to be transmitted if failure rate of transmission data is greater than or equal to a predetermined threshold value.

Moreover, while the control unit 110 included in the AP 100 according to the present embodiment determines that the low rate switch notification is not to be transmitted at the time T1 if the error rate at data reception is less than the threshold value, the present invention is not limited thereto. For example, the control unit 110 may expressly present to the STA the continuation of the high rate active period by setting, to the data body of the low rate switch notification, information representing that the high rate active period continues after the time T1, and transmitting the low rate switch notification.

It should be noted that the control unit 110 included in the AP 100 may, but not limited to, determine the failure of data reception by ECC check of MAC, For example, the control unit 110 may acquire predetermined data reception intervals from an application (not shown) in advance and determine that the reception is failed if the actual data reception intervals are longer than the predetermined data reception intervals. Furthermore, the transmission data generation unit 204 included in the STA 200 may include a predetermined transmission time of the next data in the transmission data and the control unit 110 may determine that the reception is failed if the control unit 110 does not receive the data when the predetermined time is passed.

It should be noted that the control unit 205 included in the STA 200 according to the present embodiment may further use a backoff in accordance with the received power of the beacon. In the following, more specific description will be given.

Prior to causing the wireless transmission unit 201 to wirelessly transmit the packet, the carrier sensing which is a process of determining whether other terminal apparatus is performing wireless transmission need be performed.

If it is determined, as a result of the carrier sensing, that no other terminal apparatus is wirelessly transmitting a packet, a backoff time, which is a wait time until when the wireless transmission unit 201 is caused to perform the wireless transmission after the carrier sensing is performed, is set and the wireless transmission unit 201 is caused to transmit a packet after the carrier sensing and the backoff time is passed.

The control unit 205 included in the STA 200 then sets a large backoff value so that, as shown in FIG. 28A, the smaller the received power of the beacon previously received from the AP 100, the longer the backoff time until the transmission is performed in response to the beacon.

Subsequently, the wireless transmission unit 201 periodically subtracts the backoff value by one, assumes, when the backoff value reaches 0, that the backoff time is passed, and causes the wireless transmission unit 201 to wirelessly transmit the packet.

For example, as shown in FIG. 28B, it is assumed that the control unit 205 included in the STA 2 determines the backoff value for the STA 2 to be 3, and the control unit 205 included in the STA 1 determines the backoff value for the STA 1 to be 31.

In this case, the wireless reception unit 203 included in the STA 2 wirelessly transmits a packet earlier in time than the wireless reception unit 203 included in the STA 1 does.

By the STA 200 using the backoff, the following advantages are provided.

It is conceivable, from a large received power of the beacon, that the STA 200 is near the AP 100 and thus is an STA 200 that has high possibility of successful communication with the AP 100.

Thus, by preferentially allowing the STA 200 having the high possibility of successful communication to transmit data to the AP 100, the possibility of successful communication between the AP 100 and the STA 200 by the announced transfer rate switch time T1 can be enhanced. As a result, it is possible to prevent degradation of the efficiency of the communication band due to a fact that after the transfer rate is switched from low rate to high rate at T1, data transmission by the STA, which originally has high possibility of successful communication, is performed undesirably at the low rate.

It should be noted that, in the present embodiment, the number of announced transfer rate switch times may not be limited to one, and, for example, two announced transfer rate switch times may be used. In the following, more specific description will be given, with reference to FIG. 29 and FIG. 30.

Figure 29:
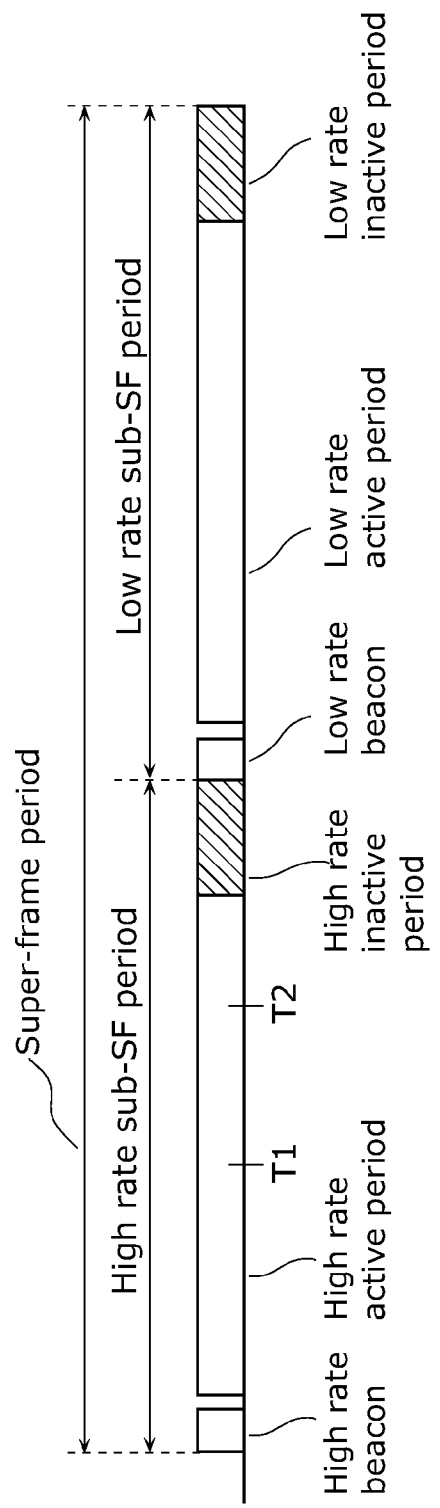
FIG. 29 is a diagram showing a super-frame period when two announced low rate switch times (T1 and T2) are set in the embodiment 2.

FIG. 29 is a diagram showing the super-frame period when two announced low rate switch times (T1 and T2) are set in the present embodiment, The AP 100 according to the present embodiment transmits the high rate beacon that includes information of the announced low rate switch times T1 and T2. That is, in the present embodiment, the beacon includes two times T1 and T2 that are times in the first period. It should be noted that it is assumed that time T2 is a time later than the time T1. In the present embodiment, the first period is a period from the start time 504 of the high rate to when the high rate active period 505 is passed.

FIG. 29 shows a case where the reception error rate in the wireless reception unit 103 by the announced low rate switch time T2 is less than a preset threshold value. Here, the reception error rate is, for example, obtained by dividing the number of failed receptions, in which an error is found by ECC or the like, by the total number of receptions. In this case, the AP 100 and the STA 200 continues the high rate active period, in which the wireless communication is performed at the high rate, also after the time T2 until a time previously set by the high rate beacon (that is, until the high rate active period 505 is passed).

Figure 30:
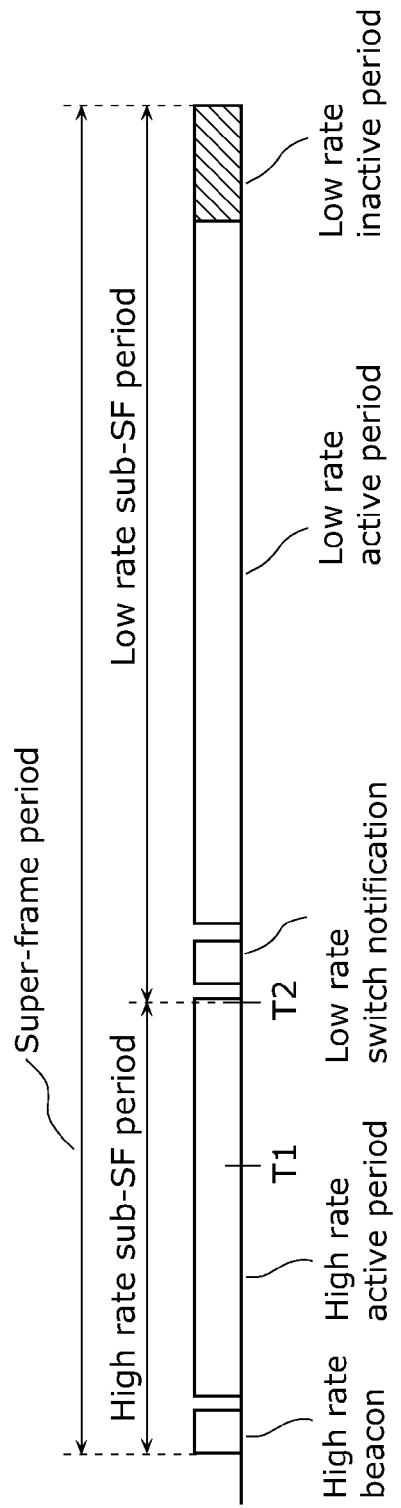
FIG. 30 is a diagram showing a second super-frame period when two announced low rate switch times (T1 and T2) are set in the embodiment.

FIG. 30 is a diagram showing a second super-frame period in the case where two announced low rate switch times (T1 and T2) are set in the present embodiment.

FIG. 30 shows a case where the reception error rate in the wireless reception unit 103 is less than the threshold value at the announced low rate switch time T1 and the error rate is greater than or equal to a preset threshold value at the announced low rate switch time T2.

In this case, the control unit 110 included in the AP 100 causes the wireless transmission unit 101 to transmit the low rate switch notification at the announced low rate switch time T2. As a result, after the time T2, (although it is prior to the start time 507 of the low rate previously determined by the high rate beacon) the AP 100 and the STA 200 set the transfer rate to the low rate and perform wireless communication.

It should be noted that the threshold values used for the time T1 and used for the time T2 may be different threshold values.

That is, if the error rate is less than a predetermined first threshold value at the first time T1 and the error rate is greater than or equal to a predetermined second threshold value at the second time T2, the control unit 110 included in the AP 100 causes the transfer rate setting unit 102 to set the transfer rate to the second transfer rate (that is, the low rate). The control unit 110 included in the AP 100 causes the wireless communication unit (that is, the wireless transmission unit 101) to transmit, to all the terminal apparatuses, the low rate switch notification which is a control signal for setting the transfer rate of the terminal apparatuses to the second transfer rate.

It should be noted that even when two announced low rate switch times are used, the STA waits at the low rate at the time T1 and the time T2 in advance to receive the low rate switch notification. Here, upon reception of the low rate switch notification, the STA subsequently performs transmission and reception at the low rate. On the other hand, if the low rate switch notification is not received by the STA, the STA continues the transmission and the reception at a transfer rate in accordance with the super-frame information included in the high rate beacon received by the STA at the start of the super frame period.

Figure 31:
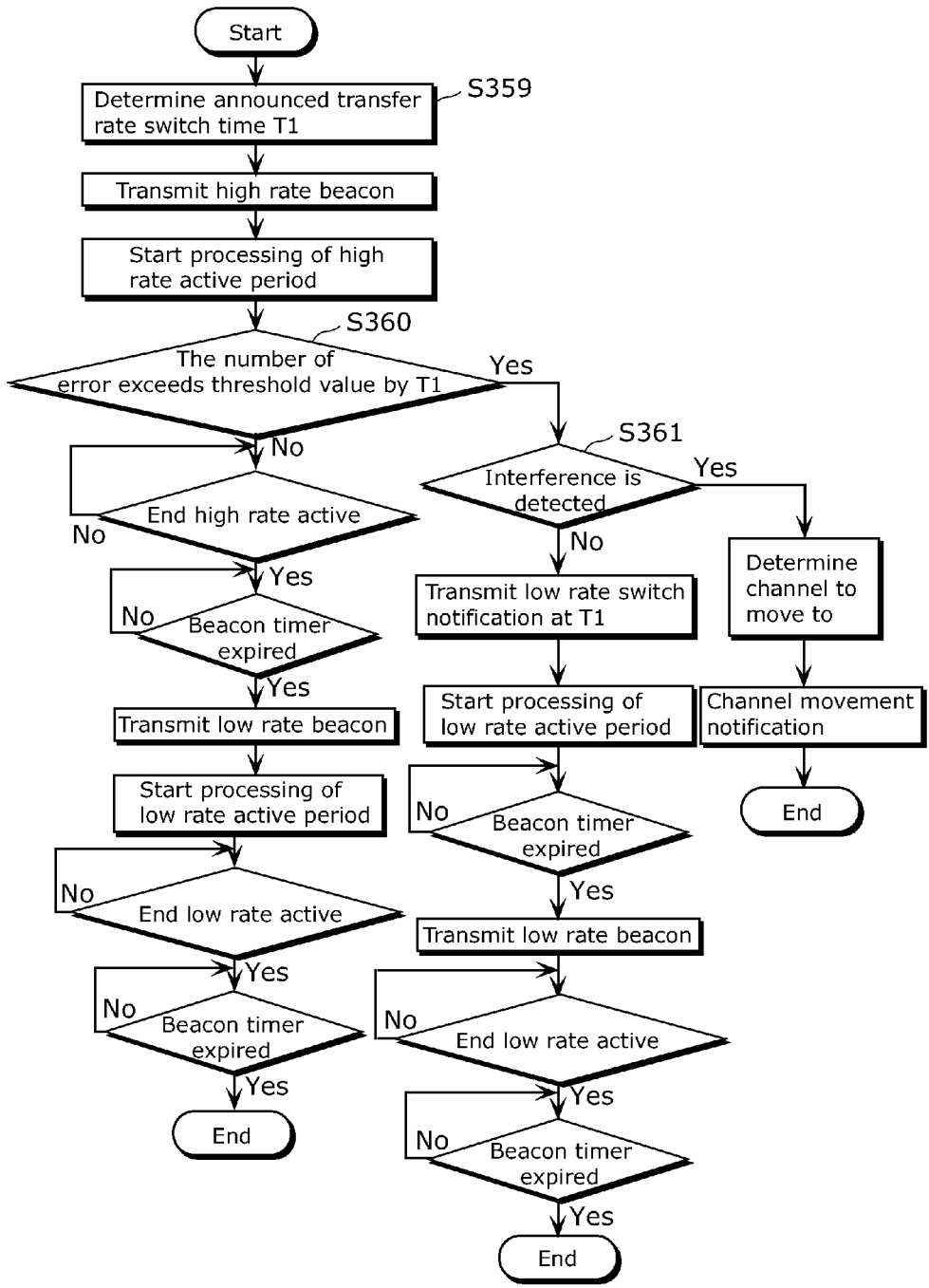
FIG. 31 is a flowchart illustrating processing flow of the AP according to the embodiment 2.

FIG. 31 is a flowchart illustrating a processing flow of the AP 100 according to the present embodiment.

In FIG. 31, the control unit 110 determines the announced low rate switch time T1 (S359). Next, the wireless transmission unit 101 transmits the high rate beacon having information of T1 set thereto. Then, the wireless transmission unit 101 and the wireless reception unit 103 perform data transmission and reception therebetween at the high rate.

During the data transmission and reception at the high rate, the control unit 110 stores the number of data error (such as the number of failed receptions and the number of failed transmissions).

Next, the control unit 110 determines, at the announced low rate switch time T1, whether the number of data error (or, error rate) exceeds a preset threshold value (S360).

If the number of error (or, error rate) does not exceed the threshold value as a result of the determination (No in S360), the wireless transmission unit 101 does not transmit the low rate switch notification and continues the high rate active period until the time set by the high rate beacon. The wireless transmission unit 101 then goes to sleep in the inactive period, and switches the transfer rate to the low rate after the expiration of the beacon timer. Then, the wireless transmission unit 101 transmits the low rate beacon to start processing of the low rate active period.

Next, the AP 100 continues the low rate active period until the time set in the low rate beacon. The AP 100 then goes to sleep in the inactive period, returns to the start of the processing after the expiration of the beacon, and operates at the high rate.

If the number of error (or, error rate) by the time T1 exceeds the preset threshold value (Yes in S360), the control unit 110 determines whether interference is occurring in the own apparatus (S360).

In the case of occurrence of the interference (Yes in S361), the control unit 110 determines that the frequency channel is to be changed to clear other frequency channel. The control unit 110 causes the wireless transmission unit 101 to inform all the STAs of channel movement notification and ends the processing. Then, from the next super-frame period, the AP 100 operates in a destination frequency channel.

On the other hand, in the case where no interference is occurring in the own apparatus (No in S361), the control unit 110 causes the wireless transmission unit 101 to transmit, at the time T1, the low rate switch notification. Moreover, the transfer rate setting unit 102 switches the transfer rate to the low rate. Then, the wireless transmission unit 101 and the wireless reception unit 103 perform data transmission and reception at the low rate.

After the expiration of the beacon timer, the control unit 110 causes the wireless transmission unit 101 to transmit the low rate beacon. Then, the low rate active period continues until the time set in the low rate beacon. Then, the AP 100 goes to sleep during the inactive period, returns to the start of the processing after the expiration of the beacon timer, and operates at the high rate (S359).

Figure 32:
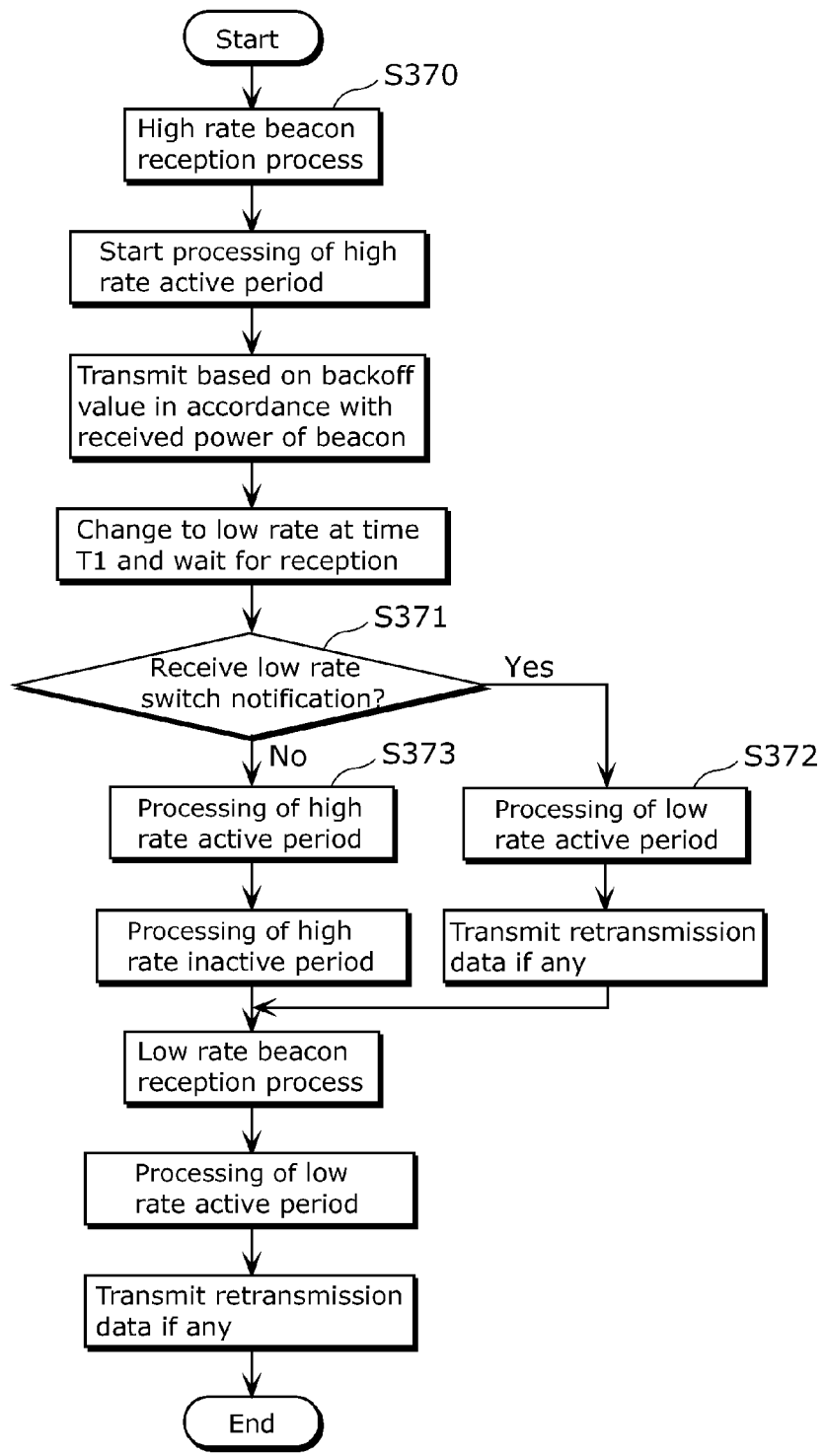
FIG. 32 is a flowchart illustrating processing flow of the STA according to the embodiment 2.

FIG. 32 is a flowchart illustrating processing flow of the STA 200 according to the present embodiment.

Here, it is assumed that the STA 200 initiates connection with the AP 100 at the high rate.

The wireless reception unit 203 receives the high rate beacon in the frequency channel which is specified in a previously specified super-frame period and the like (S370). The wireless transmission unit 201 and the wireless reception unit 203 perform data transmission/reception to/from the AP 100 in the high rate active period specified by the beacon.

The control unit 205 then sets the backoff value in accordance with a value of the received power of the high rate beacon. The wireless transmission unit 201 uses the backoff value to determine timing for data transmission.

Next, the transfer rate setting unit 202 switches the transfer rate to the low rate immediately prior to the announced transfer rate switch time T1. Then, the wireless reception unit 203 waits to receive the low rate switch notification (S371).

If the control unit 205 receives the low rate switch notification (Yes in S371), the control unit 205 determines to operate at the low rate continuously after the reception. As a result, if the wireless transmission unit 201 has data to be retransmitted to the AP 100, the wireless transmission unit 201 retransmits the data at the low rate.

Moreover, if the low rate switch notification is not received by the control unit 205 (No in S371), the control unit 205 recognizes that the high rate active period continues until the time set in the high rate beacon received by the control unit 205 in step S370 and causes the transfer rate setting unit 202 to switch the transfer rate to the high rate. As a result, the wireless transmission unit 201 and the wireless reception unit 203 perform data transmission/reception to/form the AP 100 at the high rate.

Subsequently, the AP 100 and all the STAB go to sleep during the high rate inactive period. Next, the STA 200 starts up if there is data to be retransmitted, receives the low rate beacon and retransmits the data in the low rate active period.

It should be noted that while upon the reception of the low rate switch notification, if there is data to be retransmitted, the control unit 205 included in the STA 200 according to the present embodiment retransmits the data at the low rate, the present invention is not limited thereto. For example, the STA 200 may transmit new transmission data, which is not the data to be retransmitted, at the low rate.

It should be noted that while the control unit 205 according to the present embodiment sets the backoff value, based on the received power of the beacon, the criterion for setting the backoff value is not limited thereto.

The control unit 110 included in the AP 100 may prioritize so that the backoff value is included in data, which is to be transmitted from the own apparatus to the STA 200, in accordance with the received power of data previously received from the STA 200. Specifically, the control unit 110 may calculate, for each STA, an average value of received powers previously received and set a smaller backoff value for the STA that has a larger average value. Moreover, other statistic such as median or quartile may be used instead of the average value.

Furthermore, the control unit 110 may acquire, in advance, information (positional information) whereby the positional relationship with the STA is understood, and using the information, prioritize so that the STA in closer proximity to the own apparatus has a smaller backoff value, The positional information may be acquired from input by a user, or from a position detection device (not shown), such as GPS (Global Positioning System), included in the STA.

Embodiment 3

Next, a transfer rate switch process performed by an AP 100 according to an embodiment 3 of the present invention will be described.

Figure 33:
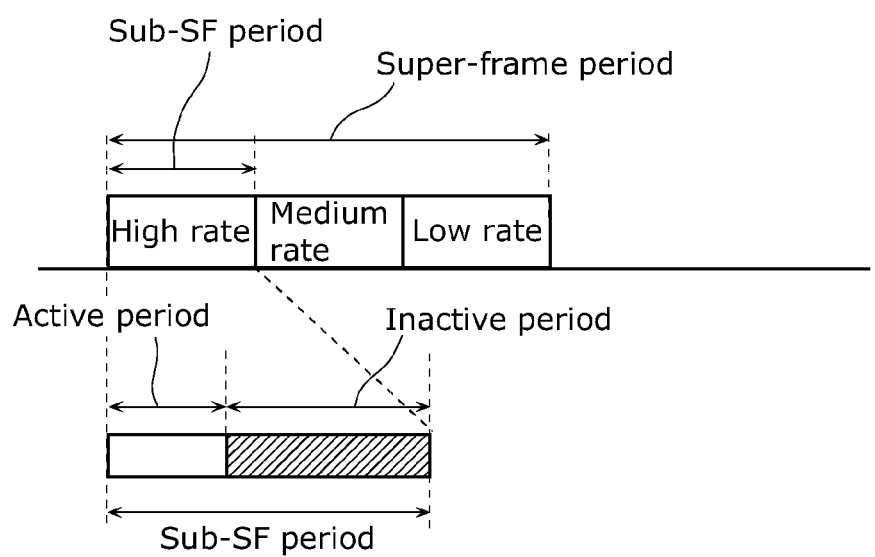
FIG. 33 is a diagram showing a super-frame period according to the embodiment 3.

FIG. 33 is a diagram showing a super-frame period according to the embodiment 3. As shown in FIG. 33, the super-frame period according to the present embodiment includes transfer rates of three types: high rate; medium rate; and low rate. It should be noted that the number of types of the transfer rate may be more than three.

Figure 34:
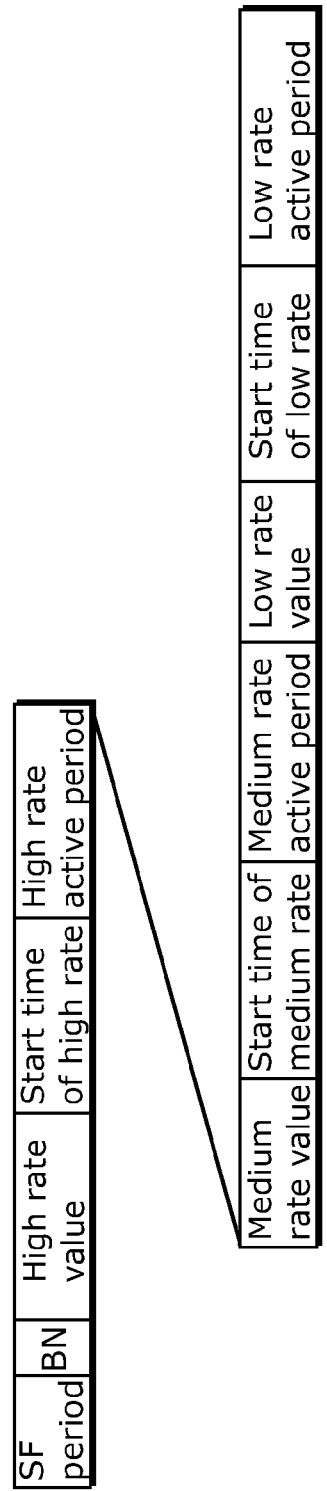
FIG. 34 is a diagram showing a format of beacon payload which is transmitted by an AP according to the embodiment 3 to an STA.

FIG. 34 is a diagram showing a payload format of a beacon to be transmitted by the AP 100 according to the present embodiment to an STA 200.

As shown in FIG. 34, the beacon includes, as super-frame information, information whereby a transfer rate value, a start time, and an active period are specified to each of the three transfer rates which are the high rate, the medium rate, and the low rate.

As described above, the beacon according to the present embodiment includes a first period, a second period, a third period, a first transfer rate which is the transfer rate in association with the first period, a second transfer rate which is the transfer rate that is different from the first transfer rate and in association with the second period, and a third transfer rate which is the transfer rate that is different from a first transmission rate and a second transfer rate and in association with the third period. The first period is, for example, a start time of the high rate. The second period is, for example, a start time of the medium rate. The third period is, for example, a start time of the low rate. The first transfer rate is, for example, the high rate. The second transfer rate is, for example, the medium rate. The third transfer rate is, for example, the low rate.

Here, when causing the wireless communication unit to wirelessly transmit the beacon in the first period, the control unit 110 causes the transfer rate setting unit 102 to set the transfer rate to the first transfer rate.

Moreover, when causing the wireless communication unit to wirelessly transmit the beacon in the second period, the control unit 110 causes the transfer rate setting unit 102 to set the transfer rate to the second transfer rate.

Moreover, when causing the wireless communication unit to wirelessly transmit the beacon in the third period, the control unit 110 causes the transfer rate setting unit 102 to set the transfer rate to the third transfer rate.

This allows appropriate multi-rate control,

Embodiment 4

In the super frame included in the beacon to be transmitted by the AP 100 according to the embodiment 1 to 3 described above, the high rate sub-SF period is specified so as to be prior to the low rate sub-SF period.

On the other hand, in a super frame included in a beacon to be transmitted by an AP 100 according to the present embodiment, a sub-SF period 321 is specified as the first half of a super-frame period and a sub-SF period 320 is specified as the last half of the super-frame period. In this case, the AP 100 transmits the beacon which includes the super-frame information at the low rate.

Figure 35:
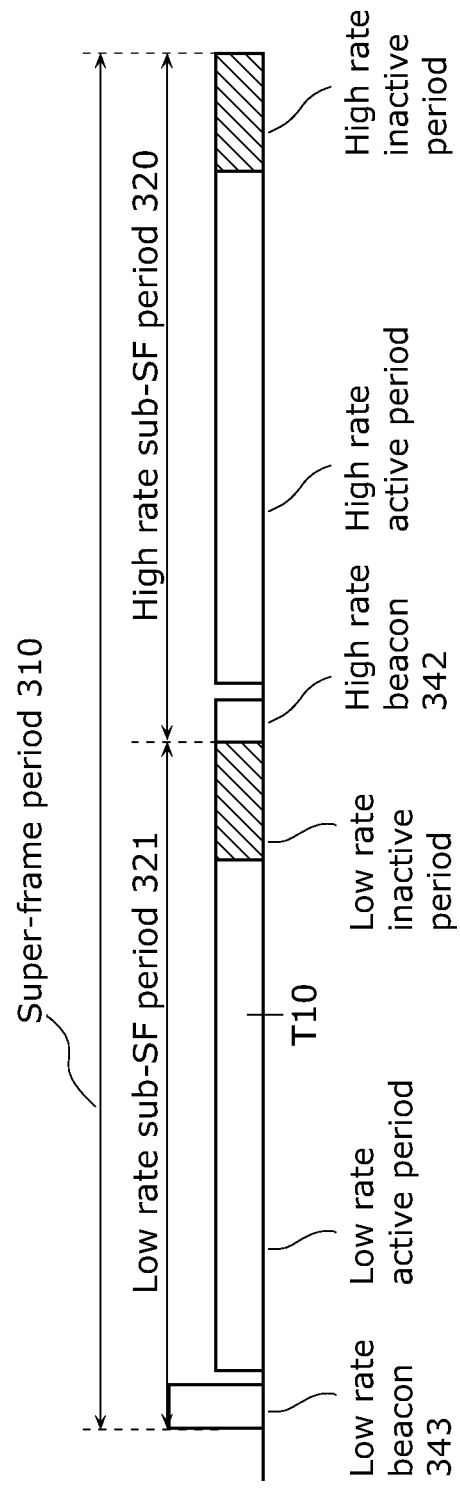
FIG. 35 is a diagram showing a super-frame period according to the embodiment 4.
Figure 36:
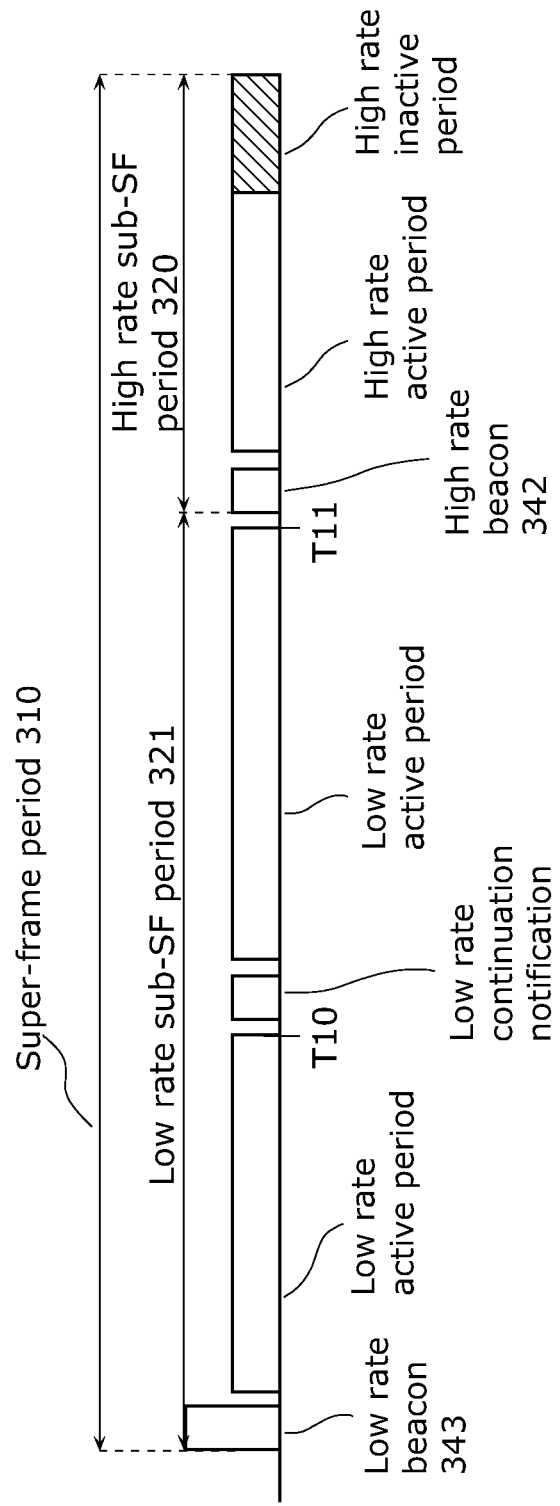
FIG. 36 is a diagram showing a second super frame period according to the embodiment 4.

Furthermore, as shown in FIG. 35 and FIG. 36, a low rate beacon 343 may include an announced low rate continuation time T10. In this case, for example, an control unit 110 included in the AP 100 does not transmit a low rate continuation notification if an error rate by the time T10 is less than a threshold value. In this case, an STA 200 switches the transfer rate to the high rate after the end of the sub-SF period 321 specified in the low rate beacon 343.

On the other hand, if the error rate by the time T10 is greater than or equal to the threshold value, the control unit 110 causes a wireless transmission unit 101 to transmit the low rate continuation notification to all STAs. In this case, the control unit 110 and a control unit 205 prolong the low rate sub-SF period 321 to a time T11 specified by the low rate continuation notification.

That is, in the present embodiment, the beacon further includes the announced low rate continuation time T10 which is a time within a first period. The first period in the present embodiment is a period from a start time of the low rate to when a low rate active period is passed.

Moreover, if the error rate which is a value corresponding to the number of times a wireless communication unit has failed to wirelessly receive a packet (that is, a data signal) is greater than or equal to a threshold value at the announced low rate continuation time T10, the control unit 110 included in the AP 100 according to the present embodiment causes the wireless communication unit to wirelessly transmit, to all terminal apparatuses, the low rate continuation notification which includes a value of a time T11, which is a time within a second period, and is a control signal for keeping the transfer rate of the terminal apparatuses at a first transfer rate (that is, the low rate) until the time T11. The second period according to the present embodiment is a period from a start time of the high rate to when the high rate active period is passed.

It should be noted that the control unit 110 may use other than the error rate or the number of failed receptions, as a criterion for transmitting the low rate continuation notification. For example, the control unit 110 manages the predetermined number of data receptions. The control unit 110 determines the threshold value by, for example, multiplying the predetermined number by a coefficient smaller than 1. The control unit 110 may transmit the low rate continuation notification if the actual number of receptions is less than the determined threshold value.

Figure 37:
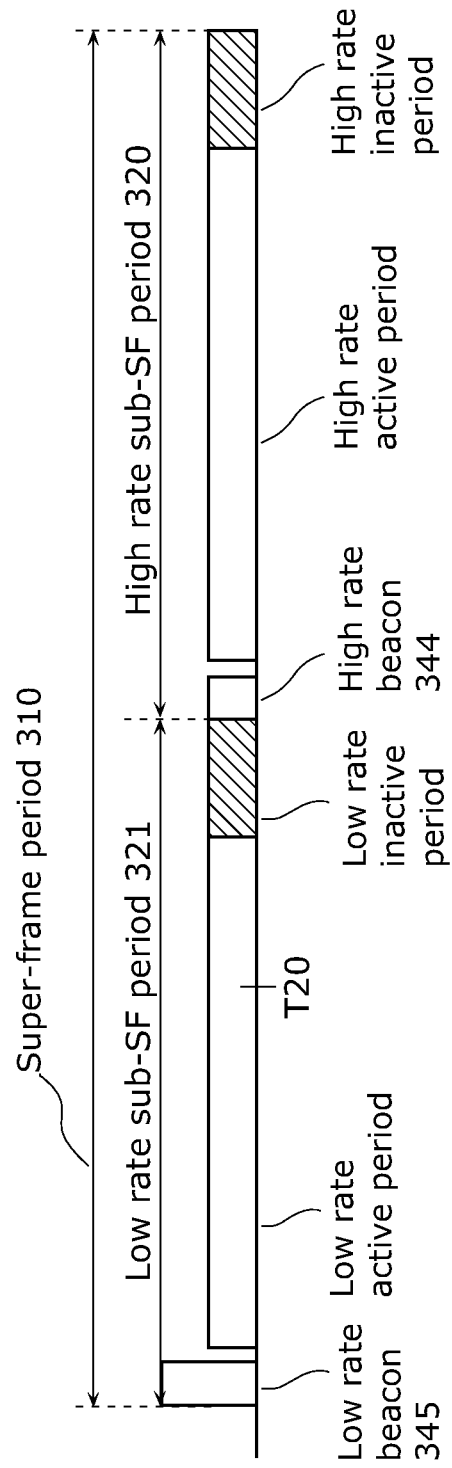
FIG. 37 is a diagram showing a third super-frame period according to the embodiment 4.
Figure 38:
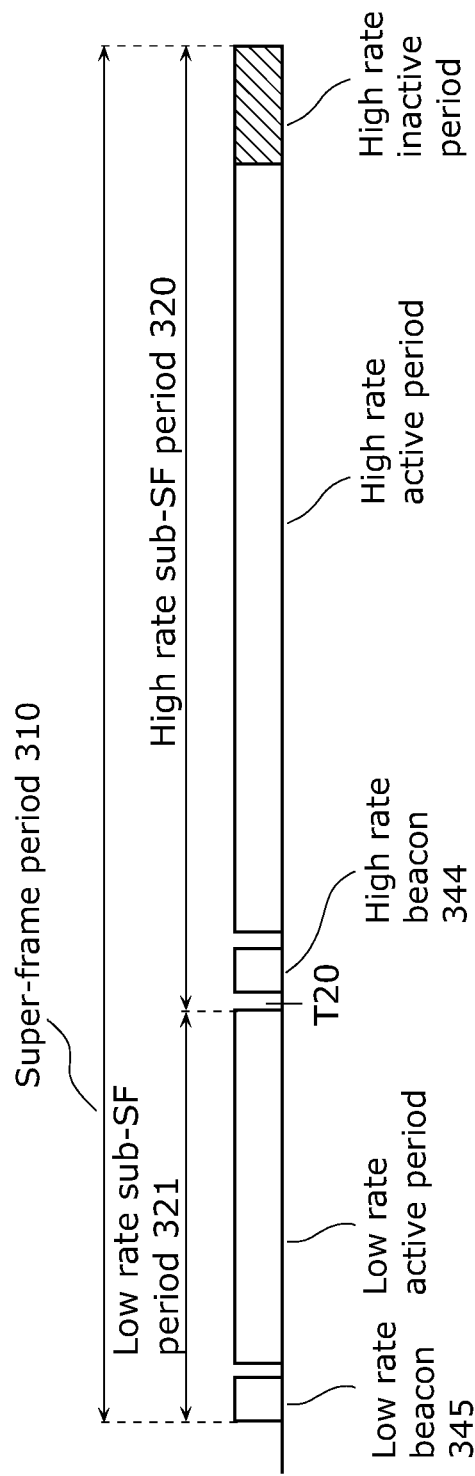
FIG. 38 is a diagram showing a fourth super-frame period according to the embodiment 4.

Still further, as shown in FIG. 37 and FIG. 38, a low rate beacon 345 may include an announced high rate switch time T20. In this case, for example, the control unit 110 included in the AP 100 does not transmit a high rate switch notification if the error rate by the time T20 is greater than or equal to a threshold value. As a result, the AP 100 and the STA 200 operate at the low rate during the sub-SF period 321 specified by the low rate beacon 345.

On the other hand, if the error rate by the time T20 is less than the threshold value, the control unit 110 transmits the high rate switch notification to all the STAs. In this case, the transfer rate setting unit 102 and the transfer rate setting unit 202 switch the transfer rate to the high rate. As a result, the low rate sub-SF period 321 is reduced and the subsequent high rate sub-SF period 320 is prolonged.

It should be noted that the control unit 110 may consider, in addition to the error rate, a value of received power of the reception data as a criterion for switching the high rate switch notification. For example, if an error rate of data of received power, a value of which is less than the threshold value, is less than a threshold value, the control unit 110 may change the transfer rate to the high rate. Moreover, as other way of determination, the control unit 110, for example, manages the predetermined number of data receptions. The control unit 110 determines the predetermined number of data receptions by, for example, multiplying the predetermined number by a coefficient smaller than 1, The control unit 110 may transmit the high rate switch notification if the actual number of receptions is greater than or equal to the determined threshold value.

Figure 39:
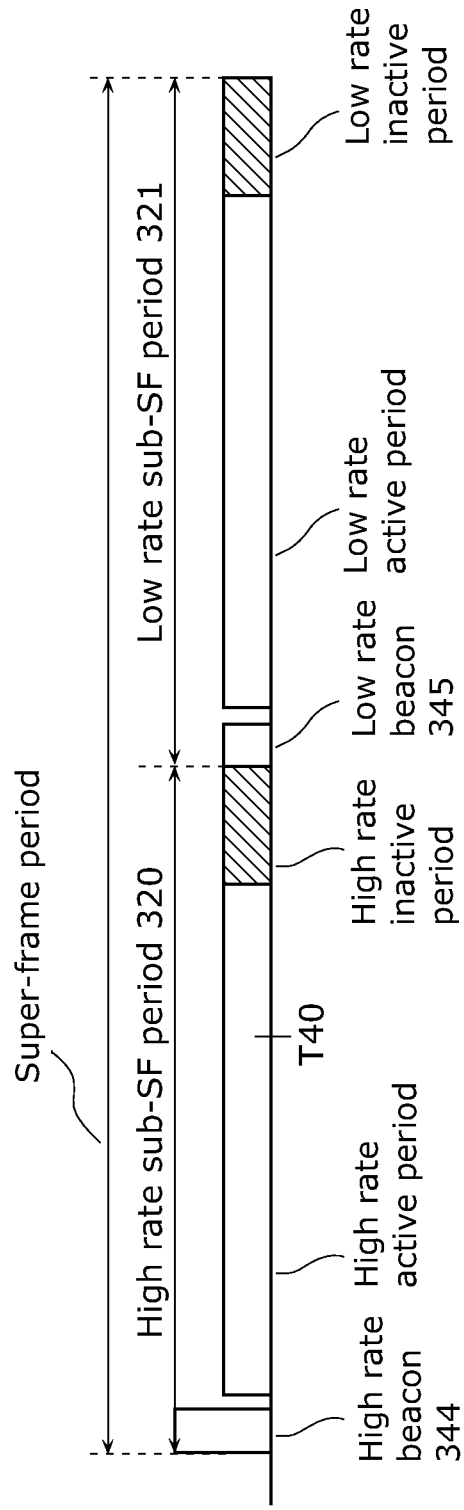
FIG. 39 is a diagram showing a fifth super-frame period according to the embodiment 4.
Figure 40:
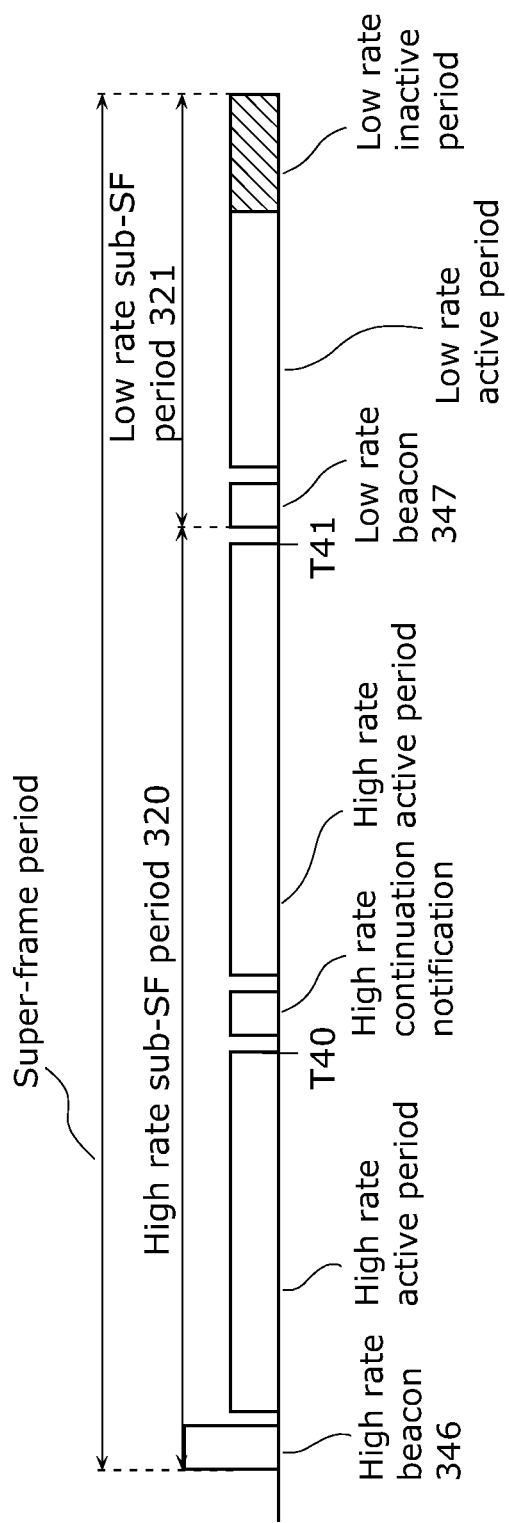
FIG. 40 is a diagram showing a sixth super-frame period according to the embodiment 4.

Still further, as shown in FIG. 39 and FIG. 40, a high rate beacon 346 may include an announced high rate continuation time T40. In this case, for example, the control unit 110 included in the AP 100 does not transmit the high rate continuation notification if the error rate by the time T40 is greater than or equal to a threshold value. As a result, the AP 100 and the STA 200 operate at the high rate in the high rate sub-SF period 320 specified by the high rate beacon 346.

On the other hand, if the error rate by the time T40 is less than the threshold value, the control unit 110 transmits the high rate continuation notification to all the STAs. In this case, the control unit 110 and the control unit 205 prolong the high rate sub-SF period 320 to the time 141 specified by the high rate continuation notification. It should be noted that the control unit 110 may use other than the error rate, as a criterion for transmitting the high rate continuation notification, For example, the control unit 110 may manage the predetermined number of data receptions and transmit the high rate continuation notification if the actual number of receptions is greater (or, less) than a threshold value determined by the predetermined number of receptions determined (by, for example, multiplying the predetermined number by a coefficient smaller than 1).

It should be noted that the control unit 110 included in the AP 100 according to the embodiments 1 to 4 may determine the lengths of the high rate sub-SF period 320 and the low rate sub-SF period 321, in accordance with the transfer rates used by the STAs present in the same wireless network. In the following, the description will be given with reference to FIG. 41A to FIG. 41C.

Figure 41A:
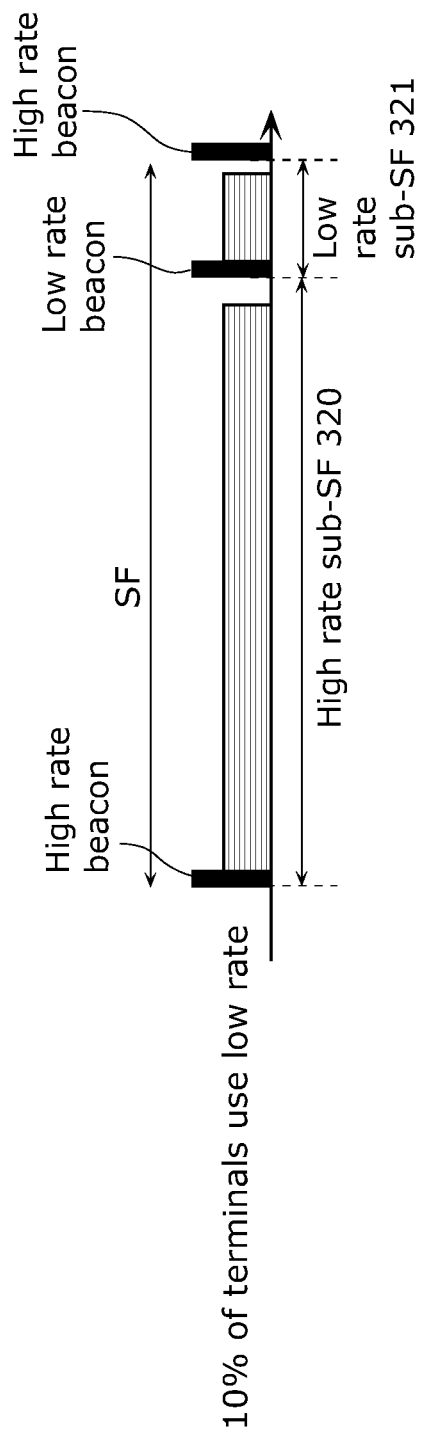
FIG. 41A is a diagram showing an example of a configuration of a super frame when 10% of the STAs use a low transfer rate.
Figure 41B:
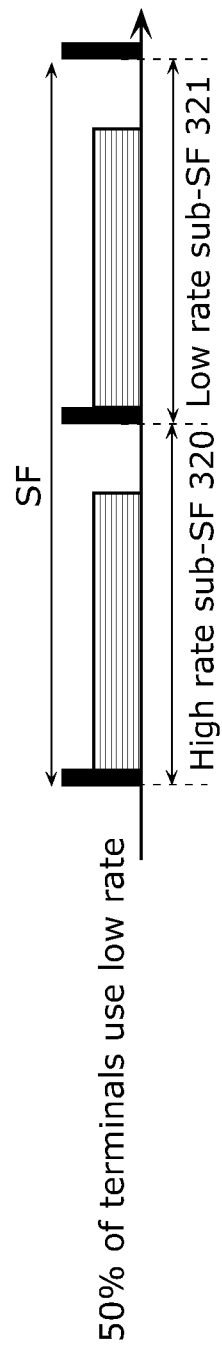
FIG. 41B is a diagram showing an example of the configuration of the super frame when 50% of the STAs use the low transfer rate.

FIG. 41A is a diagram showing an example of a configuration of the super frame when 10% of the STAs use the low transfer rate. Moreover, FIG. 41B is a diagram showing an example of the configuration of the super frame when 50% of the STAs use the low transfer rate. Moreover, FIG. 41C is a diagram showing an example of the configuration of the super frame when 90 of the STAs use the low transfer rate.

Figure 41C:
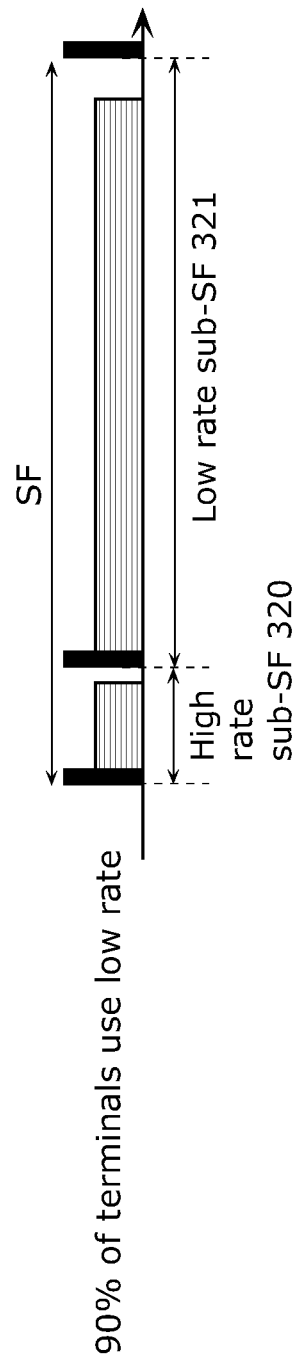
FIG. 41C is a diagram showing an example of the configuration of the super frame when 90% of the STAs use the low transfer rate.

As shown in FIG. 41A to FIG. 41C, if all the STAs are any of low rate STAs and high rate STAs, it is conceivable that the larger the ratio of the low rate STAs (the terminal apparatuses) is, the longer the low rate sub-SF period 321 is set.

That is, the control unit 110 included in the AP 100 according to the embodiments 1 to 4 may cause the beacon generation unit 106 to generate the beacon such that, among the terminal apparatuses, the first period is shorter than the second period as the number of terminal apparatuses that receive the beacon wirelessly transmitted at the first transfer rate is less than the number of terminal apparatuses that receive the beacon wirelessly transmitted at the second transfer rate.

Moreover, values of the transfer rates may further be considered.

Here, for purpose of description, it is assumed that the same number of high rate (100 kbps) STAs and low rate (20 kbps) STAs are present in the same wireless network.

Figure 42A:
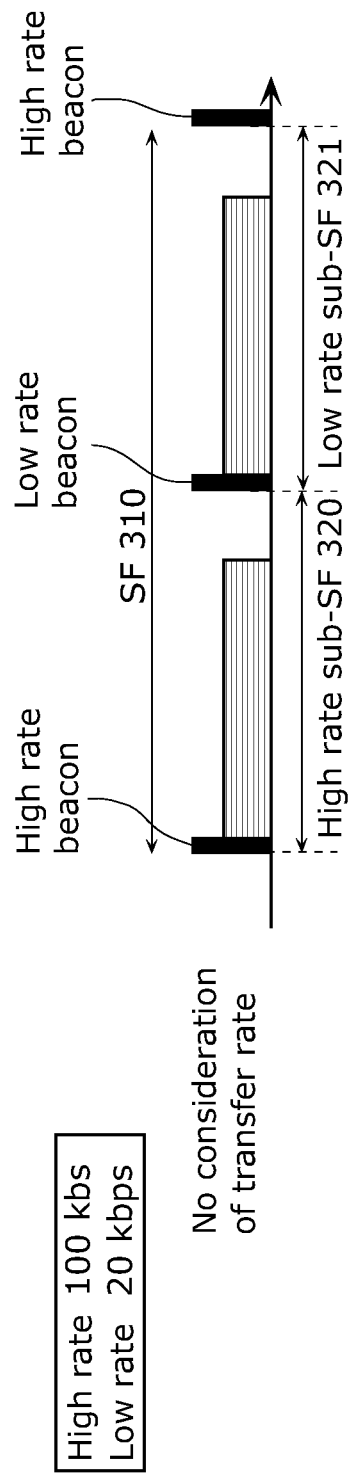
FIG. 42A is a diagram showing an example of the configuration of the super frame when the lengths of the sub-SF periods are determined without consideration of the transfer rates used by the STA in the embodiments 1 to 4.

Moreover, FIG. 42A shows an example of the configuration of the super frame when the lengths of the sub-SF periods are determined without consideration of the transfer rates used by the STA. Furthermore, FIG. 42B shows an example of the configuration of the super frame when the lengths of the sub-SF periods are determined in consideration of the transfer rates used by the STA.

As described above, in the case where "the greater the ratio of the number of low rate STAs among all the STAs, the longer the low rate sub-SF period 321 is set", if the number of STAs at each transfer rate is the same, the lengths of the high rate sub-SF period 320 and the low rate sub-SF period 321 are determined to be the same as shown in FIG. 42A.

Figure 42B:
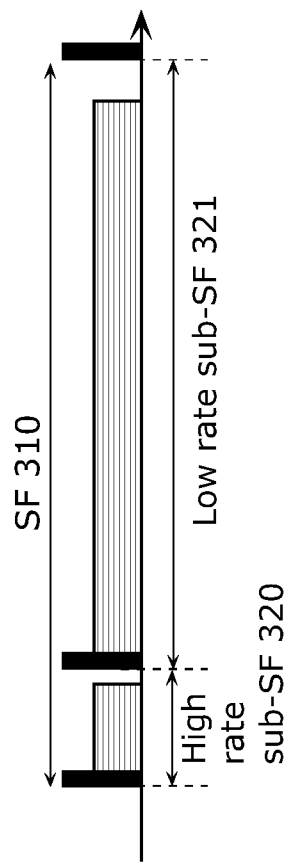
FIG. 42B is a diagram showing an example of the configuration of the super frame when the lengths of the sub-SF periods are determined in consideration with the transfer rates used by the STA in the embodiments 1 to 4.

On the other hand, FIG. 42B shows the case where the sub-SF periods are determined such that "the greater the ratio of the number of low rate STAs, the longer the low rate sub-SF period 321 is set" and "the lower the transfer rate, the longer the sub-SF period corresponding to the transfer rate is set". In this case, the low rate is ⅕ of the high rate. Thus, the control unit 110 determines the low rate sub-SF period 321 to be five times longer than the high rate sub-SF period 320.

That is, the control unit 110 included in the AP 100 according to the embodiments 1 to 4 may cause the beacon generation unit 106 to generate the beacon so that (A) among the terminal apparatuses, the smaller in number the terminal apparatuses that receive the beacon wirelessly transmitted at the first transfer rate is relative to the terminal apparatuses that receive the beacon wirelessly transmitted at the second transfer rate and (B) the greater the first transfer rate is relative to the second transfer rate, the shorter the first period is relative to the second period.

Figure 43:
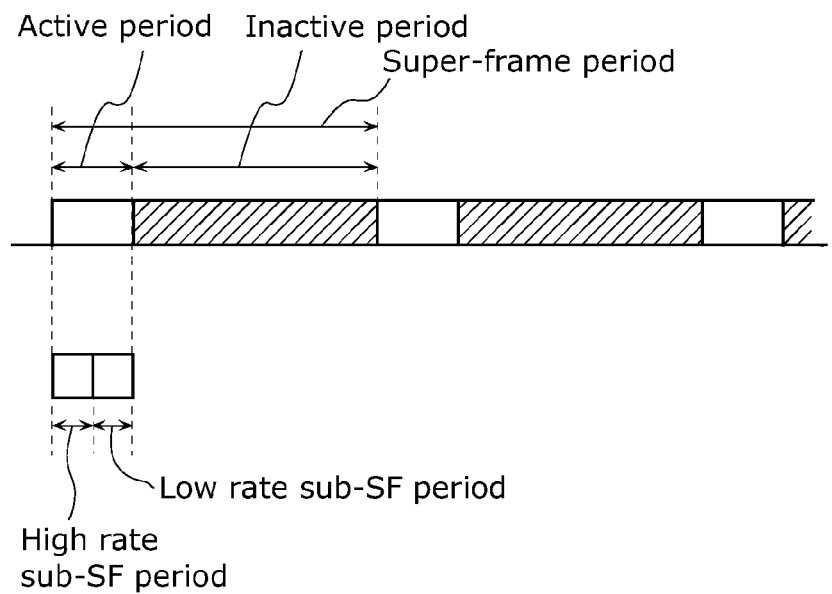
FIG. 43 is a diagram showing another configuration of the sub-SF period in the embodiments 1 to 4.

It should be noted that the configurations of the super frame according to the embodiments 1 to 4 may be a configuration as shown in FIG. 43.

In this case, it is assumed that the first half of the super-frame period is the active period and the last half of the super-frame period is the inactive period, and a plurality of sub-SF periods are set in the active period.

Figure 44:
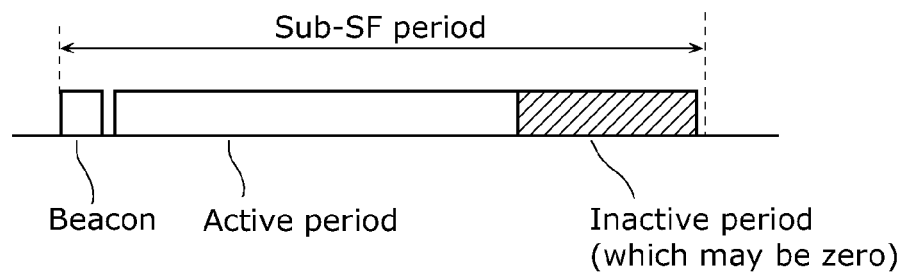
FIG. 44 is a diagram showing details of the other configuration of the sub-SF period in the embodiments 1 to 4.

FIG. 44 is a diagram showing details of the configuration of the sub-SF period. The sub-SF period is started with the beacon and followed by the active period and the inactive period.

The configuration of the super frame allows the STA to have prolonged sleep period, thereby reducing the power consumption.

Figure 45:
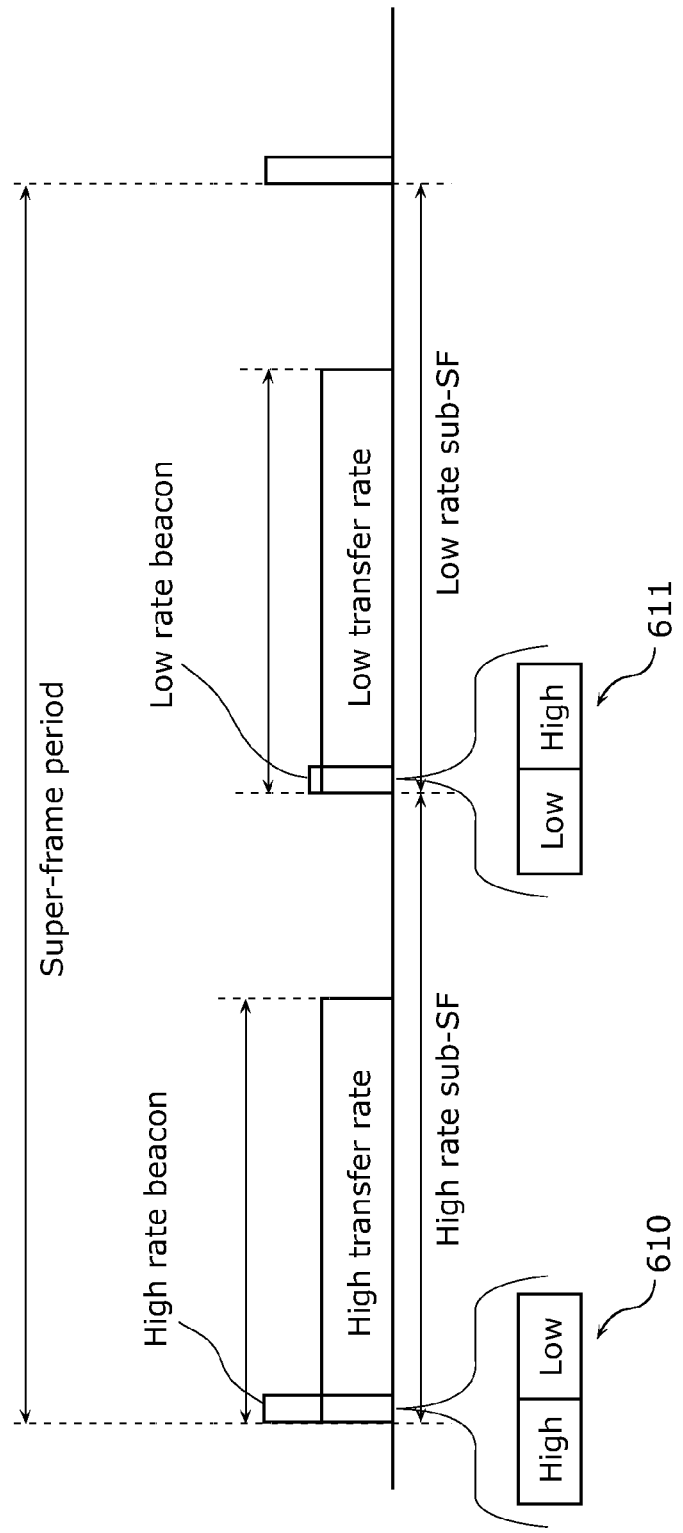
FIG. 45 is a diagram showing another order of using the transfer rates specified in the beacon in the embodiments 1 to 4.
Figure 46:
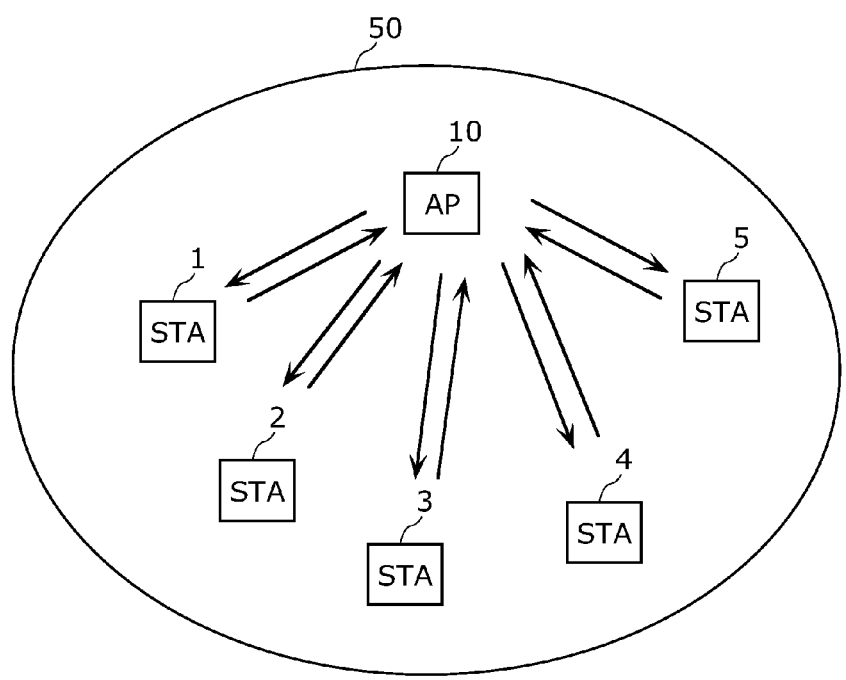
FIG. 46 is a conceptual diagram showing an example of a wireless network of small-size, low-power consumption communication apparatuses.
Figure 47:
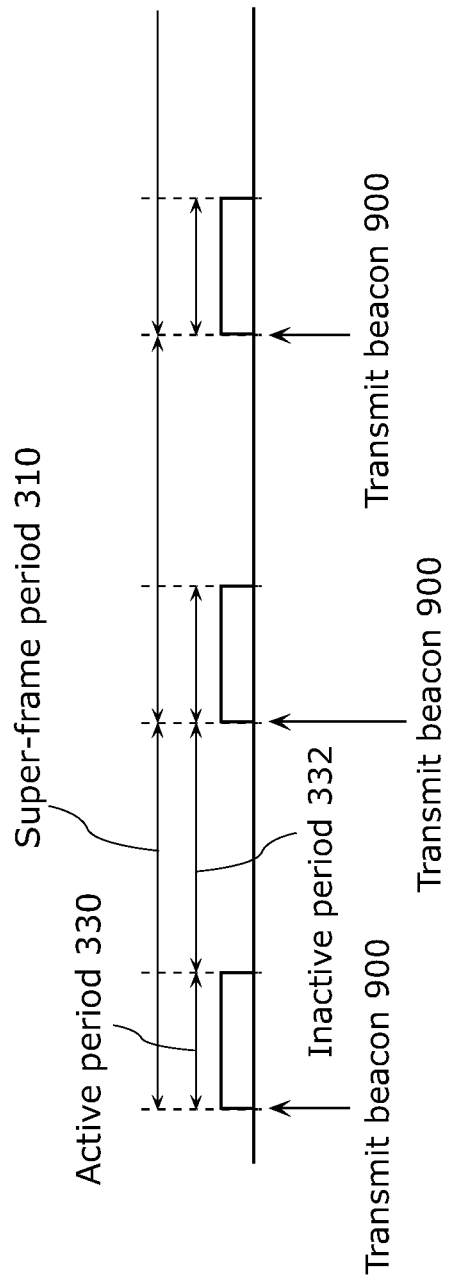
FIG. 47 is a diagram showing a super-frame period which includes an active period and an inactive period.
Figure 48:
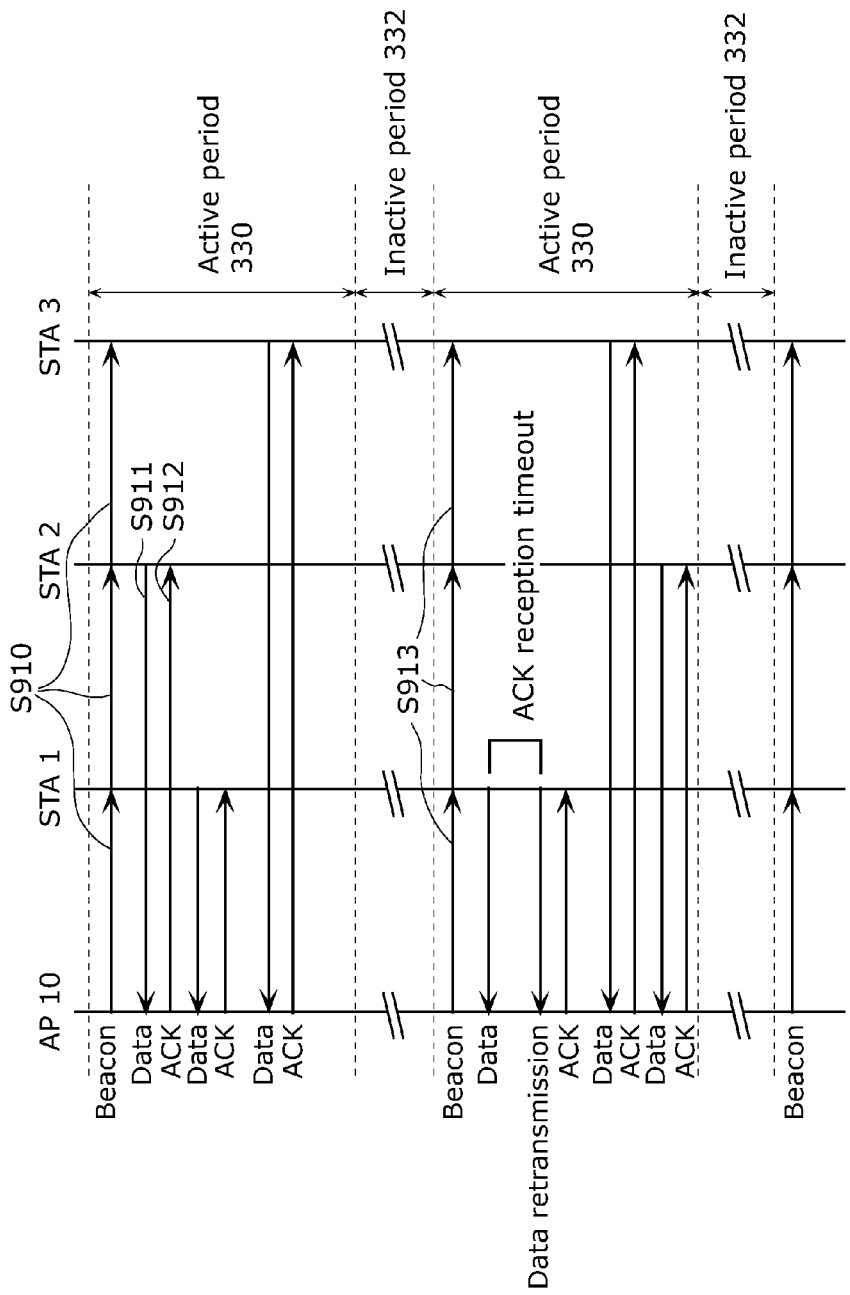
FIG. 48 is a diagram showing an example of a communication sequence between an AP and STAs in conventional technology.
Figure 49:
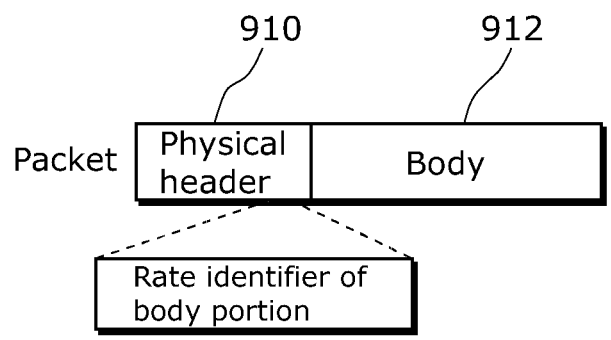
FIG. 49 shows a packet format of multi-rate control in IEEE 802.11 which is conventional technology.

Moreover, the order of using the transfer rates in the beacon format may be as shown in a format shown in FIG. 45. In the sequence illustrated in FIG. 9, the AP 100 may set the order of using the transfer rates in the high rate beacon to be transmitted in the high rate sub-SF period as a transfer rate use sequence 610 shown in FIG. 45 and transfer the high rate beacon, and set the order of using the transfer rates in the low rate beacon to be transmitted in the low rate sub-SF period as a transfer rate use sequence 611 shown in FIG. 45 and transfer the low rate beacon.

It should be noted that the beacon to be transmitted by the AP 100 according to the embodiments 1 to 4 described above may not include the sub-SF periods. For example, after transmitted the beacon to all the STAs 200, the AP 100 may successively transfer information of the sub-SF periods to all the STAs 200. In this case, the STA 200 uses, as the information of the sub-SF periods, the reception data received by the STA 200 after the reception of the beacon.

It should be noted that the control unit 110 included in the AP 100 according to the embodiments 1 to 4 described above may transmit the control signal or the data signal sooner to the STA 200 that has larger received power of the data signal received by the wireless reception unit 103. A large received power means low possibility of communication failure. Thus, for example, by communicating preferentially with the STA 200 that has low possibility of communication failure, in the sub-SF period during which the transfer rate is high, the efficiency of the communication band utilization can be enhanced.

It should be noted that while the beacon generation unit 106 according to the embodiments 1 to 4 sets the information such as the type of transfer rate, the lengths of the SF period and the sub-SF periods, and the like in a beacon body, the present invention is not limited thereto. For example, the length of the SF period and the length of the high rate active period may be included in the high rate beacon to be transmitted in the high rate active period which is the first SF period, and information regarding the low rate active period may be informed of by another packet to be transmitted after the beacon. The information regarding the low rate active period is, for example, a value of the low transfer rate or the length of the low rate active period.

Moreover, if the length of the SF period and the lengths of the sub-SF periods are not changed since the time of shipment, the AP 100 may merely exchange information regarding the configuration of the SF at the connection with the STA 200. Alternatively, for example, both the AP 100 and the STA 200 may, in advance, store therein the same transfer rate type information, the same SF configuration information, and the like at the time of shipment, and the AP 100 and the STA 200 may use the information at the communication.

Moreover, while the STA 200 operates in either the low rate active period or the high rate active period, or operates in both the periods, the present invention is not limited thereto. For example, the STA 4 and the STA 5, which perform communication at the low rate usually in the low rate active period, may operate always at the low rate even in the high rate sub-SF period. This allows instant transmission of data from the AP 100 to the STAs 4 and 5 in the case where highly urgent data having the STAs 4 and 5 as destinations occurs at the AP 100, achieving data delay guarantee. Here, the highly urgent data is, for example, data that has delay bound of less than 1 second.

Still further, the STA 1 to the STA 3 which operate at the high rate may always operate at the high rate. This allows the AP 100 to instantly transmit to the STA 1 to the STA 3 at the high rate the highly urgent data that occurred in the low rate sub-SF period and has the STA 1 to the STA 3 as the destinations.

It should be noted that the processing components included in the communication apparatus and the terminal apparatus (the AP 100 and the STA 200) according to the embodiments 1 to 4 are each typically implemented as an LSI which is an integrated circuit. These processing components may separately be mounted on one chip, or a part or the whole of the processing components may be mounted on one chip.

Here, the term LSI is used. However, IC, system LSI, super LSI, ultra LSI may be used depending on the difference in degree of integration.

Moreover, the integrated circuit is not limited to the LSI and may be implemented as a dedicated circuit or a general-purpose processor. An FPGA (Field Programmable Gate Array) which is programmable after manufacturing the LSI, or a reconfigurable processor in which connection or settings of circuit cells in LSI is reconfigurable, may be used.

Furthermore, if circuit integration technology emerges replacing the LSI due to advance in semiconductor technology or other technology derived therefrom, the processing components may, of course, be integrated using the technology. Application of biotechnology is conceivably possible.

Moreover, a part or the whole of the functionality of the communication apparatus according to the embodiments 1 to 4 of the present invention may be implemented by a processor such as CPU executing a program.

Furthermore, the present invention may be the above-described program, or a recording medium having recorded therein the program. Moreover, the program can, of course, be distributed via transmission medium such as the Internet.

Moreover, at least part of the functionality of the communication apparatus according to the embodiments 1 to 4 may be combined.

Furthermore, various modifications to the present embodiments that may be conceived by those skilled in the art are included in the present invention, without departing from the spirit of the present invention.

INDUSTRIAL APPLICABILITY

A communication apparatus according to the present invention is useful as an apparatus which performs multi-rate communications that expand coverage area and efficiently utilize the bandwidth by using a plurality of transfer rates.

REFERENCE SIGNS LIST 1, 2, 3, 4, 5, 200 STA (terminal apparatus)
10, 100 AP (communication apparatus)
50 Wireless network
101, 201 Wireless transmission unit
102, 202 Transfer rate setting unit
103, 203 Wireless reception unit
105, 204 Transmission data generation unit
106 Beacon generation unit
108, 206 Quality determination unit
109, 207 Reception data parse unit
110, 205 Control unit
111, 208 Storage unit
112, 209 Interface
113, 210 Antenna
120, 220 Wireless communication unit
310 Super-frame period
320, 321, 401, 402, 411, 412 Sub-SF period
330 Active period
332 Inactive period
340, 341, 900 Beacon
342, 344, 346 High rate beacon
343, 345, 347 Low rate beacon
501 Super-frame period
502 BN
503 High rate value
504 Start time of high rate
505 High rate active period
506 Low rate value
507 Start time of low rate
508 Low rate active period
610, 611 Transfer rate use sequence
910 Physical header
912 Body

The invention claimed is:
1. A communication apparatus comprising:
a wireless communication device configured to perform wireless communication with one or more terminal apparatuses;
a transfer rate setting device configured to set a transfer rate of the wireless communication performed by the wireless communication device;
a beacon generation device configured to generate a beacon which specifies a first period in association with a first transfer rate and a second period in association with a second transfer rate lower than the first transfer rate; and a control device configured to cause the wireless communication device to wirelessly transmit, for every predetermined period, the beacon generated by the beacon generation device, wherein when causing the wireless communication device to wirelessly transmit the beacon, the control device is configured to cause the transfer rate setting device to set the transfer rate different from a transfer rate previously used for wirelessly transmitting the beacon and cause the wireless communication device to transmit the beacon to the one or more terminal apparatuses, and wherein, when the wireless communication device fails to transmit a data signal at the first transfer rate in the first period, the control device is configured to cause the wireless communication device to retransmit the data signal at the second transfer rate in the second period.

2. The communication apparatus according to claim 1, wherein the control device is configured to cause the transfer rate setting device to set the transfer rate to the first transfer rate when causing the wireless communication device to wirelessly transmit the beacon in the first period, and cause the transfer rate setting device to set the transfer rate to the second transfer rate when causing the wireless communication device to wirelessly transmit the beacon in the second period.

3. The communication apparatus according to claim 2, wherein the beacon further specifies a first time which is a time within the first period, and if an error rate which is a value corresponding to a number of times for which the wireless communication device has failed to wirelessly receive a data signal is greater than or equal to a predetermined first threshold value at the first time, the control device is configured to (A) cause the transfer rate setting device to set the transfer rate to the second transfer rate and (B) cause the wireless communication device to wirelessly transmit, to all of the one or more terminal apparatuses, a second control signal for setting a transfer rate of the one or more terminal apparatuses to the second transfer rate.

4. The communication apparatus according to claim 3, wherein the beacon further specifies a second time which is a time within the first period and later than the first time, and when the error rate is less than the predetermined first threshold value at the first time and if the error rate is greater than or equal to a predetermined second threshold value at the second time, the control device is configured to cause the transfer rate setting device to set the transfer rate to the second transfer rate and cause the wireless communication device to wirelessly transmit, to all of the one or more terminal apparatuses, the second control signal for setting the transfer rate of the one or more terminal apparatuses to the second transfer rate.

5. The communication apparatus according to claim 3, wherein the control device is configured to transmit a data signal earlier in time to one of the one or more terminal apparatuses from which the data signal is transmitted which has the larger received power when received by the wireless communication device.

6. The communication apparatus according to claim 2, wherein the beacon further specifies a first time which is a time within the first period, if an error rate which is a value corresponding to a number of times for which the wireless communication device has failed to wirelessly receive a data signal is greater than or equal to a predetermined first threshold value at the first time, the control device is configured to cause the wireless communication device to wirelessly transmit, to all of the one or more terminal apparatuses, a second control signal which includes a second time and is a control signal for keeping a transfer rate of the one or more terminal apparatuses at the first transfer rate until the second time which is a time within the second period, and the first transfer rate has a smaller value of the transfer rate than the second transfer rate.

7. The communication apparatus according to claim 2, wherein the control device is configured to cause the beacon generation device to generate the beacon such that, among a total number of terminal apparatuses, the smaller a number of terminal apparatuses that receive the beacon wirelessly transmitted at the first transfer rate is relative to a number of terminal apparatuses that receive the beacon wirelessly transmitted at the second transfer rate, the shorter the first period is relative to the second period.

8. The communication apparatus according to claim 2, wherein the control device is configured to cause the beacon generation device to generate the beacon such that (A) among a total number of terminal apparatuses, the smaller a number of terminal apparatuses that receive the beacon wirelessly transmitted at the first transfer rate is relative to a number of terminal apparatuses that receive the beacon wirelessly transmitted at the second transfer rate and (B) the higher the first transfer rate is relative to the second transfer rate, the shorter the first period is relative to the second period.

9. The communication apparatus according to claim 1, wherein the beacon further specifies a third period and a third transfer rate which is the transfer rate in association with the third period and different from the first transfer rate and the second transfer rate, and the control device is configured to cause the transfer rate setting device to set the transfer rate to the first transfer rate to cause the wireless communication device to wirelessly transmit the beacon in the first period, cause the transfer rate setting device to set the transfer rate to the second transfer rate to cause the wireless communication device to wirelessly transmit the beacon in the second period, and cause the transfer rate setting device to set the transfer rate to the third transfer rate to cause the wireless communication device to wirelessly transmit the beacon in the third period.

10. A terminal apparatus comprising:

a wireless communication device which can perform wireless communication with a communication apparatus;

a transfer rate setting device configured to set, from among a plurality of transfer rates, a transfer rate which is used by the wireless communication device for the wireless communication; and a control device configured to cause the transfer rate setting device to set the transfer rate, based on a beacon received by the wireless communication device, wherein the beacon specifies a first period in association with a first transfer rate and a second period in association with a second transfer rate, and wherein, when the wireless communication device fails to transmit a data signal at the first transfer rate in the first period, the control device is configured to cause the wireless communication device to retransmit the data signal at the second transfer rate in the second period.

11. The terminal apparatus according to claim 10,
wherein the beacon further specifies a first time which is a time within the first period, and
the control device is configured
to cause the transfer rate setting device to set, at the first time, the transfer rate to the second transfer rate, and determines whether the wireless communication device has received a second control signal at the second transfer rate,
to cause the transfer rate setting device to set the transfer rate to the first transfer rate when the second control signal has not been received, and
not to cause the transfer rate setting device to change the transfer rate when the second control signal has been received.

12. The terminal apparatus according to claim 10, wherein when the wireless communication device fails to wirelessly transmit a data signal at the first transfer rate greater than or equal to a predetermined number of times in the first period, the control device is configured to cause the wireless communication device to retransmit, in the second period, the data signal at the second transfer rate.

13. The terminal apparatus according to claim 10, wherein prior to causing the wireless communication device to perform wireless transmission, the control device is configured to perform carrier sensing which is a process of determining whether other another terminal apparatus is performing wireless transmission, and if it is determined that no other terminal apparatus is performing the wireless transmission, the control device is configured to determine a backoff time, which is a wait time until when the control device causes the wireless communication device to perform the wireless transmission after the carrier sensing is performed, such that as a received power of the beacon decreases the backoff time increases, and after the backoff time is passed, the control device is configured to cause the wireless communication device to perform the wireless transmission.

14. A communication method comprising:
generating a beacon which specifies a first period in association with a first transfer rate and a second period in association with a second transfer rate lower than the first transfer rate;
instructing a wireless communication device to wirelessly transmit the generated beacon for every predetermined period; and
setting a transfer rate, which is used by the wireless communication device for wirelessly transmitting the beacon, to a transfer rate different from a transfer rate previously used for wirelessly transmitting the beacon,
wherein, when the wireless communication device fails to transmit a data signal at the first transfer rate in the first period, said instructing of the wireless communication device instructs the wireless communication device to retransmit the data signal at the second transfer rate in the second period.

15. A non-transitory computer-readable recording medium having a computer program recorded thereon, the computer program causing a computer to execute the communication method according to claim 14.

16. An integrated circuit comprising:
a wireless communication device configured to perform wireless communication with one or more terminal apparatuses;
a transfer rate setting device configured to set a transfer rate of the wireless communication performed by the wireless communication device;
a beacon generation device configured to generate a beacon which specifies a first period in association with a first transfer rate and a second period in association with a second transfer rate lower than the first transfer rate; and
a control device configured to cause the wireless communication device to wirelessly transmit, for every predetermined period, the beacon generated by the beacon generation device,
wherein when causing the wireless communication device to wirelessly transmit the beacon, the control device is configured to cause the transfer rate setting device to set a transfer rate different from a transfer rate previously used for wirelessly transmitting the beacon, and cause the wireless communication device to transmit the beacon to the one or more terminal apparatuses, and
wherein, when the wireless communication device fails to transmit a data signal at the first transfer rate in the first period, the control device is configured to cause the wireless communication device to retransmit the data signal at the second transfer rate in the second period.

17. A communication system comprising the communication apparatus according to claim 1 and a terminal apparatus having a wireless communication device,
wherein the wireless communication device included in the terminal apparatus is configured to receive, among beacons, a beacon that is transmitted from the communication apparatus at a transfer rate receivable by the wireless communication device of the terminal apparatus.

* * * * *